United States Patent [19]

Noguchi et al.

[11] 4,106,448

[45] Aug. 15, 1978

[54] INTERNAL COMBUSTION ENGINE AND METHOD OF OPERATION

[75] Inventors: Masaaki Noguchi, Nagoya; Masaharu Sumiyoshi, Toyota; Yukiyasu Tanaka, Okazaki; Taro Tanaka, Chiryu, all of Japan

[73] Assignee: Nippon Soken, Inc., Nishio, Japan

[21] Appl. No.: 657,201

[22] Filed: Feb. 11, 1976

[30] Foreign Application Priority Data

| Mar. 3, 1975 | [JP] | Japan | 50-26375 |
| Mar. 10, 1975 | [JP] | Japan | 50-29232 |
| Mar. 19, 1975 | [JP] | Japan | 50-33719 |
| Apr. 2, 1975 | [JP] | Japan | 50-40709 |
| Apr. 4, 1975 | [JP] | Japan | 50-41692 |
| Apr. 14, 1975 | [JP] | Japan | 50-45685 |
| Apr. 21, 1975 | [JP] | Japan | 50-47926 |
| Apr. 25, 1975 | [JP] | Japan | 50-51047 |
| May 9, 1975 | [JP] | Japan | 50-55781 |
| May 15, 1975 | [JP] | Japan | 50-58234 |
| May 21, 1975 | [JP] | Japan | 50-61223 |
| Jun. 12, 1975 | [JP] | Japan | 50-71774 |
| Jun. 12, 1975 | [JP] | Japan | 50-71778 |
| Jun. 18, 1975 | [JP] | Japan | 50-74958 |
| Jun. 28, 1975 | [JP] | Japan | 50-80419 |

[51] Int. Cl.² .......................... F02M 7/00; F02P 5/04; F02B 19/10; F02B 19/16

[52] U.S. Cl. .............................. 123/119 LR; 60/285; 123/117 R; 123/117 A; 123/119 A; 123/119 A; 123/32 SP; 123/198 F; 123/32 EB

[58] Field of Search .......... 123/32 SP, 32 ST, 32 EA, 123/32 EB, 119 LR, 127; 60/285, 274, 276, 278

[56] References Cited

U.S. PATENT DOCUMENTS

| 2,166,968 | 7/1939 | Rohlin | 123/198 F |
| 2,771,867 | 11/1956 | Peras | 123/198 F |
| 3,708,980 | 1/1973 | Truxell | 60/276 |
| 3,827,237 | 8/1974 | Linder | 60/285 |
| 3,910,240 | 10/1975 | Omori | 123/32 EA |
| 3,982,393 | 9/1976 | Masaki | 60/274 |
| 4,030,292 | 6/1977 | Masaki et al. | 60/285 |
| 4,033,122 | 7/1977 | Masaki et al. | 60/285 |

*Primary Examiner*—Ronald B. Cox
*Attorney, Agent, or Firm*—Cushman, Darby & Cushman

[57] ABSTRACT

All of combustion chambers receive a lean air-fuel charge at low and medium engine power demands. As the engine power demand increases, a rich air-fuel charge is supplied to one or a suitable number of the combustion chambers with countermeasures being provided to suppress the formation of nitrogen oxides, such as, an exhaust gas recirculation (EGR) and the torch effect of a torch ignition system, the remaining combustion chambers, if any, receiving a lean air-fuel charge.

Exhaust gases from all of the combustion chambers are converged to oxidize hydrocarbons and carbon monoxide formed by the combustion of the rich air-fuel charge when the combustion chambers respectively receive rich and lean air-fuel charges.

254 Claims, 44 Drawing Figures

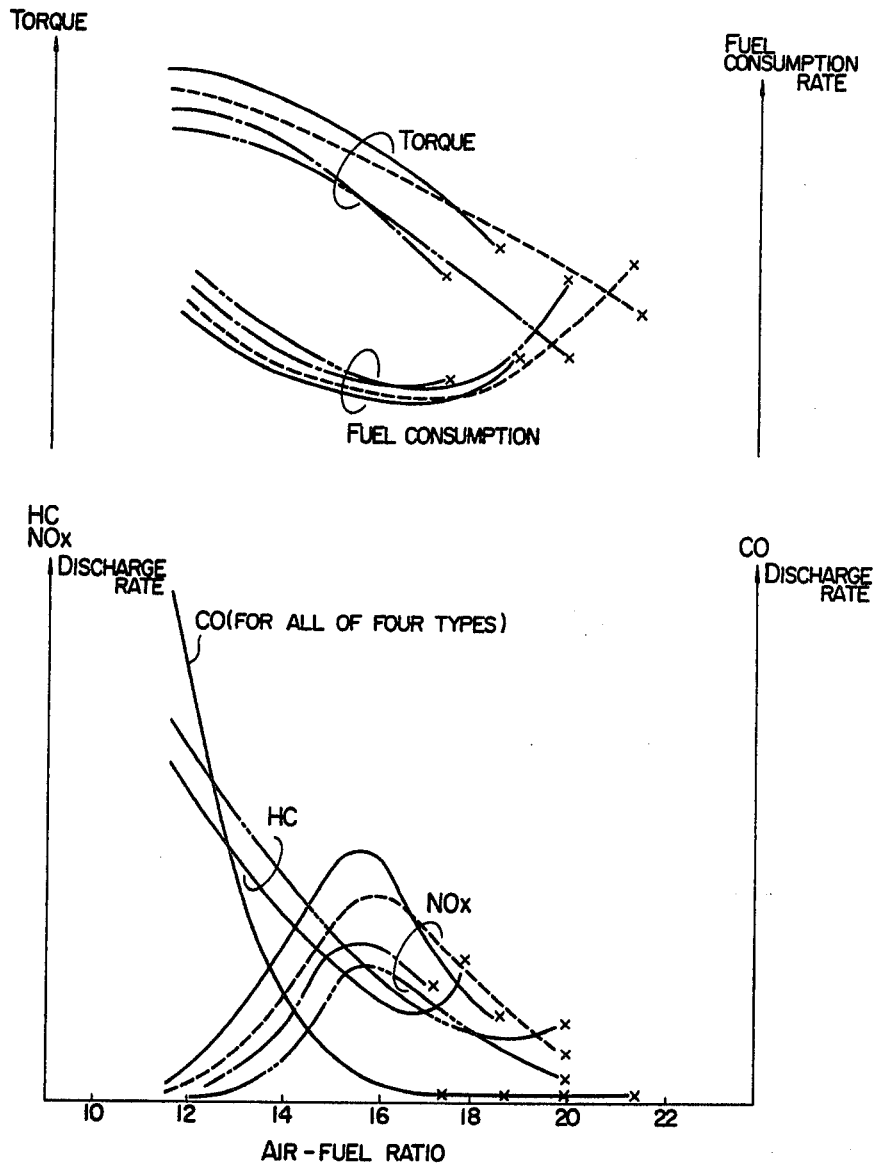

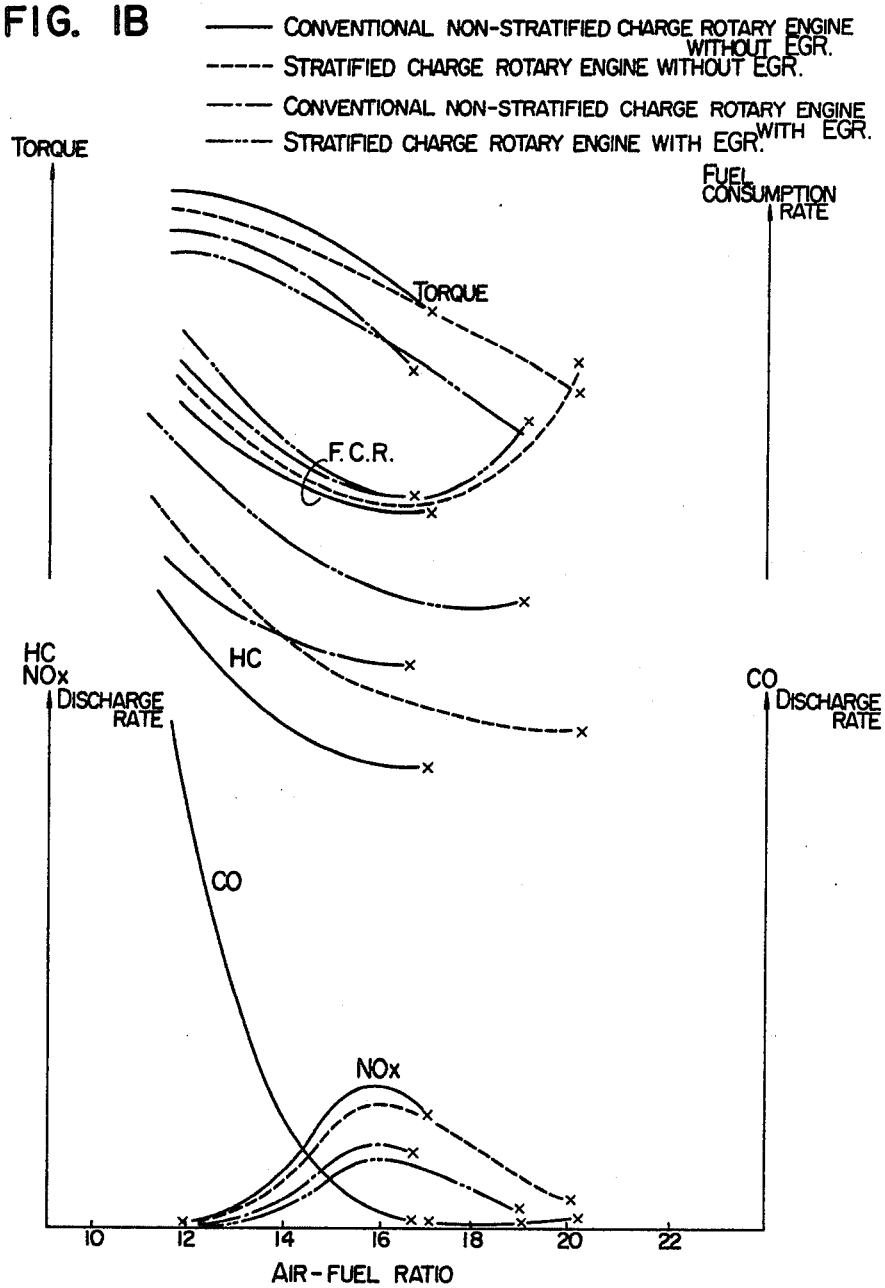

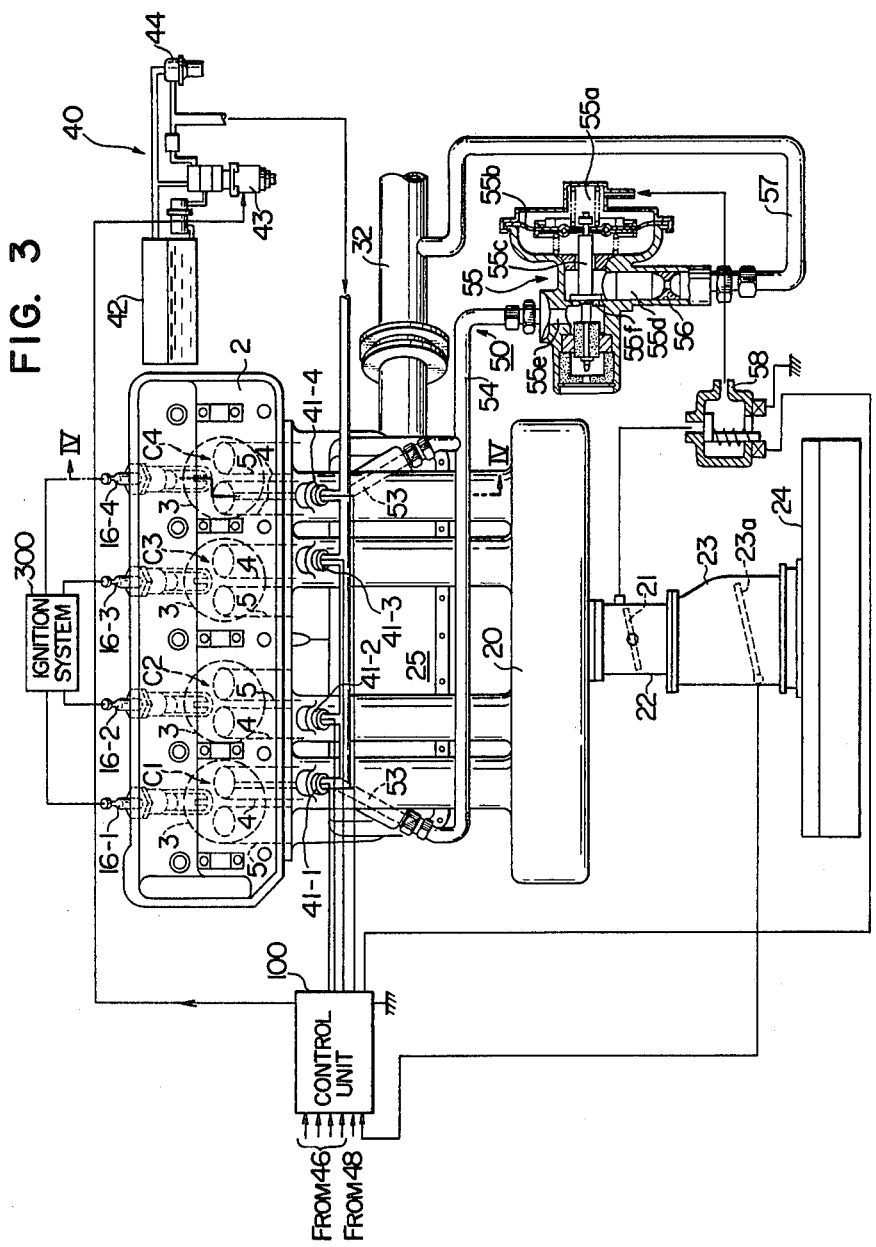

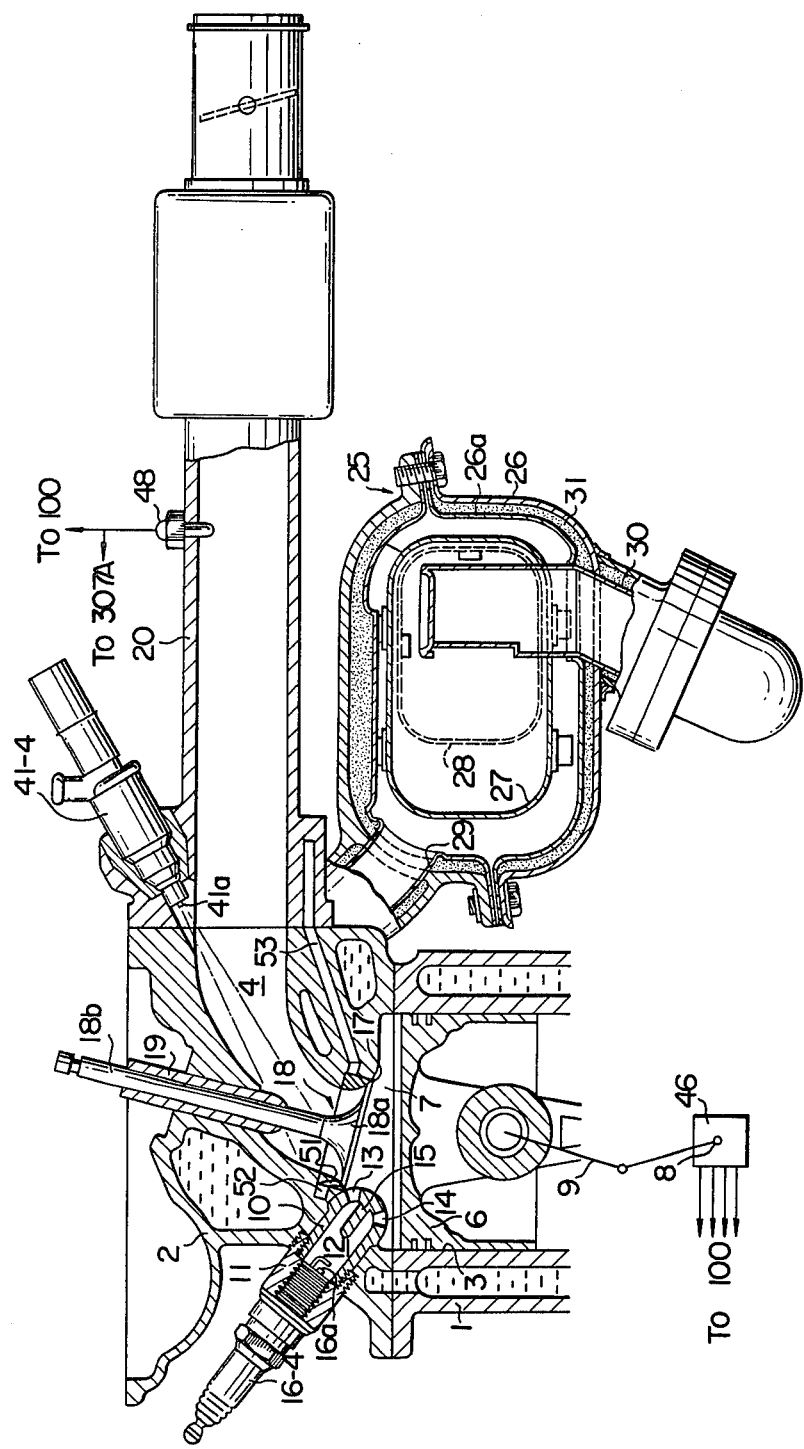

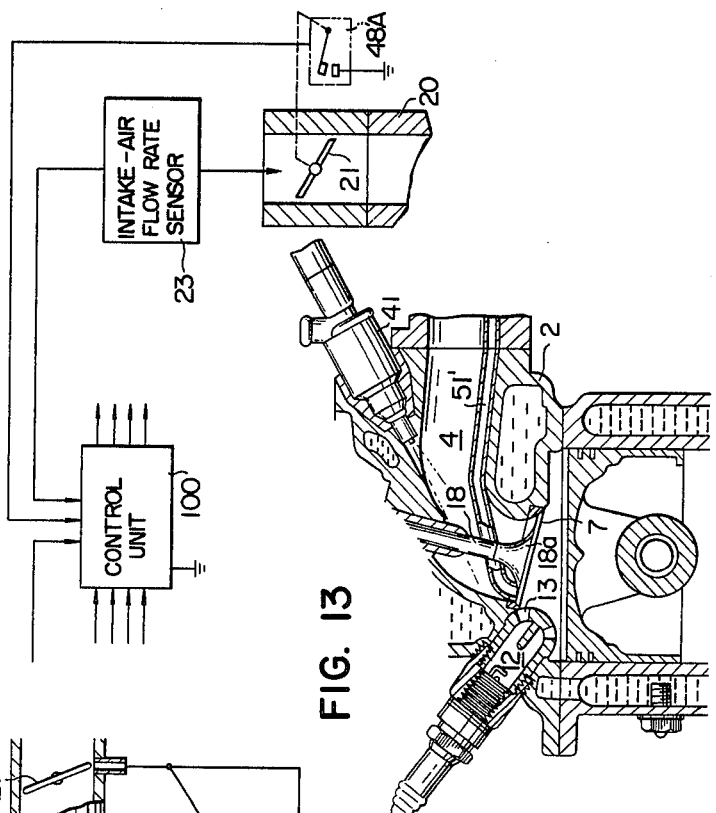
FIG. 12
FIG. 13
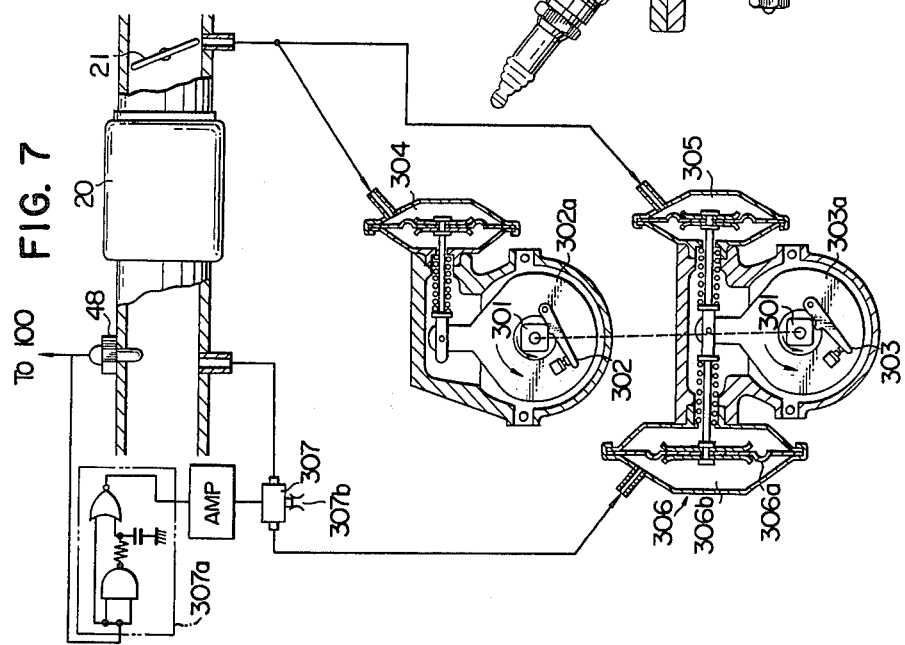
FIG. 7

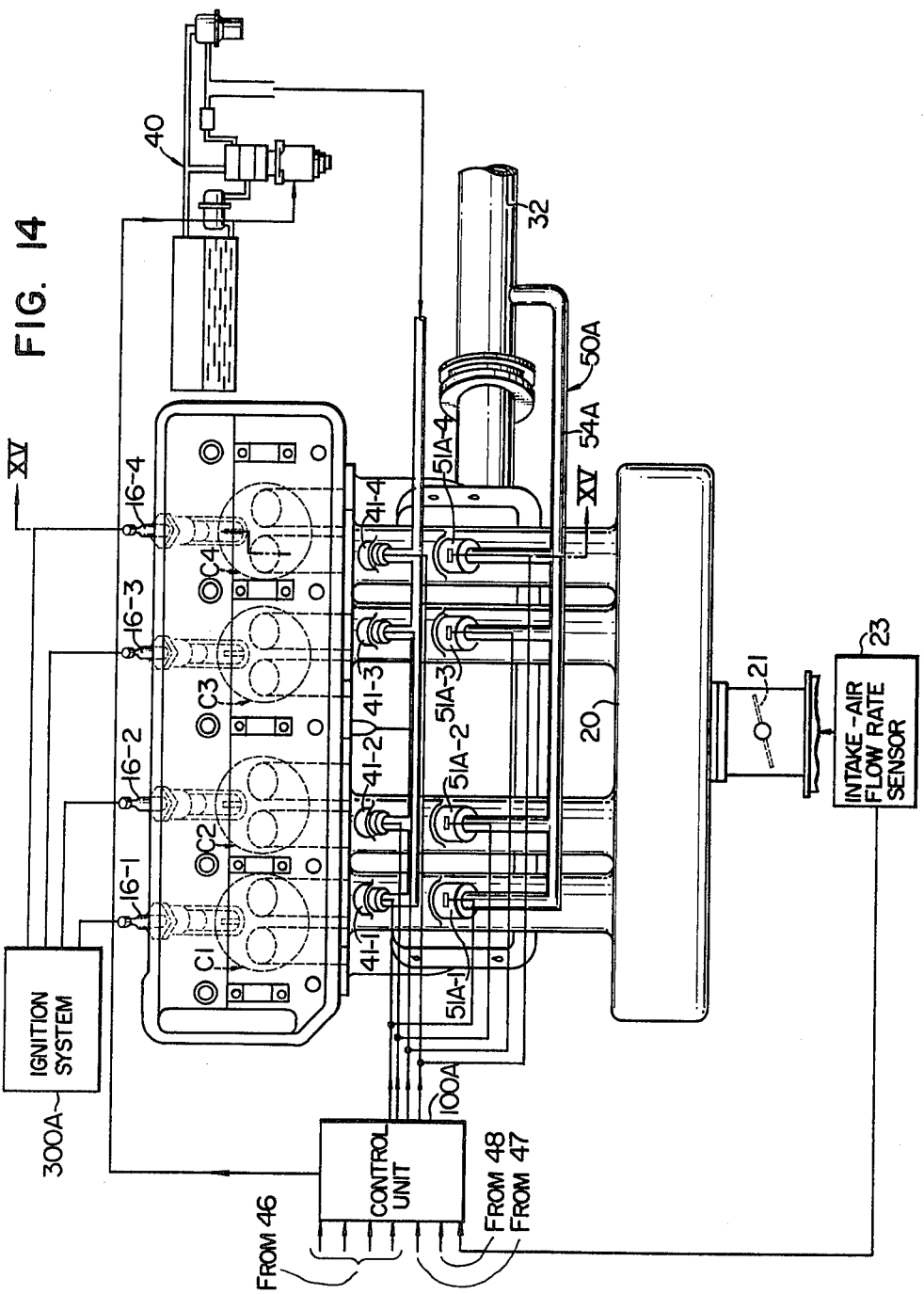

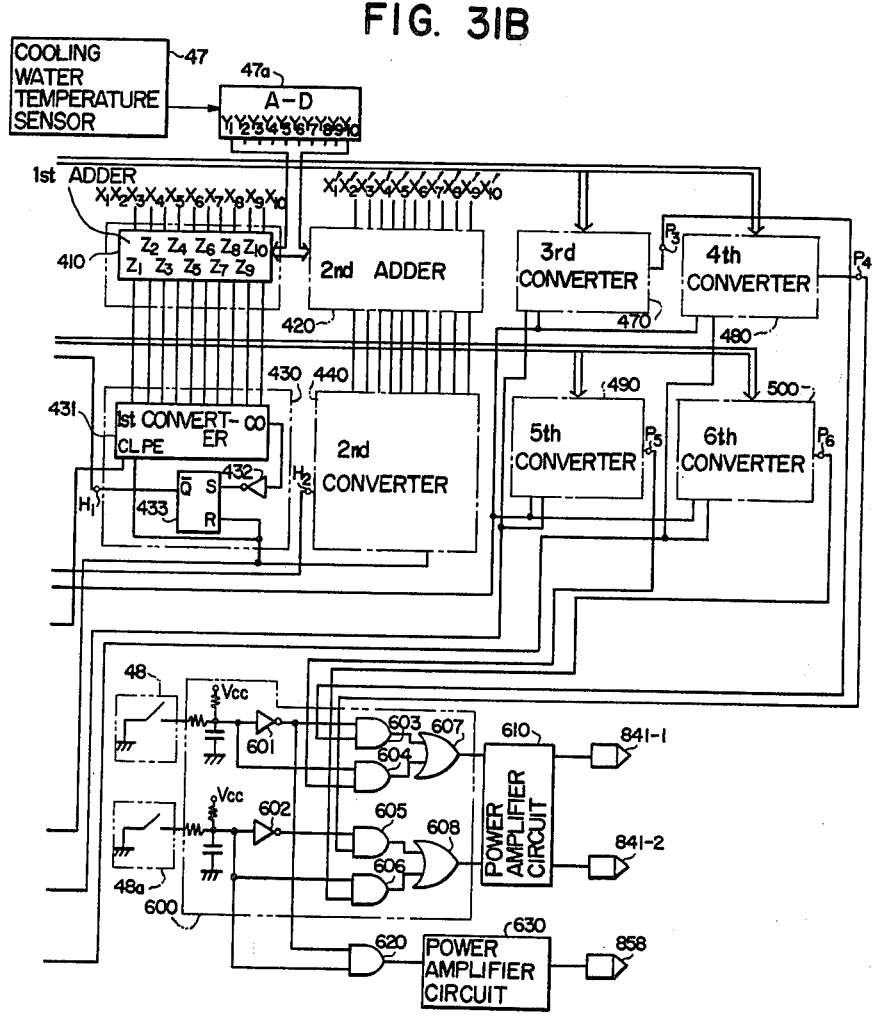

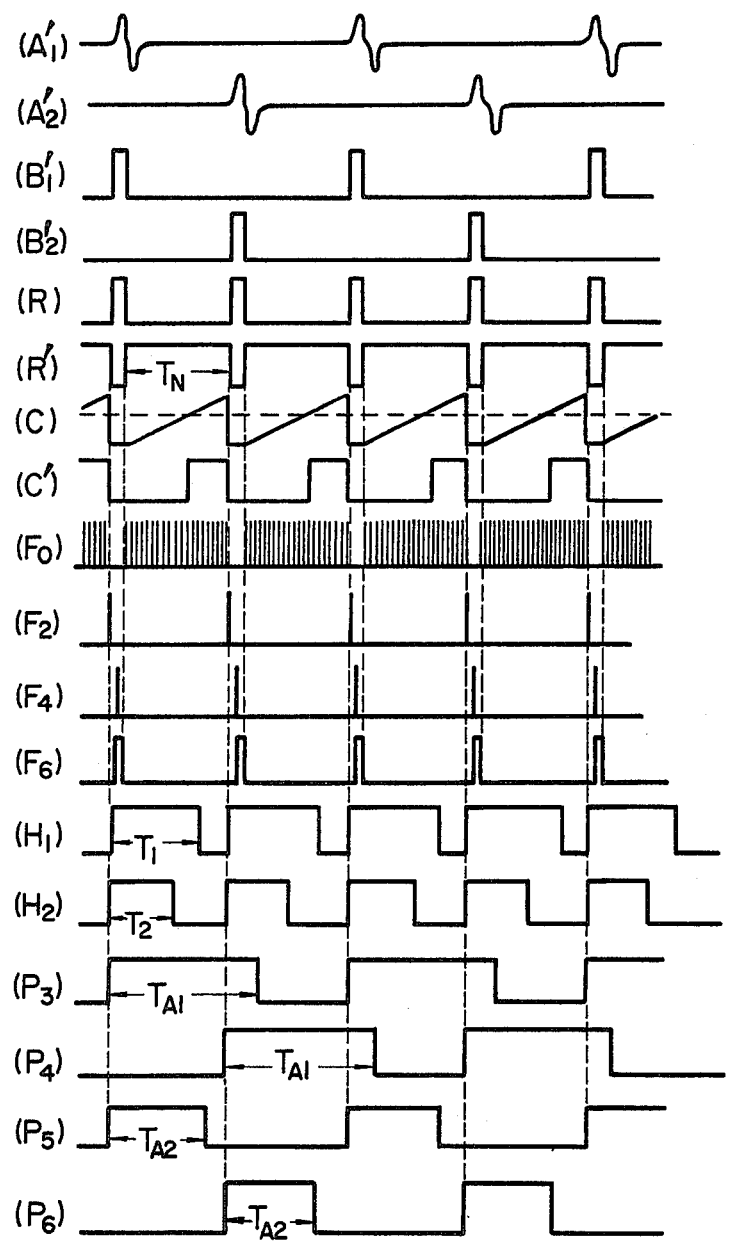

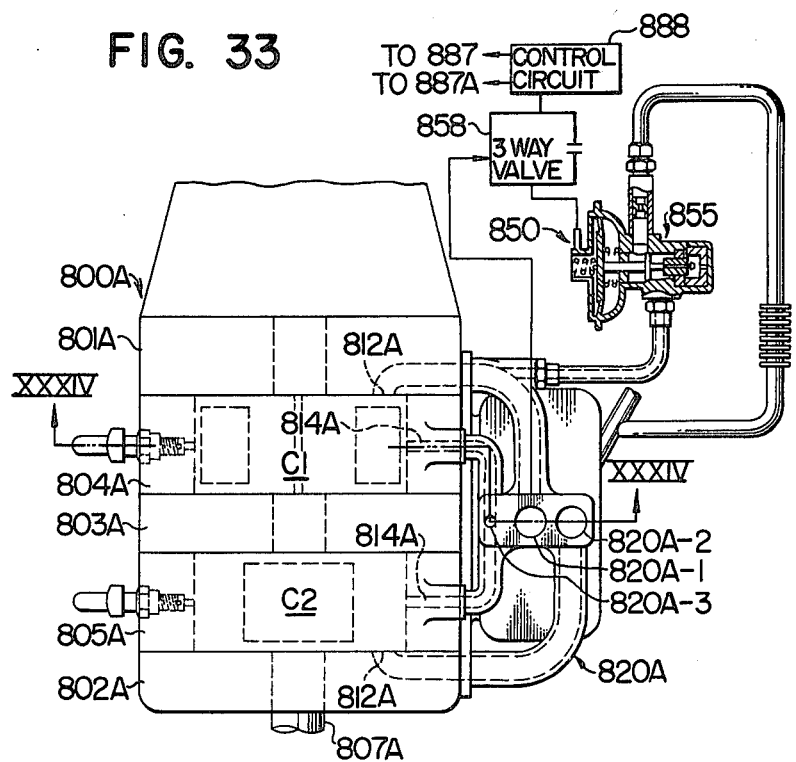
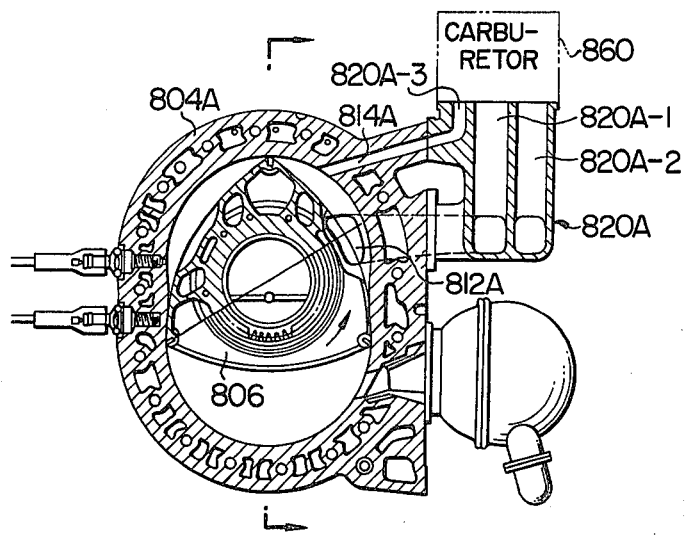

INTERNAL COMBUSTION ENGINE AND METHOD OF OPERATION

This invention relates to an internal combustion engine and a method of operating it, and more particularly to an internal combustion engine which has the reduced emission of nitrogen oxides (NOx), hydrocarbons (HC) and carbon monoxide (CO) in the exhaust gases from the engine while maintaining good power output thus providing good driveability. The invention is also directed to a method of operation of an internal combustion engine which method reduces the emission of such pollutants as mentioned above in the exhaust gases of the engine while preventing the deterioration of the output power of the engine.

When air pollution control regulation standards for nitrogen oxides, hydrocarbons and carbon monoxide in the exhaust gases of motor vehicles, which standards must be complied with simultaneously, become very stringent, one of the most effective solutions seems to be a lean operation, that is, a combustion of a lean air-fuel charge in an engine.

In this specification, a "lean" air-fuel charge means an air-fuel charge leaner than an air-fuel ratio of 16 and a "rich" air-fuel charge means an air-fuel charge richer than approximately stoichiometric (14.7), except as otherwise described.

There is however, a big disadvantage in the lean operation of an engine which disadvantage is a very large deterioration of the output power during the lean operation of the engine.

The prior art lean operation reciprocating engines usually received a lean air-fuel charge having an air-fuel ratio greater (leaner) than 18, and the prior art lean operation rotary engine usually received a lean air-fuel charge having an air-fuel ratio greater than 17, to meet the air pollution control regulation standards.

High engine power is needed for cases of emergency acceleration to avoid an accident during passing another vehicle on a highway or for ramp way acceleration to enter a highway. The prior art lean operation engine cannot quickly respond to such a sudden increase of the engine power demand because of deterioration of output power. Even at a moderate acceleration a driver may feel a slackened reponse of the prior art lean operation engine. This means a deterioration of driveability of the prior art lean operation engine. There is also a steady high power demand in case of cruising at a high speed on a highway. If such high speed cruising is made on a long up-hill road, the higher power is steadily demanded. The prior art lean operation engine cannot meet these high power demands unless the displacement of the engine is increased. Such an increase of displacement of the engine results in a considerable deterioration of the fuel consumption rate.

This invention concerns an improvement of prior art lean operation engines which improvement overcomes the disadvantage described above.

The following prior art references are relevant to this improvement:

Society of Automotive Engineers paper Volume 720 736
Sept. 11 – 14, 1972;
U.S. Pat. 3,192,706;
U.S. Pat. 2,918,047;
U.S. Pat. 3,708,980;
Japanese Laid Open Patent Application Publication Toku-Kai-Sho 49-62808.

The relevancy of these references is discussed in the detailed description of invention.

The basic feature of this invention is the improvement of a lean operation engine which improvement is to add additional fuel to one or a suitable number of combustion chambers of the lean operation engine relative to the quantity of air sucked into the combustion chamber or chambers to form an air-fuel charge richer than stoichiometric therein as the engine power demand increases in order to increase the output power of the engine and also to increase the quick response of the engine to the rapid increase of the engine power demand. The supply of the additional fuel is effected with accompanying countermeasures to prevent the emission of hydrocarbons, carbon monoxide, and especially of nitrogen oxides from exceeding the limits set by the air pollution control regulation standards. There are many kinds of countermeasures depending on the severity of the air pollution control standards.

The first kind of countermeasure is the recirculation of the exhaust gases of the lean operation engine to the combustion chambers which is supplied with the additional fuel, to subdue the formation of nitrogen oxides which may otherwise increase by the supply of the additional fuel. Hydrocarbons and carbon monoxide formed by the supply of the additional fuel are after-burned when the exhaust gases of the combustion chambers to which the additional fuel is added converge with the exhaust gases from the lean operation combustion chambers. This first kind of countermeasure is adopted when the air pollution control standards are very stringent.

The second kind of countermeasure is the adoption of a torch ignition engine or rotary engine.

The torch ignition engine is very effective for lean operation. When a rich operation, that is, the combustion of a rich air-fuel charge, is effected with the torch ignition engine, the formation of nitrogen oxides is very low because of the torch effect of the rich operation, as compared with the conventional reciprocating engines without any trap chamber or pre-chamber for torch ignition. It is well known in the art that the formation of nitrogen oxides in a rich operation in a combustion chamber of a rotary engine is low. Therefore, even if the additional fuel is added to a lean operation combustion chamber of a rotary engine to perform a rich operation, the formation of nitrogen oxides in it is subdued. The richer the rich air-fuel charge is, the lower the formation of nitrogen oxides is.

The third kind of countermeasure is the selection of the number of the combustion chambers to which the additional fuel is added. This number changes according to the engine power demand. When the air pollution control regulation standards are very stringent and when the supply of the additional fuel must be done in a certain engine operational phase which frequently occurs in an ordinary drive pattern, not only the number of combustion chambers to which the additional fuel is added is reduced but also the number of times in which the supply of the additional fuel is made to do the rich operation in a certain series of sequential combustion operations of the engine is reduced, e.g. one rich operation is made for every eight sequential combustion operations of the engine, to restrict the total quantity of nitrogen oxides formed by the supply of the additional fuel. In an engine operational phase in which both the engine speed and the engine power demand are very high and which rarely occurs in an ordinary town driving pattern, all of the combustion chambers are supplied with the additional fuel.

Another feature of this invention is the adoption of fuel injection nozzles disposed in each of combustion chambers of the lean operation engine. These injection nozzles not only enable an operation, as described previously, wherein one rich operation is performed for every predetermined number of sequential combustion operations of the engine, but also enables precise control of the air-fuel ratio of the air-fuel charge supplied to each of combustion chambers thus preventing an abnormal increase of nitrogen oxides resulted from the transitional change of the air-fuel ratio from a lean operation to a rich operation as with a carburetor type engine. With conventional lean operation engines, it is usually the case that all of the combustion chambers switch from an lean operation to a rich operation to increase the output power for emergency use when high engine power is demanded at a very high engine speed. Such an abnormal increase of nitrogen oxides occurs with the carburetor type engine when the throttle valve rapidly moves to increase the quantity of sucked-in air and when enough fuel to make a rich air-fuel charge is discharged in the carburetor, because (1) a homogeneous mixture is hard to form in the carburetor during such a transition and (2) a uniform distribution of the air-fuel charge is hard to attain during the transition due to the difference of length of the intake manifold from each of the combustion chambers to the carburetor and due to the difference of location of each of the combustion chambers relative to the carburetor. The difficulty in forming a homogeneous mixture and a uniform distribution of the air-fuel charge causes the formation of an air-fuel charge having an air-fuel ratio which corresponds to a peak formation of nitrogen oxides. On the other hand, with engines having fuel injection nozzles disposed in each intake port of each combustion chamber or each disposed directly in each combustion chamber, each combustion chamber receives such an amount of fuel that no abnormal increase of nitrogen oxides occurs even if a change from a lean operation to a rich operation is made in each combustion chamber.

Another feature of this invention is the adoption of a carburetor or carburetors which can supply a lean air-fuel charge to all of the combustion chambers at low engine power demand and a rich air-fuel charge to the predetermined combustion chambers at higher engine power demand. The carburetor type engine has the above-mentioned disadvantage but this type of engine is usable if the air pollution control regulation standards are moderate or if this type of engine is used in combination with the exhaust gas recirculation. The advantage of the carburetor type engine is the more simplified structure and lower production cost. These characteristics are very important for motor vehicle engines. The adoption of the carburetor type engine is, therefore, a compromise of the above-mentioned advantage and disadvantage. Severity of the air pollution control regulation standards has a decisive influence on a decision whether the carburetor type engine can be used or not.

The above-mentioned kinds of countermeasures and features are used in various combinations in this invention.

Other features and advantages will hereinafter appear.

In the drawings:

FIG. 1A is a characteristic diagram showing the relationship between the air-fuel ratio of air-fuel charges and the torque, fuel consumption rate and the rate of discharge of NOx, CO and HC contained in the exhaust gases from reciprocating engines.

FIG. 1B is a characteristic diagram of rotary engines similar to FIG. 1A.

FIG. 3 is a schematic diagram showing a top plan view of the main structure of a 4-cylinder reciprocating engine and partial cross-sectional elevations of other components of the engine according to a first embodiment of this invention.

FIG. 4 is a cross-sectional view taken along the line IV — IV of FIG. 3 with a partial cross-sectional elevation of a thermal reactor.

Figure 5A:
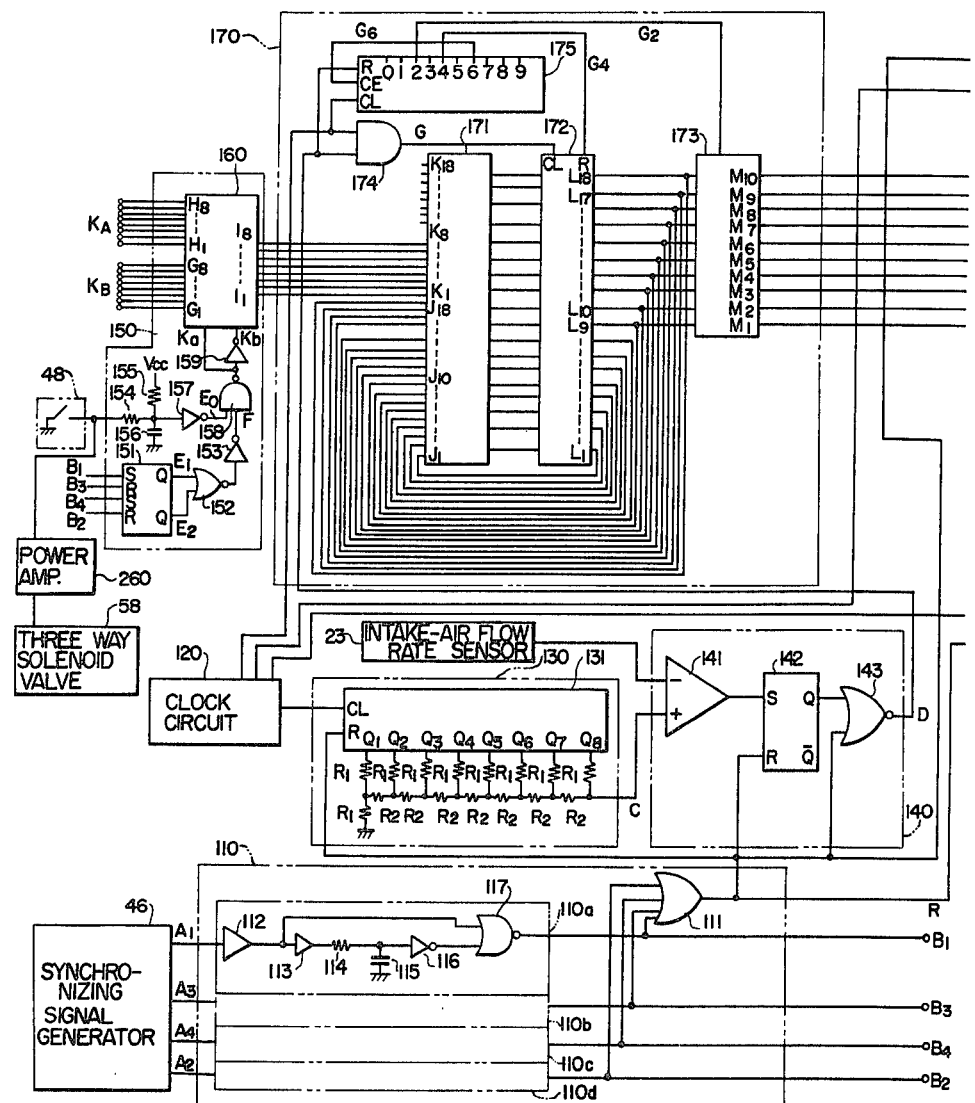
Figure 5B:
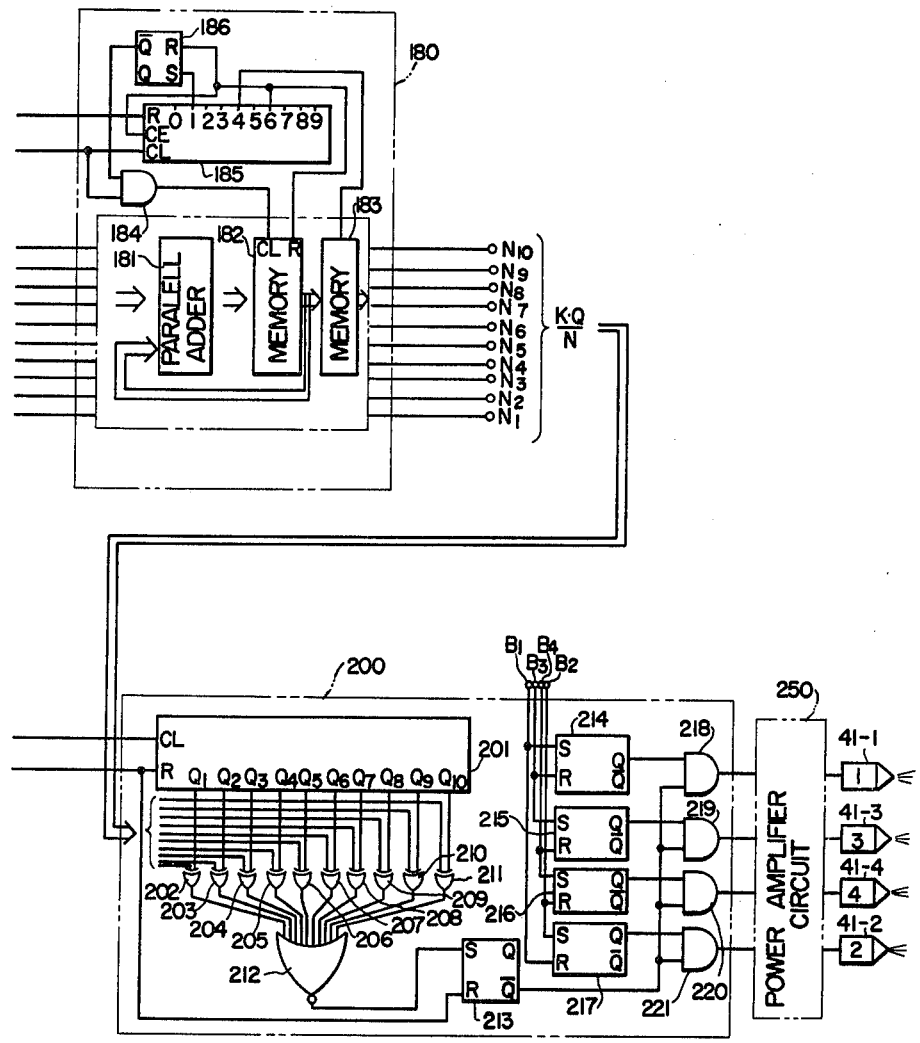

FIGS. 5A and 5B taken together show a circuit diagram of the control unit referred to as 100 in FIG. 3.

Figure 6:
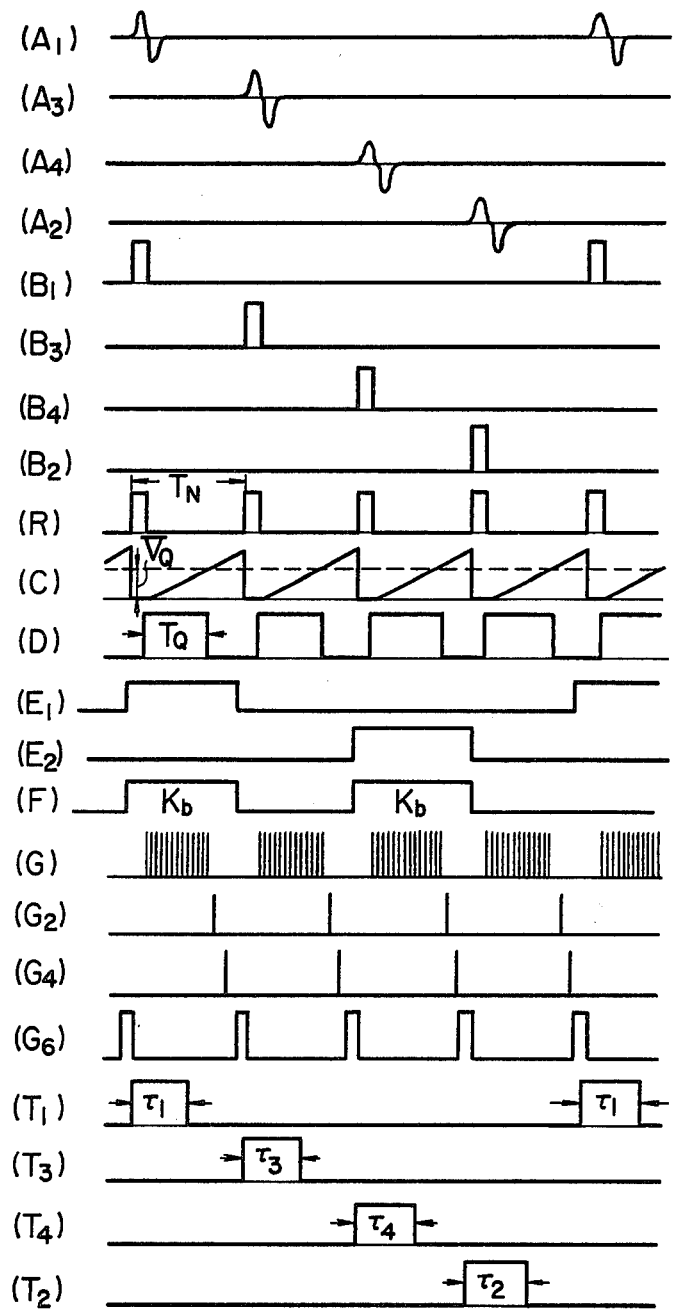

FIG. 6 is a graphical display showing signal waveforms appearing at various particular points in the circuit of FIGS. 5A and 5B.

FIG. 7 is a schematic diagram showing the arrangement of two breakers of a distributor assembly of the ignition system shown in FIG. 3 with relation to an intake manifold, where the two breakers are shown in cross-section.

Figure 8:
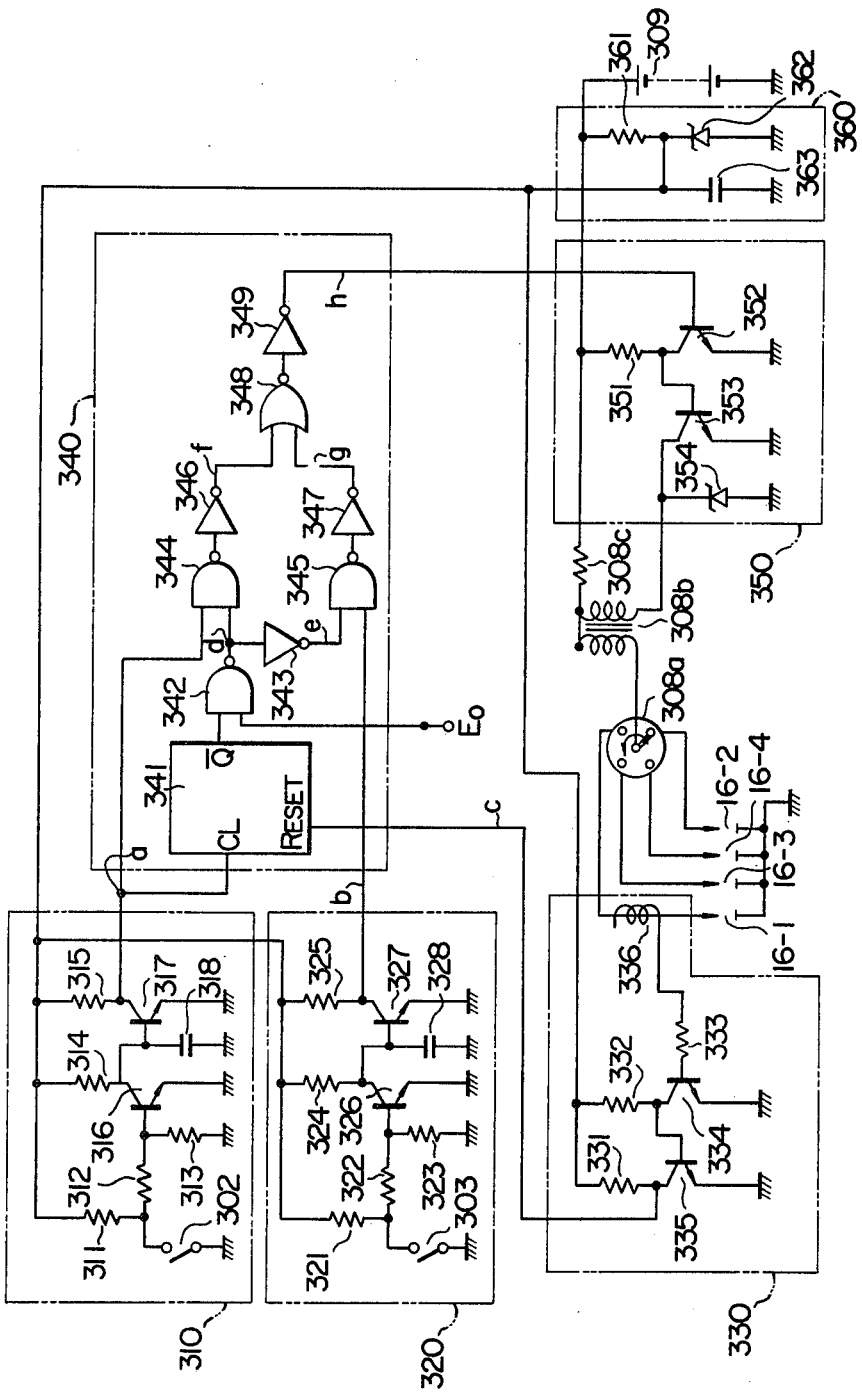

FIG. 8 is a circuit diagram of the ignition system referred to as 300 in FIG. 3.

Figure 9:
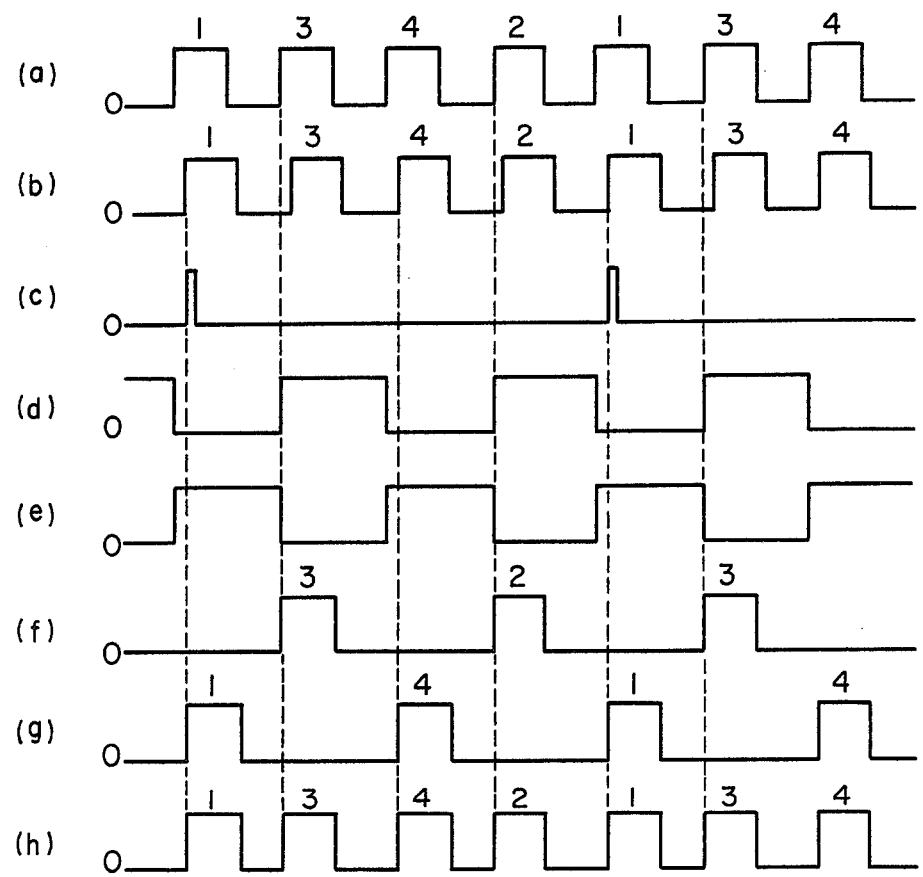

FIG. 9 is a graphical display showing signal waveforms appearing at various particular points shown in the circuit of FIG. 8.

Figure 10:
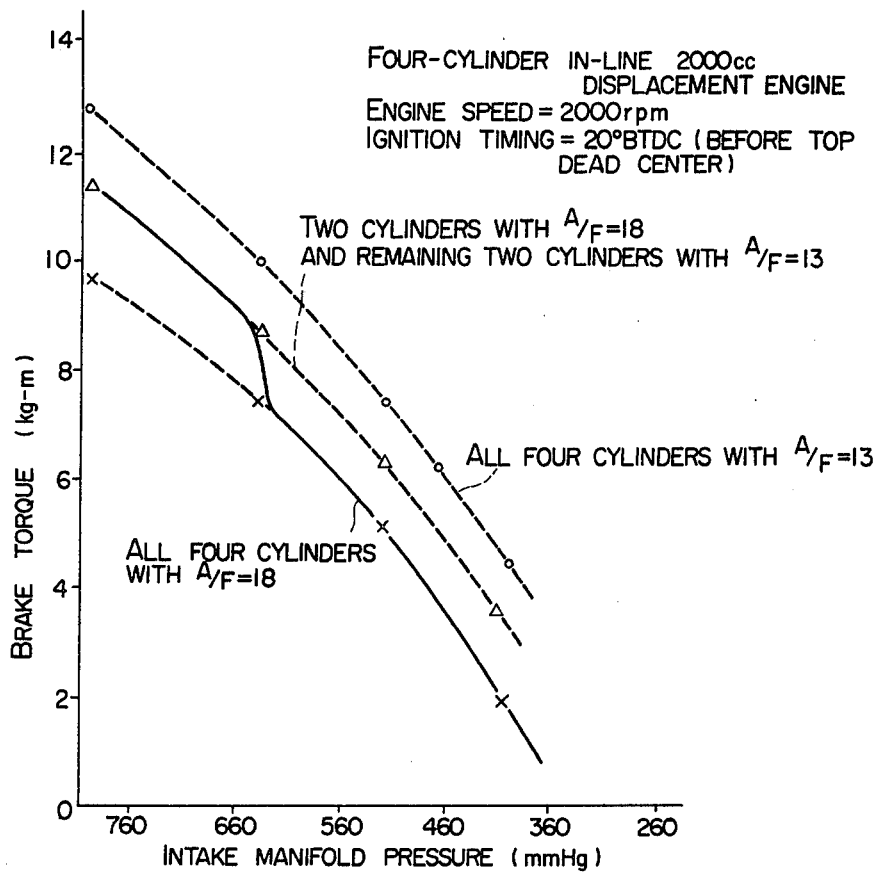

FIG. 10 is a graphical representation of the relationship between brake torque and intake manifold pressure of the engine according to the first embodiment.

Figure 11:
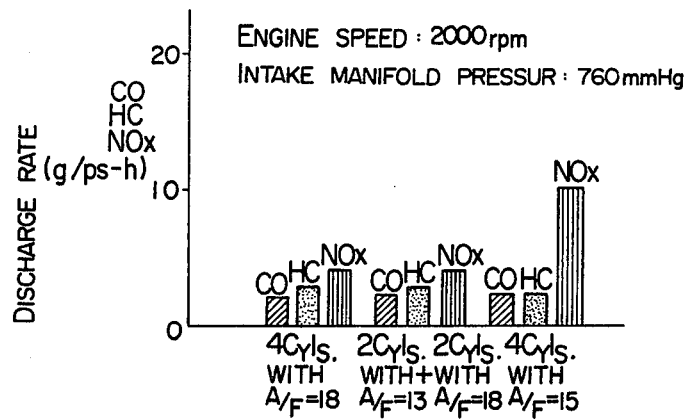

FIG. 11 is a graph showing the measured discharge rates of CO, HC and NOx discharged from the engine according to the first embodiment.

FIG. 12 is a schematic view of a load detecting switch showing a modification of the first embodiment.

FIG. 13 is a cross-section elevation of a cylinder showing another modification of the first embodiment.

FIG. 14 is a schematic diagram showing a top plan view of the main structure of a 4-cylinder reciprocating engine and a partial cross-sectional elevation of another component of the engine according to a second embodiment of this invention.

Figure 15:
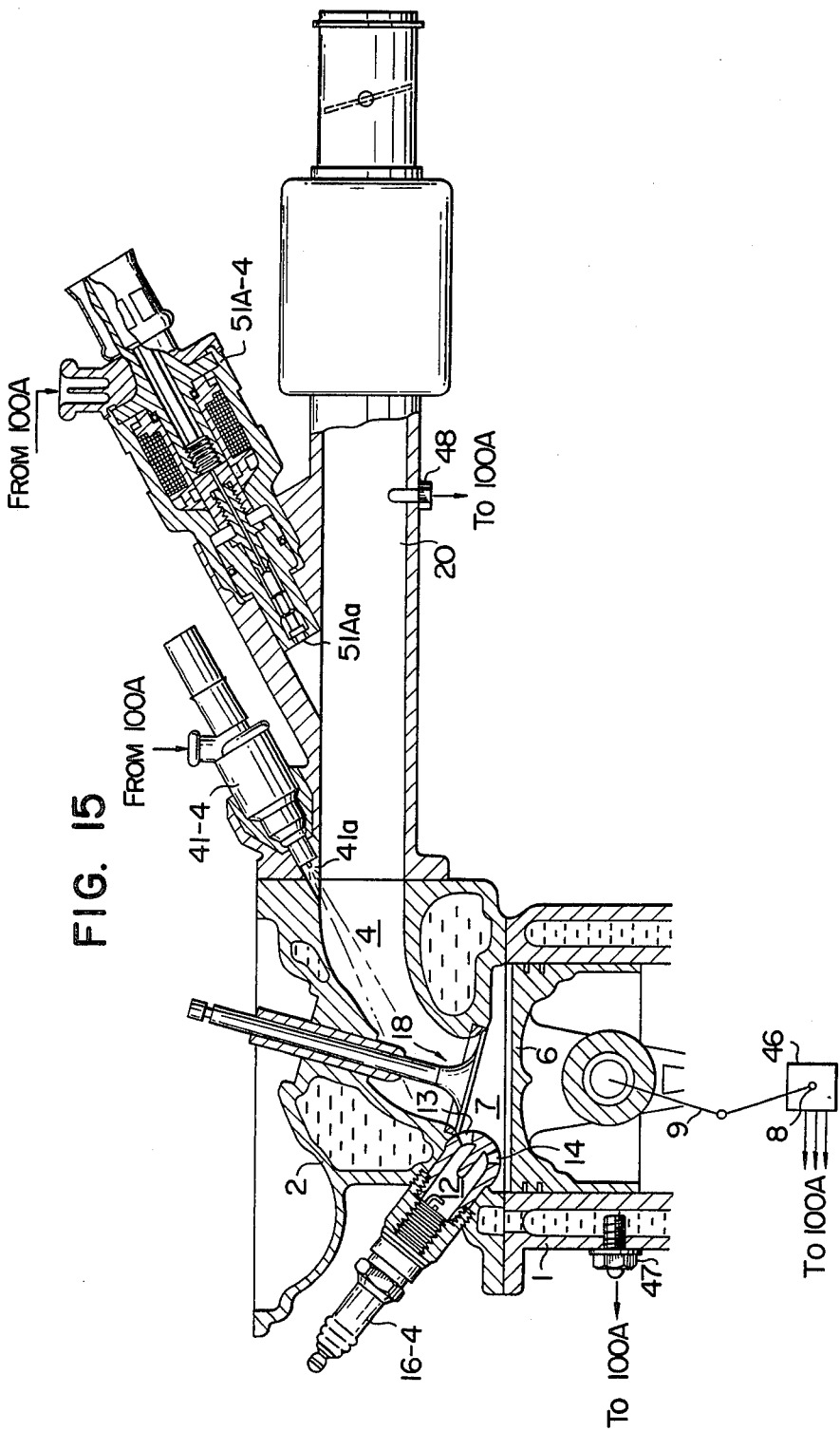

FIG. 15 is a front elevation with a cross-sectional view taken along the line XV — XV of FIG. 14.

Figure 16A:
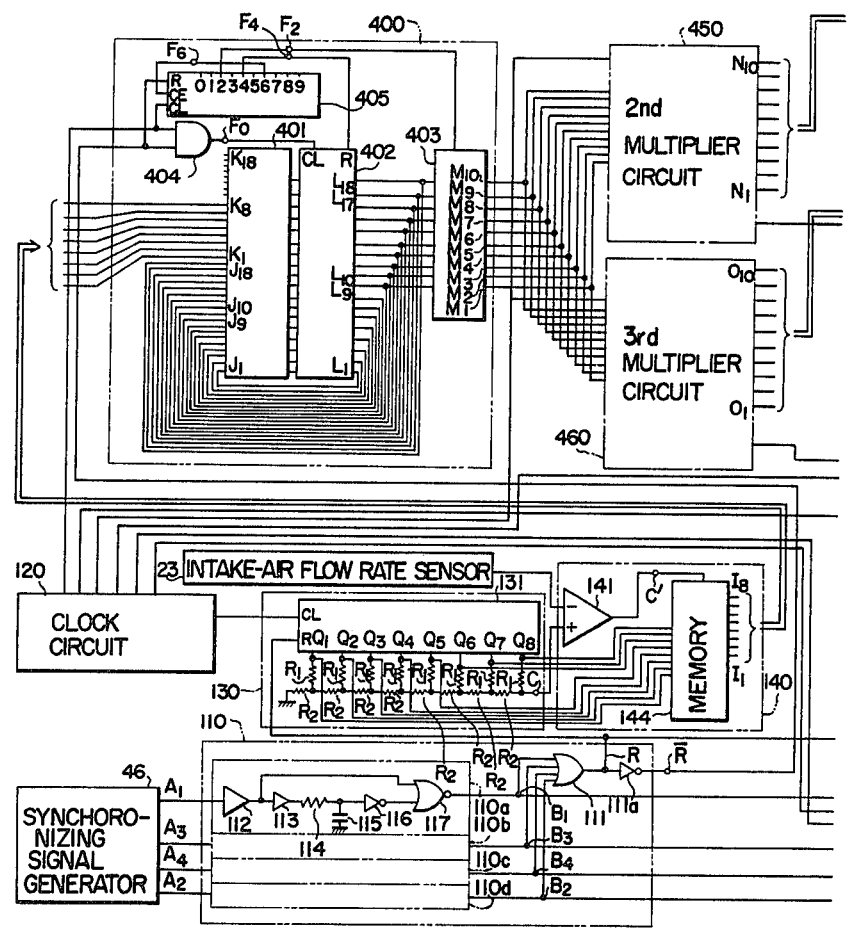
Figure 16B:
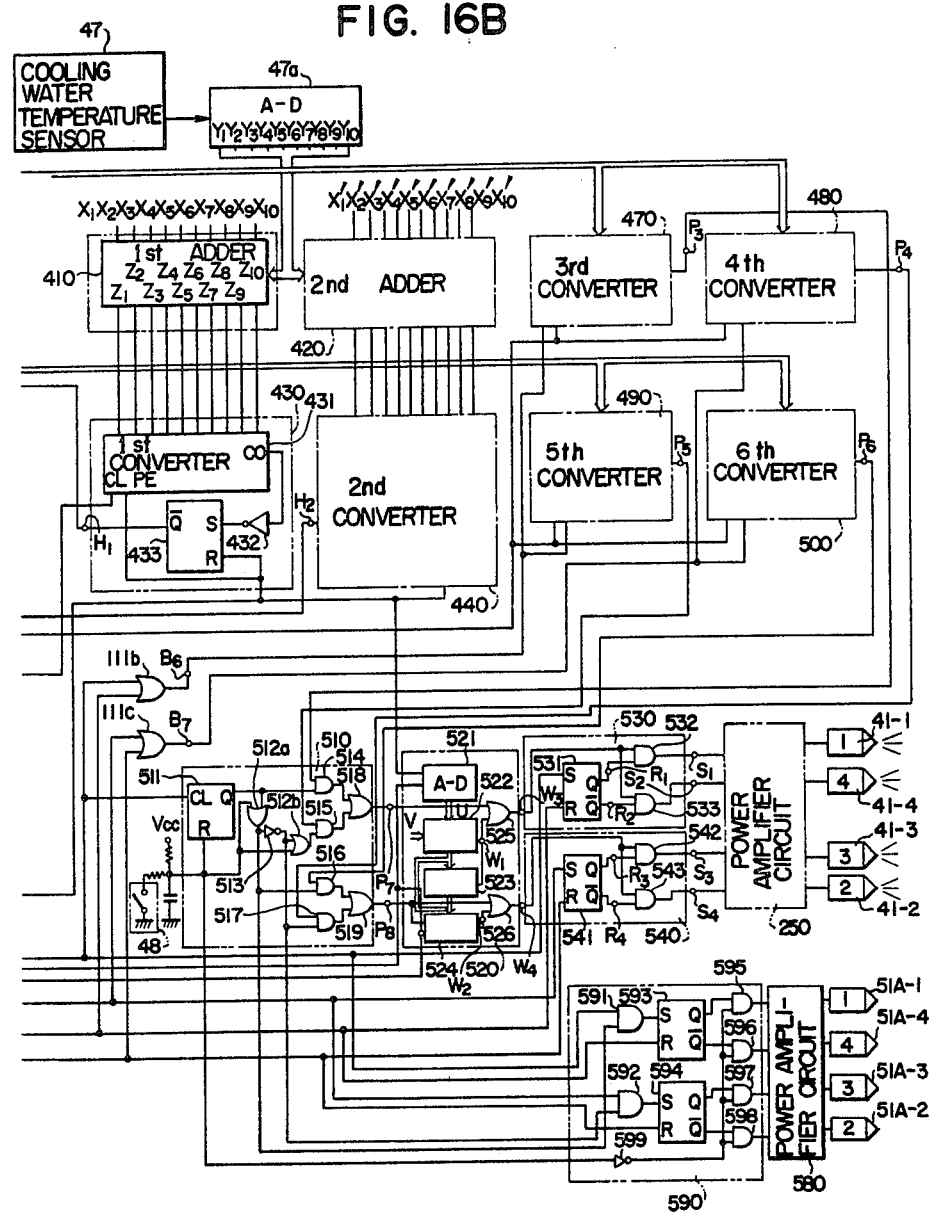

FIGS. 16A and 16B taken together are circuit diagrams of the control unit referred to as 100A in FIG. 14.

Figure 17:
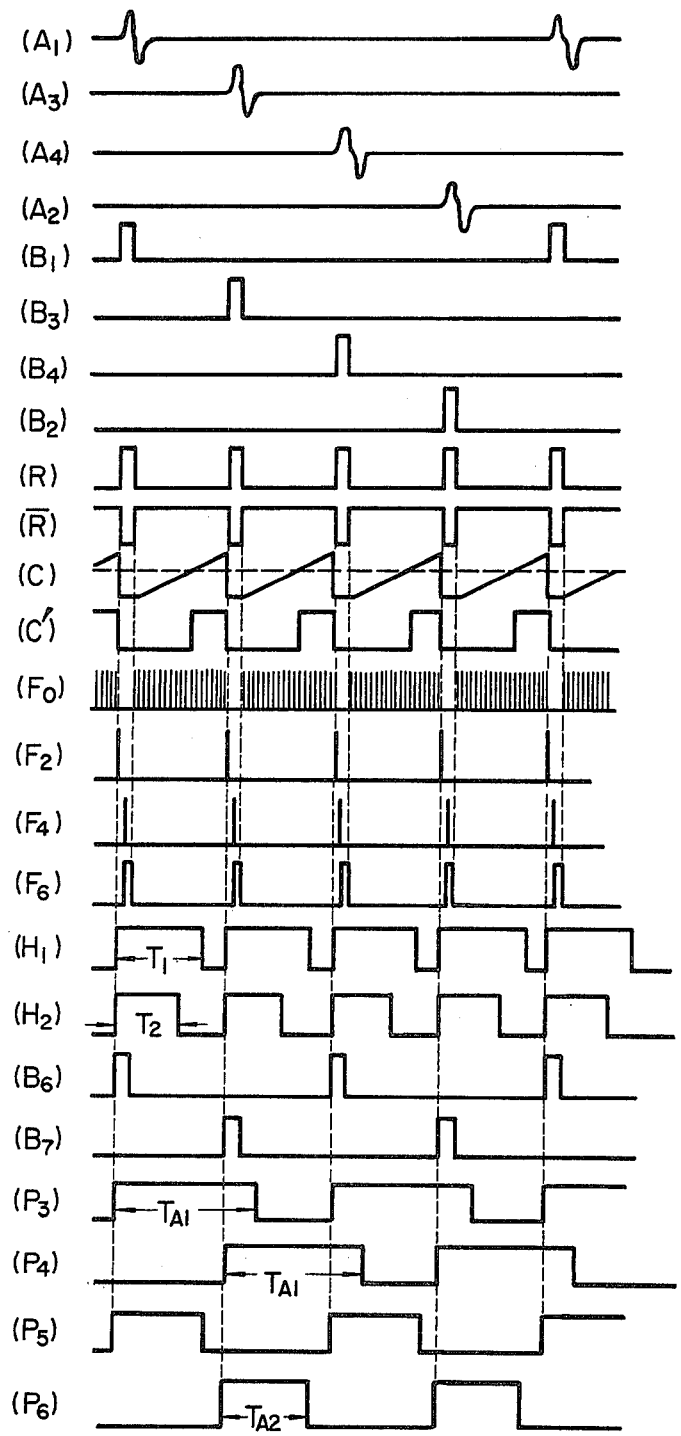
Figure 18:
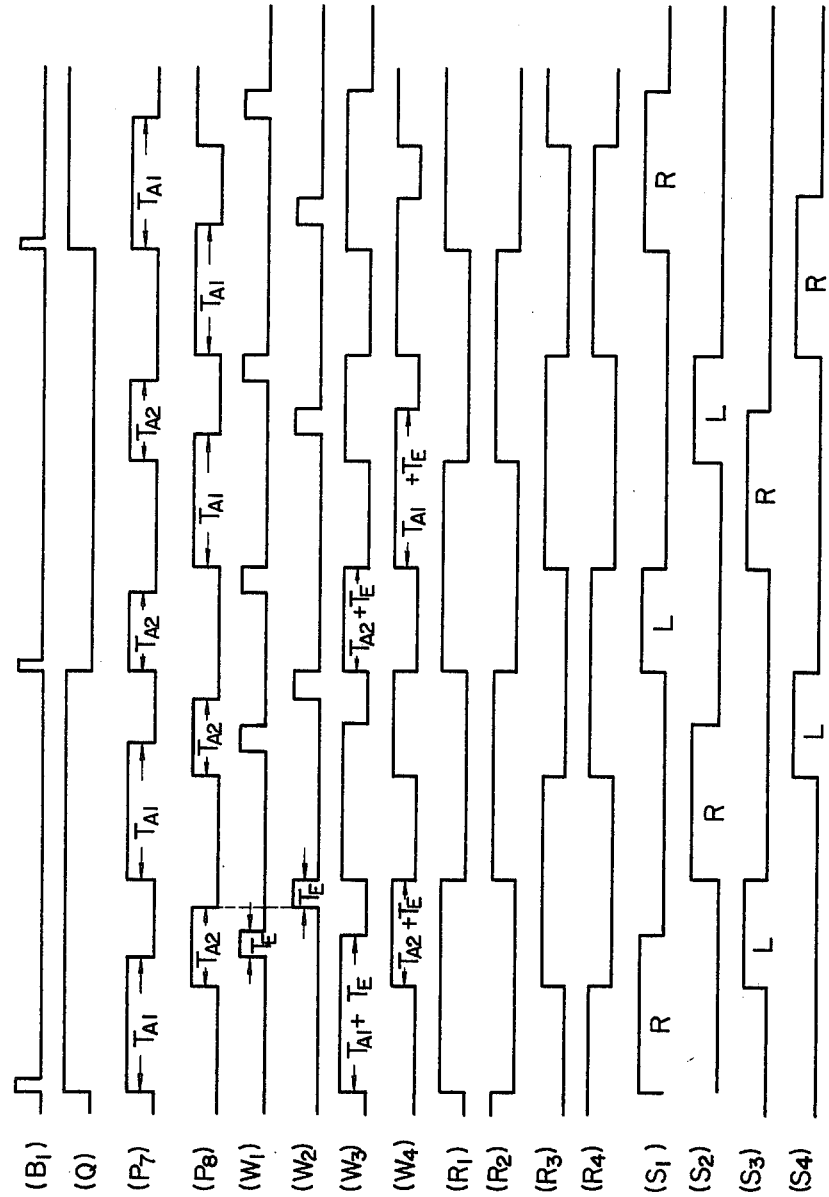

FIGS. 17 and 18 taken together are waveform diagrams showing signal waveforms appearing at various particular points in the circuit of FIGS. 16A and 16B.

Figure 19A:
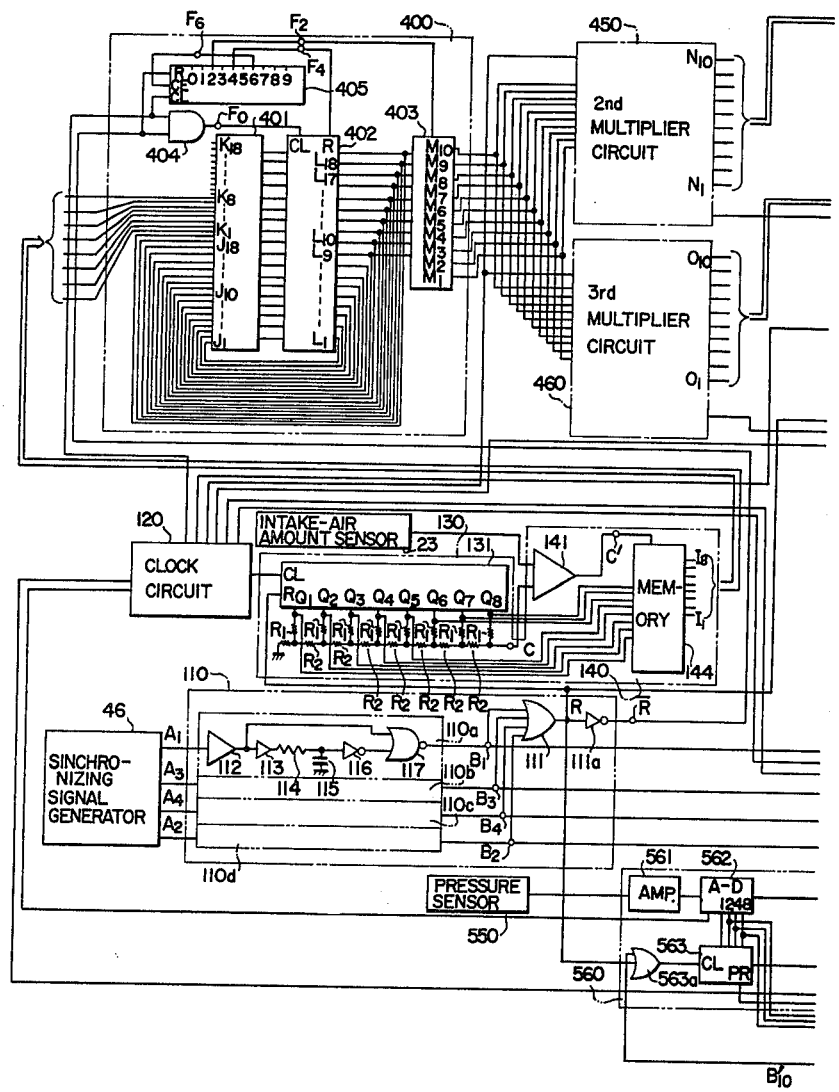
Figure 19B:
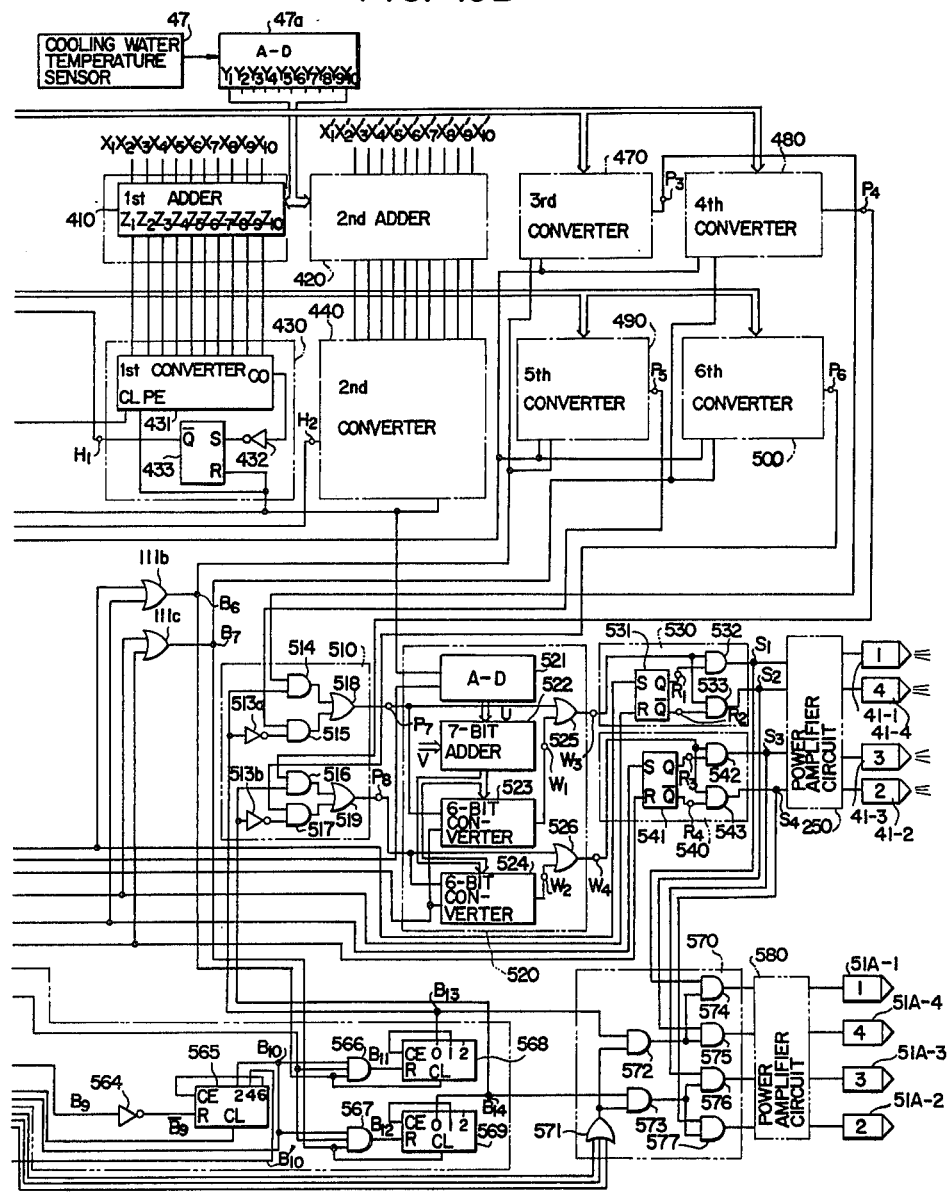

FIGS. 19A and 19B taken together are circuit diagrams of the control unit used in a third embodiment of this invention.

Figure 19C:
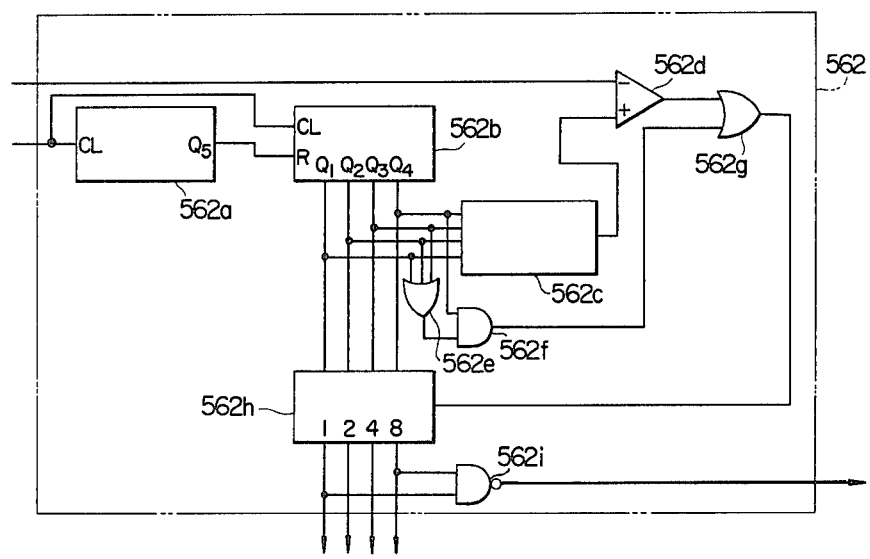

FIG. 19C is a circuit diagram of the A-D converter shown in FIG. 19A.

Figure 20:
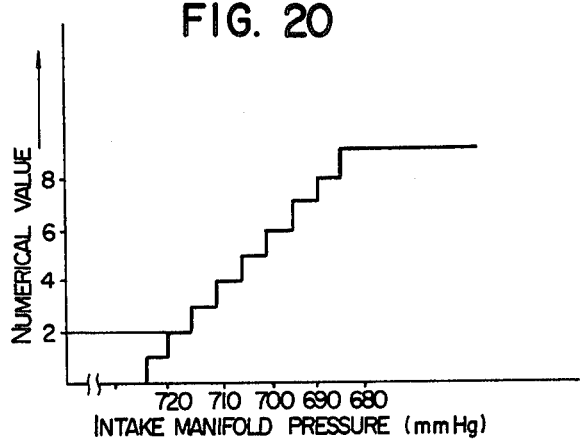

FIG. 20 is a graphical representation of the relationship between the input, which is intake manifold pressure, and the provisional theoritical output, which is a numerical value, of the A-D converter 562 in the circuit shown in FIG. 19B.

Figure 21:
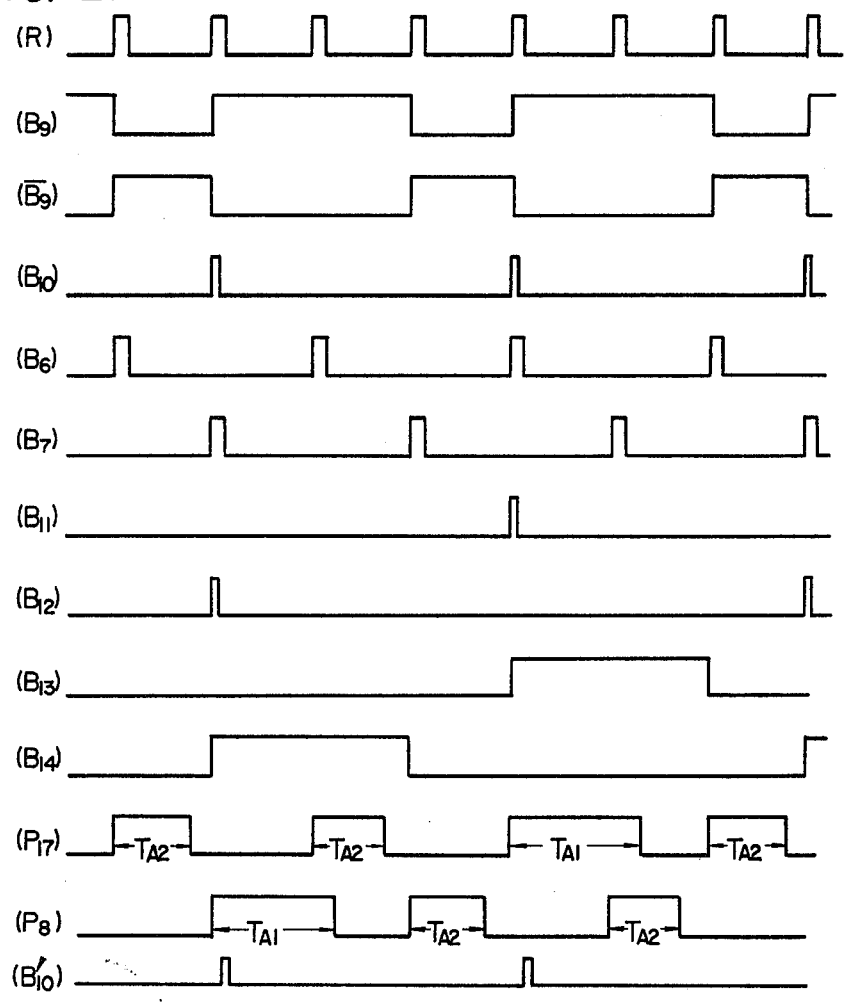

FIG. 21 is a graphical display showing waveforms of signals appearing at various particular points in the circuit of FIGS. 19A and 19B.

Figure 22:
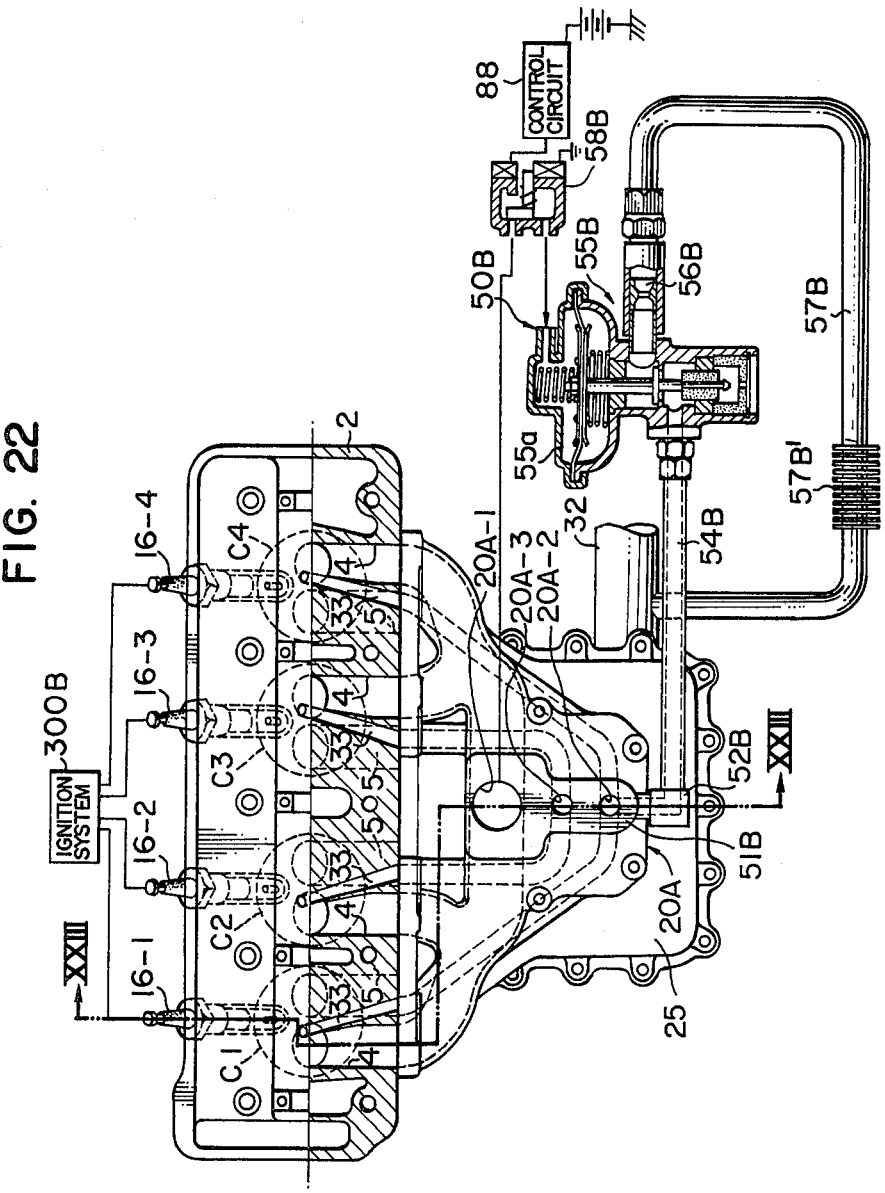

FIG. 22 is a schematic diagram showing a top plan view of the main structure of a 4-cylinder reciprocating engine from which the superstructure including a carburetor, above an intake manifold of the engine has been taken away and a partial cross-sectional elevation of another component of the engine according to a fourth embodiment of this invention.

Figure 23:
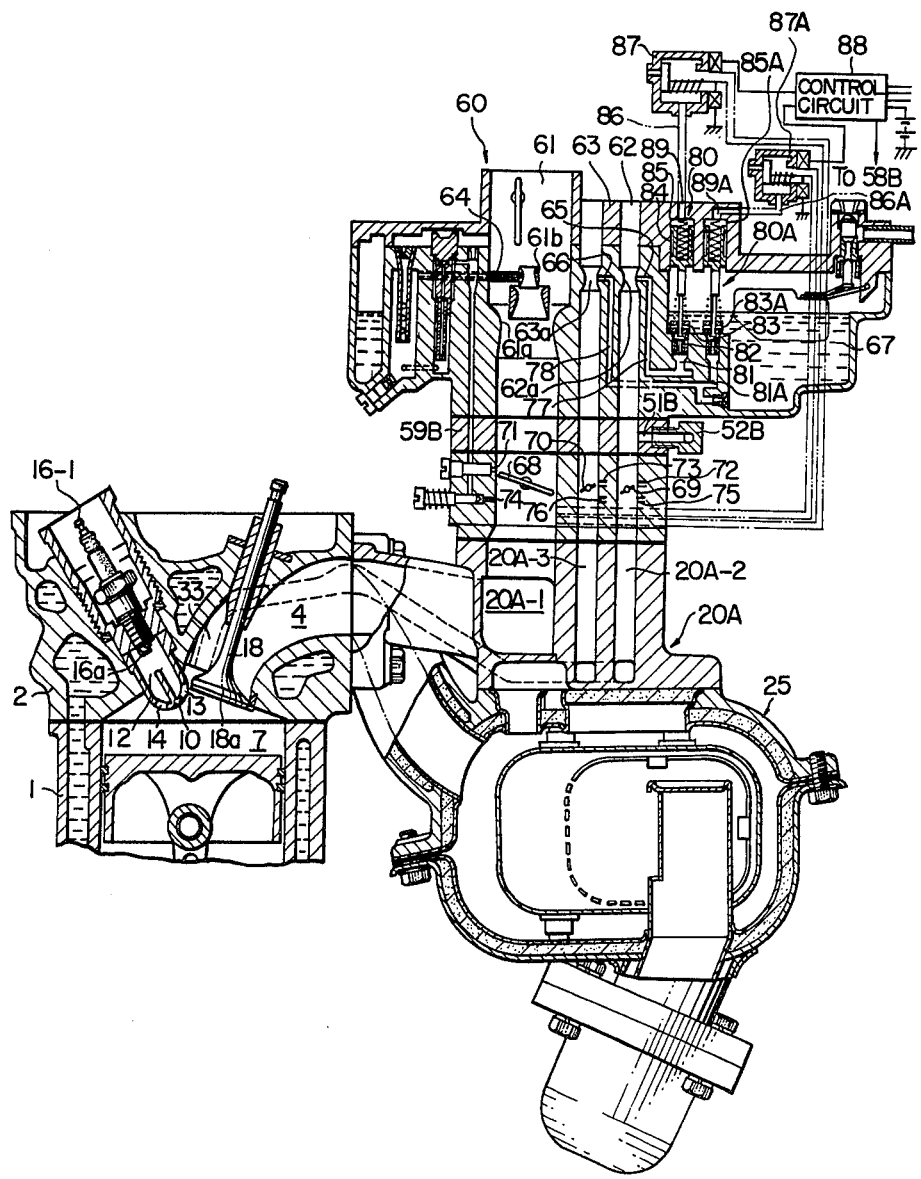

FIG. 23 is a cross-sectional elevation taken along the line XXIII — XXIII of FIG. 22.

Figure 24:
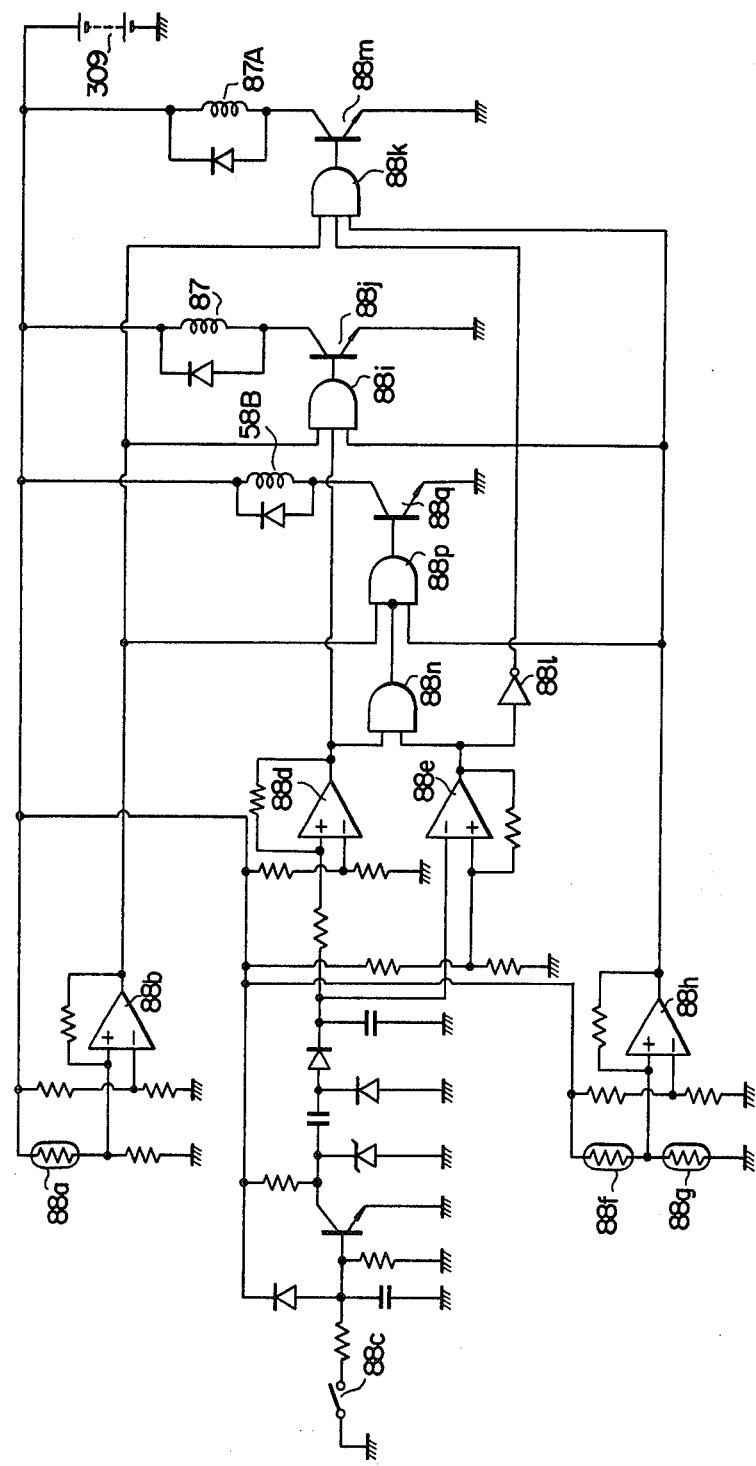

FIG. 24 is a circuit diagram of the control circuit 88 shown in FIGS. 22 and 23.

Figure 25:
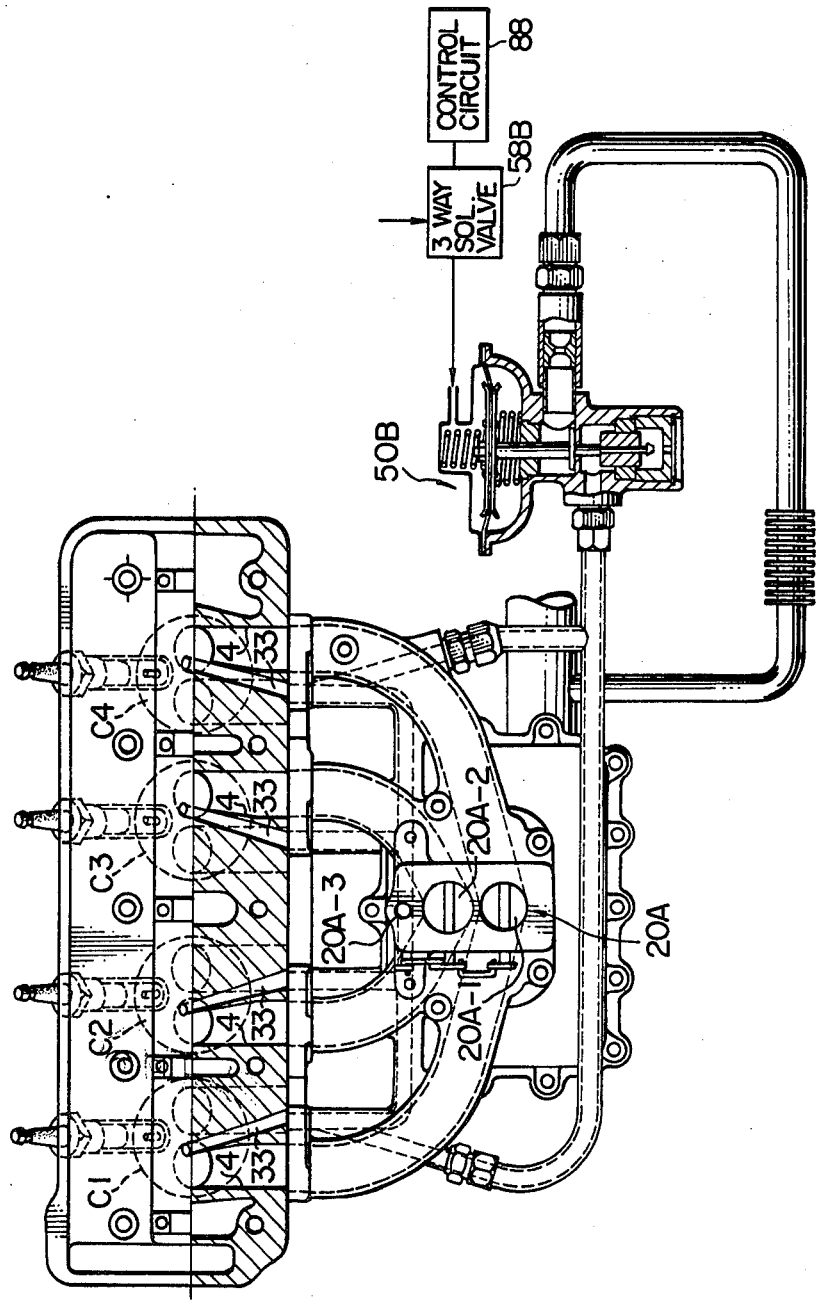

FIG. 25 is a schematic diagram showing a top plan view of the main structure of a 4-cylinder reciprocating engine, from which main structure the superstructure, including a carburetor, above an intake manifold has been taken away and a partial cross-sectional elevation of another component of the engine according to a modification of the fourth embodiment.

Figure 26:
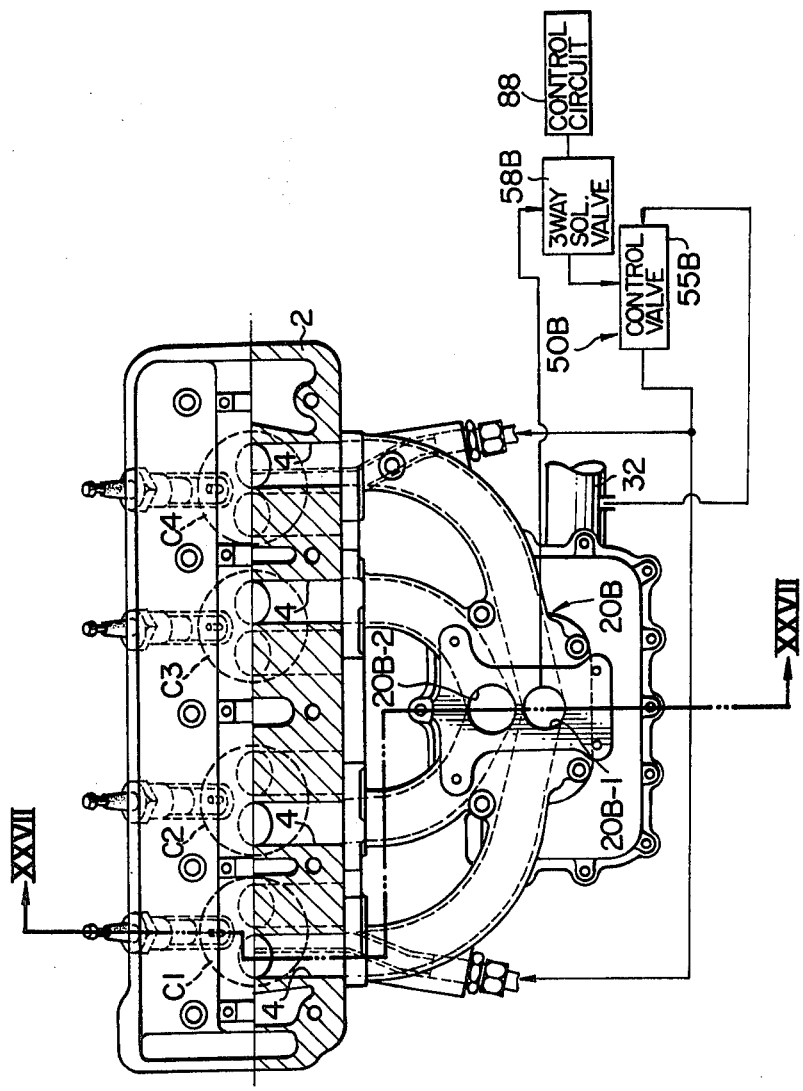

FIG. 26 is a schematic diagram showing a top plan view of the main structure of a 4-cylinder reciprocating engine from which main structure the superstructure, including a carburetor, above an intake manifold has been taken away and a partial cross-sectional elevation of another component of the engine according to a fifth embodiment of this invention.

Figure 27:
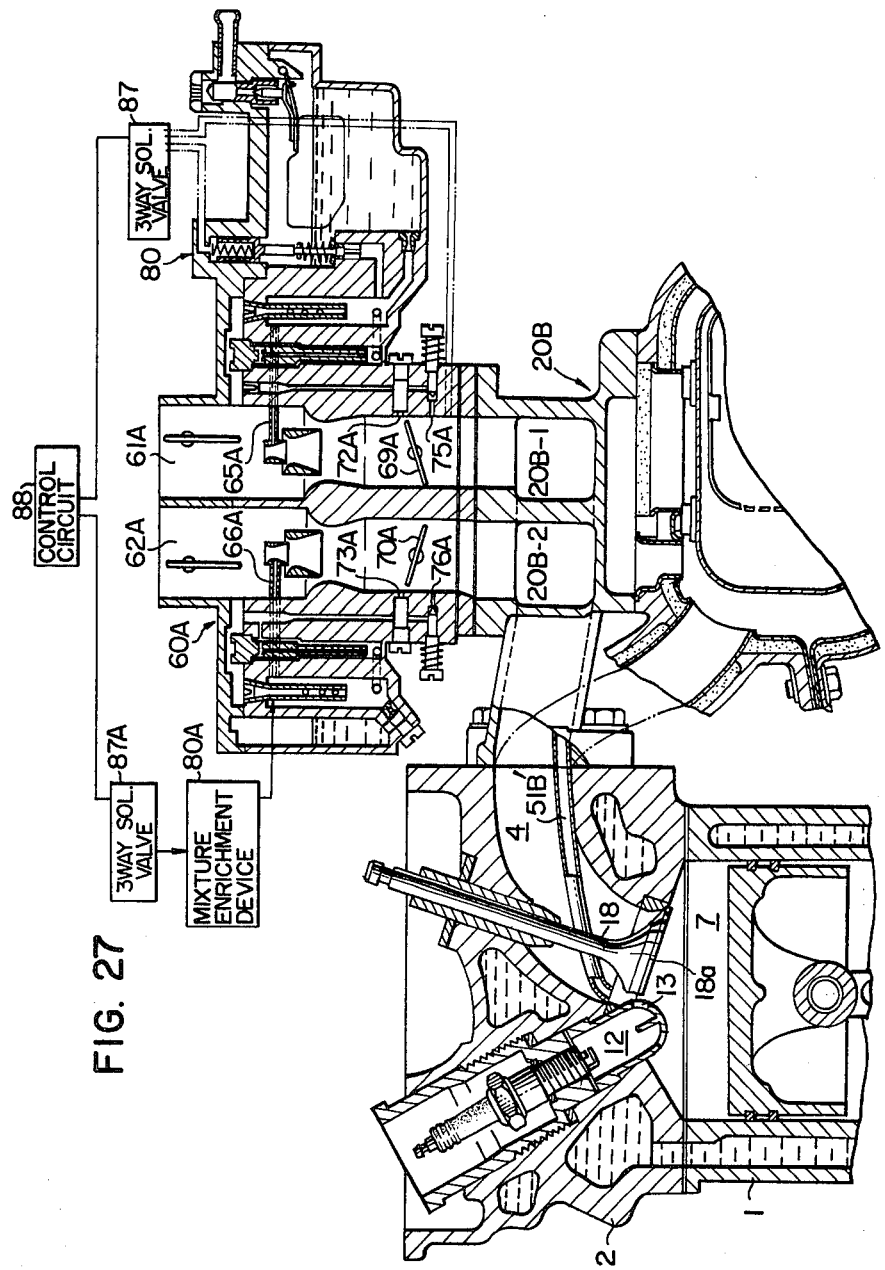

FIG. 27 is a cross-sectional elevation taken along the line XXVII — XXVII of FIG. 26.

Figure 28A:
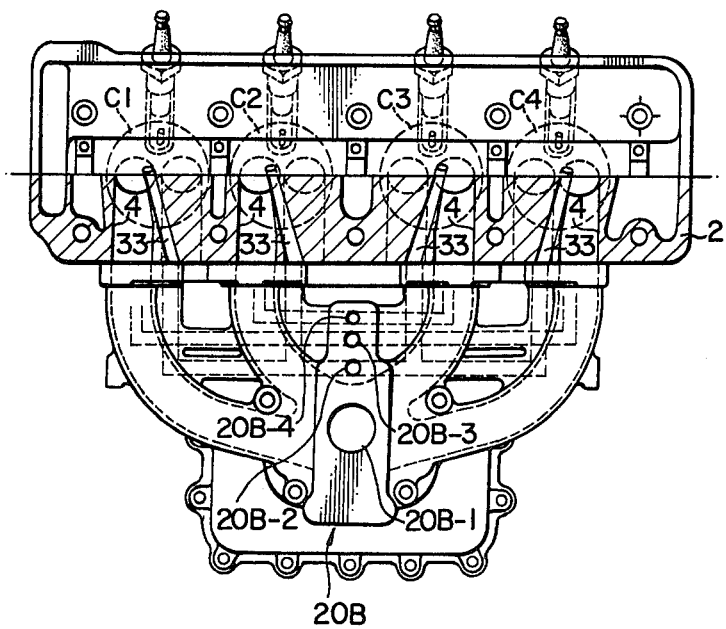

FIG. 28A is a top plan view of the main structure of a 4-cylinder reciprocating engine, from which the superstructure, including a carburetor, above an intake manifold has been taken away, according to a sixth embodiment of this invention.

Figure 28B:
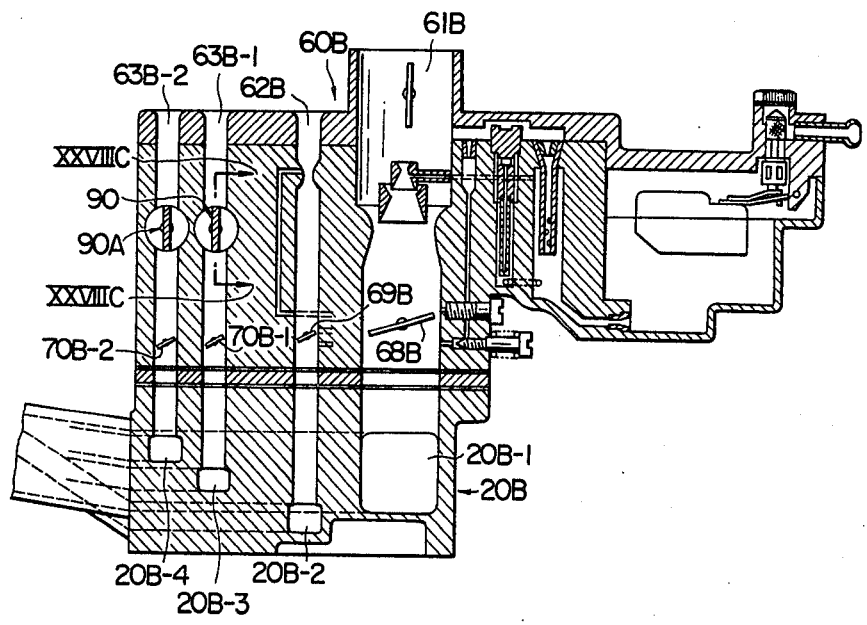

FIG. 28B is a cross-sectional elevation of the carburetor to be mounted on the engine shown in FIG. 28A.

Figure 28C:
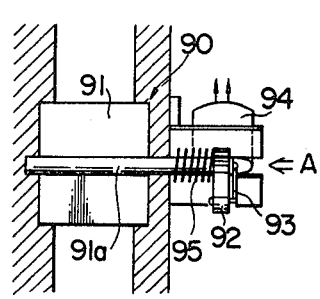
Figure 28D:
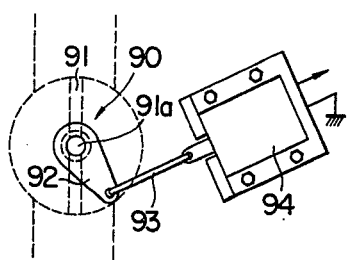

FIGS. 28C and 28D show detailed construction of the interrupting means shown in FIG. 28B.

Figure 29:
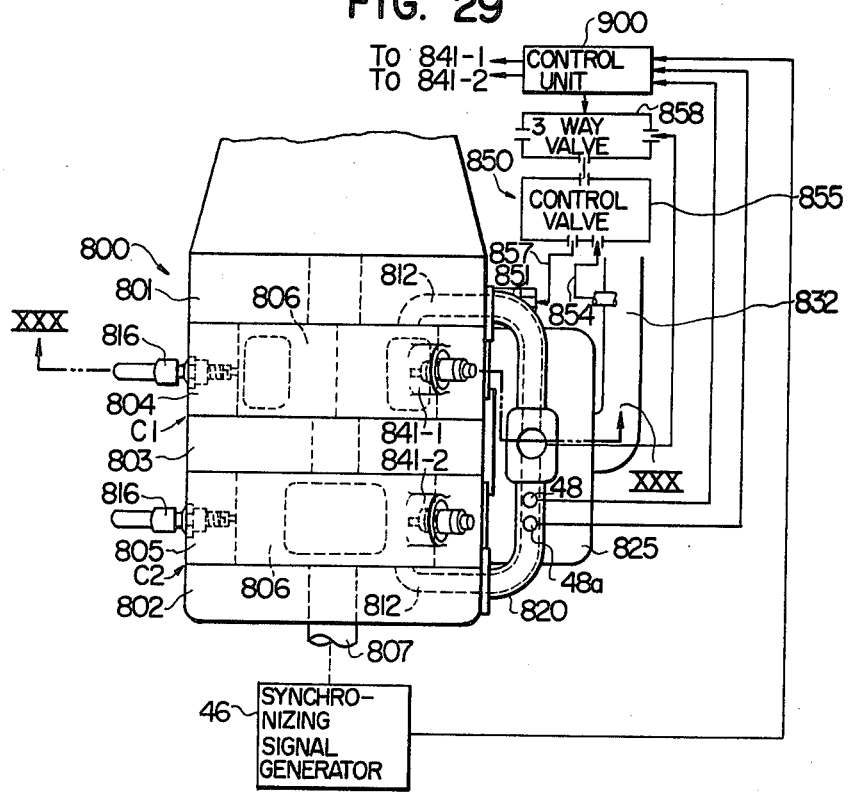

FIG. 29 is a schematic diagram including a plan view of a twin-rotor rotary piston engine according to a seventh embodiment of this invention.

Figure 30:
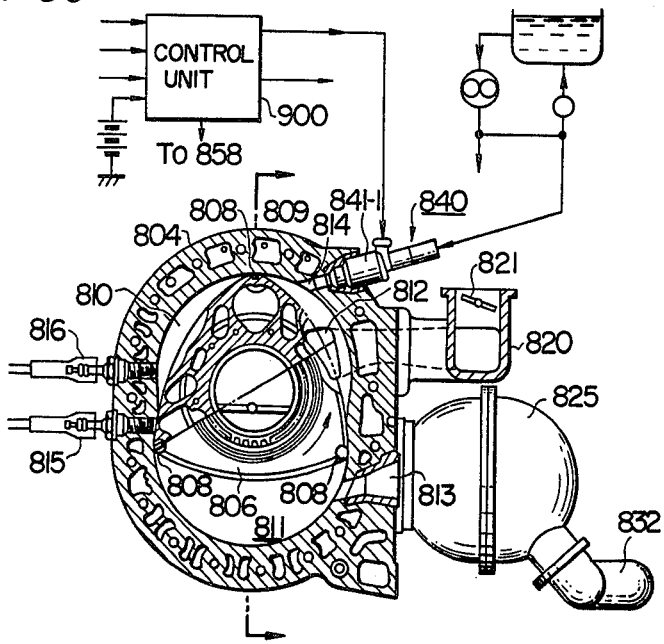

FIG. 30 is a partial cross-sectional elevation taken along the line XXX — XXX of FIG. 29.

Figure 31A:
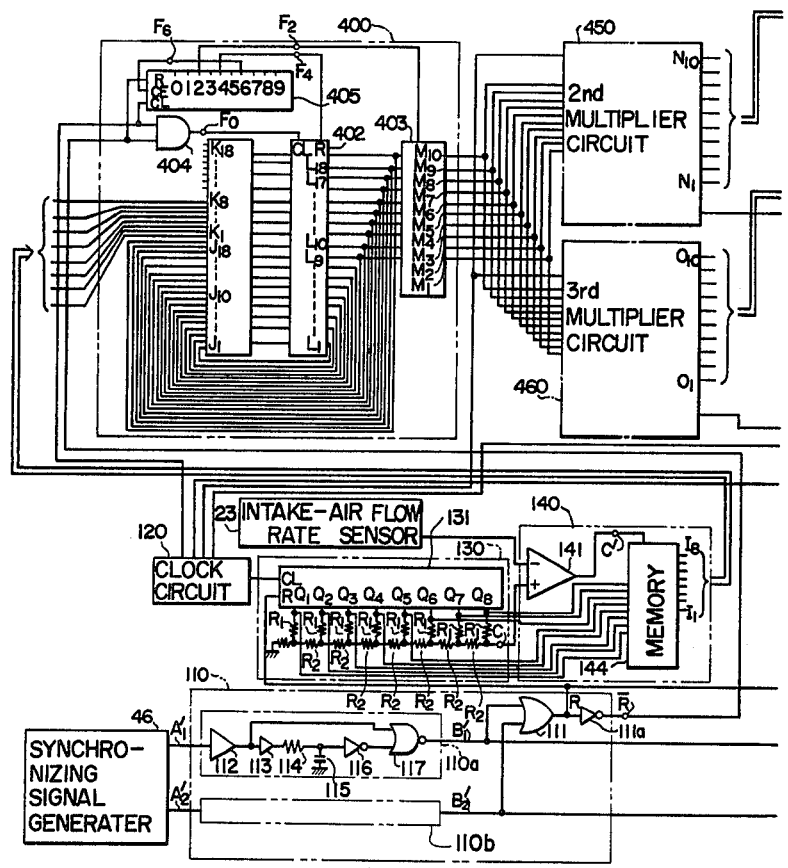

FIGS. 31A and 31B are circuit diagrams of the control unit 900 shown in FIG. 30.

FIG. 32 is a waveform diagram showing signal waveforms appearing at various particular points in the circuit of FIGS. 31A and 31B.

FIG. 33 is a schematic diagram including a plan view of the main structure of a twin rotor rotary piston engine and a cross-sectional elevation of another component of the engine according to an eighth embodiment of this invention.

FIG. 34 is a partial cross-sectional view taken along the line XXXIV — XXXIV of FIG. 33.

Figure 35:
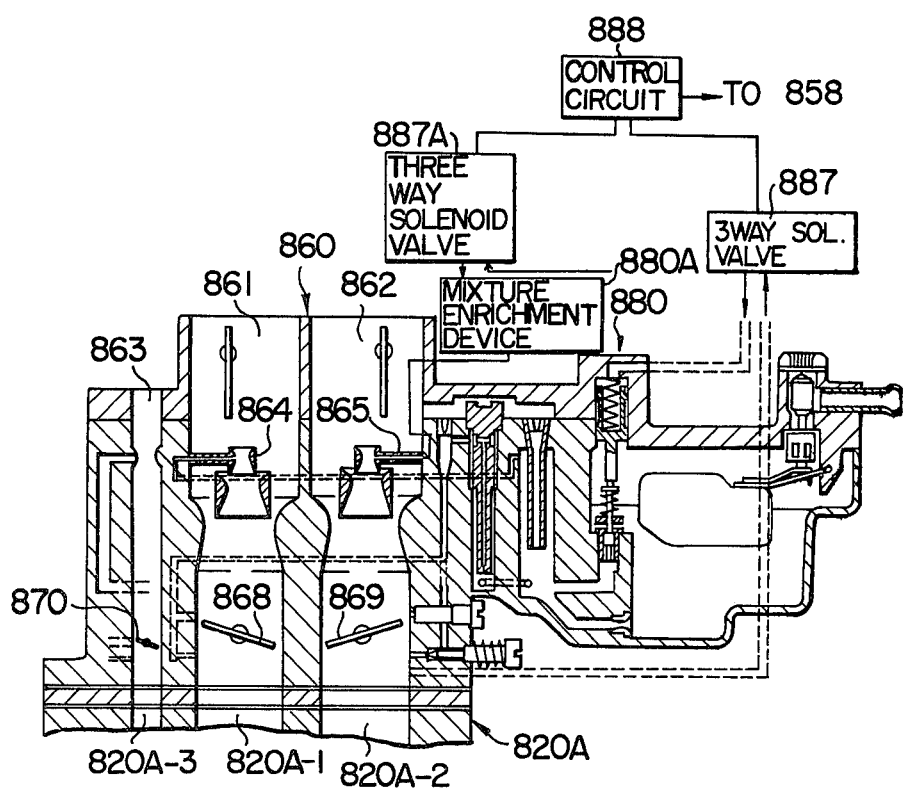

FIG. 35 is a schematic diagram including a cross-sectional elevation of a carburetor 860 for use in the engine shown in FIG. 34.

The United States and Japan have the most stringent final goal for the control of air pollution from motor vehicles in the world but the approach to that goal is different between the two countries as shown in Table 1 below.

|  |  |  | 1975 | '76 | '77 | '78 |
|---|---|---|---|---|---|---|
|  | 49 States |  | 0.94 | ← |  |  |
|  | HC |  |  |  | 0.26 | ← |
|  |  | California | 0.56 | ← |  |  |
| USA |  | 49 States | 9.4 | ← |  |  |
|  | CO |  |  |  | 2.1 | ← |
|  |  | California | 5.6 | ← |  |  |
|  |  | 49 States | 1.9 | ← |  |  |
|  | NOx |  |  |  | 1.25 | 0.25 |
|  |  | California | 1.25 | ← |  |  |
|  | HC |  | 0.25 | ← | ← | ← |
| Japan | CO |  | 2.1 | ← | ← | ← |
|  | NOx | * ≦1ton | 1.2 | 0.6 | ← | 0.25 |
|  |  | * >1ton | 1.2 | 0.85 | ← |  |

As seen from Table 1 the standards become progressively more stringent on a timewise step by step basis.

In the United States, moreover, energy saving is becoming one of the national goals such that the motor vehicle manufacturers are being requested to manufacture motor vehicles which consume little fuel.

With conventional engines, in general, as the air-fuel charge supplied to the engines becomes leaner, misfiring occurs in the engine and the combustion of the lean air-fuel charge becomes impossible.

Such a misfiring limit exists at the air-fuel ratio of the charge between 17 and 18. If the stratified charge engines or torch engines are used, a smooth operation of the engines supplied with an air-fuel charge leaner than 18 is possible.

FIG. 1A shows exemplary characteristics of conventional reciprocating engines and torch ignition reciprocating engines under a typical operational condition. The characteristics of the torch ignition reciprocating engines are summarized as follows:

(1) The emission of nitrogen oxides from the engines takes the maximum value when the air-fuel ratio of the air-fuel charge is around 16 and decreases rapidly as the air-fuel ratio becomes lower or higher than 16.

(2) The emission of hydrocarbons from the engines gradually decreases as the air-fuel ratio increases to 19 and then slightly increases as the air-fuel ratio goes over 19.

(3) The emission of carbon monoxide from the engines rapidly decreases as the air-fuel ratio approaches 16 from the richer side and becomes constant when the air-fuel ratio is over 16.

(4) The output torque of the engines considerably decreases as the air-fuel ratio increases.

(5) The fuel consumption rate takes a minimum value around the air-fuel ratio of 16. It increases considerably as the air-fuel ratio becomes remote from 16. The rate of increase becomes high as the air-fuel ratio becomes higher over 16.

(6) If a portion of the exhaust gases from the engine is recirculated to the combustion chamber of the engine, over the entire range of air-fuel ratios, the emission of nitrogen oxides and the output torque decrease and the fuel consumption rate increases relative to the case where the exhaust gases recirculation is not effected.

The values described in the above statements change a little bit according to the operational condition of the engine, that is, the curves in FIG. 1A shift a little to the left or right according to the operational condition of the engine.

Comparison of the characteristics of conventional reciprocating engines and torch ignition reciprocating engines, especially in view of the above statements (1)

to (6) reveals that if the air pollution control standards for nitrogen oxides, hydrocarbons and carbon monoxide become very stringent at the same time, one of the most effective solutions seems to be a lean operation, as mentioned in the background of the invention.

FIG. 1B shows exemplary characteristics of conventional rotary engines and stratified charge rotary engines under a typical operational condition.

It is understood from FIG. 1B that the above statements (1) to (6) are true of stratified charge rotary engines, except that the characteristics of the emission of hydrocarbons from the engines are a little different between torch ignition reciprocating engines and stratified charge rotary engines.

The distinguishing features of rotary engines as compared with reciprocating engines are that the emission of nitrogen oxides from the rotary engines is, in general, small and that the emission of hydrocarbons from the rotary engines is, in general, large.

The peak of the emission of nitrogen oxides of the stratified charge rotary engine in FIG. 1B shifts to the right or left, if the distribution pattern of the richer and leaner portions of the air-fuel charge within a working chamber changes.

It is clear from FIG. 1B that the former statement that one of the most effective solutions seems to be a lean operation if the air pollution control standards for nitrogen oxides, hydrocarbons and carbon monoxide become very stringent at the same time is true not only of reciprocating engines but also of rotary engines.

As the rich operation produces more torque and, in consequence, more power, as seen from FIGS. 1A and 1B, the prior art lean operation engine usually have, to meet high engine power demand at a high engine speed, a mechanism to change the operation of all of the combustion chambers to the rich operation in the range of the high engine power demand at the high engine speeds the reason of the change to the rich operation becoming clearer later. The prior art lean operation engine always maintained a lean operation except in the range of the high power demand at high engine speeds. The deterioration of torque and, in consequence, power of prior art lean operation engines which usually received an air-fuel charge having an air-fuel ratio greater than 18, in case of reciprocating engines, and 17, in case of rotary engines as compared with conventional reciprocating engines which usually operate in the air-fuel ratio range between 13 and 17 and with conventional rotary engines which usually operate in an air-fuel ratio range between 12 and 15 can be easily seen from FIGS. 1A and 1B. Therefore, to cope with the deterioration of driveability and the other unsatisfactory high power demand characteristics the only solution for the prior art lean operation engine was hitherto to make th engine bigger, that is, to increase the engine displacement. The increase of engine displacement causes additional disadvantages which are:

(1) The vehicle becomes heavier, which necessitates more engine power;
(2) The emitted quantity of the exhause gases increases, which causes more pollution; and
(3) The fuel consumption rate increases to a very high level.

The above disadvantages affect each other resulting in a deterioration in the fuel consumption rate for a lean operation engine so that additional displacement is not practical in the motor vehicles. The conventional engine burns in the combustion chamber an air-fuel charge leaner than stoichiometric to save fuel when the engine power demand is not high and adds additional fuel to the combustion chamber to burn a richer air-fuel charge to increase power when the engine power demand becomes high.

The purpose of this invention is to provide with an engine which is fundamentally a lean operation engine and which can overcome the aforementioned disadvantages of the prior art lean operation engine without increasing the engine displacement.

The engine according to this invention takes a similar operational pattern to the conventional engine, that is, the engine according to this invention operates on a lean charge when the enging power demand is not high and adds additional fuel to the combustion chamber to provide a rich operation to increase power only when the engine power demand is high. The supply of the additional fuel must be done with a precaution to retain the emission of nitrogen oxides, hydrocarbons and carbon monoxide within the limits set by the air pollution control regulation standards. It is, therefore, first necessary to study when and how to supply the additional fuel to the combustion chamber of lean operation.

To analyze how and when the additional fuel must be added, first it is necessary to take a look at the relation of the engine power demand with engine characteristics, the drive pattern and environmental factors. These relations are shown in Table 2.

Table 2

| Engine power demand level | | Low | Medium | High engine speed | Other speeds |
|---|---|---|---|---|---|
| Emitted quantity of exhaust gases (Q) | | S | M | L | L |
| Town drive | Frequency of power demand level in a typical drive pattern (F) | L | L | S | M |
| | Product of Q and F (QF) | M | L | S | L |
| | Influence of QF on the environmental damage (EQF) | L | L | S | L |
| Intercity high-speed highway drive | F | S | L | L | L |
| | QF | S | L | L | L |
| | EQF | S | S | S | S |
| Intracity high-speed highway drive | F | L | L | S | L |
| | QF | M | L | S | L |
| | EQF | L | L | S | L |

Note (1) S: SmallM: MediumL: Large
Note (2)

Table 2-continued

| Engine power demand level | Low | Medium | High engine speed | Other speeds |
|---|---|---|---|---|
| Drive category | | Influence of air pollutants on the environmental damage(E) | | |
| Town drive | | L | | |
| Intercity high-speed highway drive | | S | | |
| Intracity high-speed highway drive | | L | | |

As shown in Table 2, the quantity of exhaust gases emitted from the engine becomes large as the engine power demand level increases. In town drives, low and medium power level are frequently demanded but high power level at high engine speed is rarely demanded. High power levels at other speeds are relatively often demanded. In town drives, the influence of air pollutants on the environmental damage is large. As a result, in town drives, the influence of low and medium power demand levels and of high power demand levels at speeds lower than the high engine speed in causing environmental damage is large because QF in Table 2 is large or medium, but that of high power demand level at the high engine speed is small because QF is small.

On the other hand, in intercity high speed highway drives, the low power level is infrequently demanded but medium and high power levels are frequently demanded. The medium power level is mainly required for cruising on a level road.

As intercity high speed highways are, in general, located in the countryside and as the influence of air pollutants on environmental damage on the countryside is small, the influence of low, medium and high power demand levels in causing environmental damage in intercity high speed highway driving is small.

In intracity high-speed highway driving, vehicle speeds are mainly at low and medium speeds, because intracity high-speed highways have relatively lower speed limits and because traffic stagnations occur in rush hours. The engine power demand in intracity high-speed highway driving differs greatly according to the traffic time zone in a day, but as a whole low and medium power levels as well as high power level which is required at the engine speed lower than the high engine speed are frequently damanded. In consequence, in intracity high-speed highway driving, as shown in Table 2, the influence of high power demand levels at high engine speeds in causing environmental damage is small, but the influence of high power demand at engine speeds lower than high engine speeds as well as low and medium power demand levels on the environmental damage is large.

Rich operation is necessary to meet the high engine power demand. The medium engine power demand may also require a rich operation depending on the engine and its mode of use.

The study of Table 2, especially of the row of EQF on town driving and intracity high-speed highway drive shows the aforementioned precaution must be paid to the rich operation for the medium power demand level and for the high power demand level at engine speeds lower than the high speed.

From the practical point of view how and when to perform rich operations are decided, with the above-mentioned matters as shown in Table 2 in mind, with reference to the pollutant emission test modes and the air pollution control regulation standards.

Figure 2:
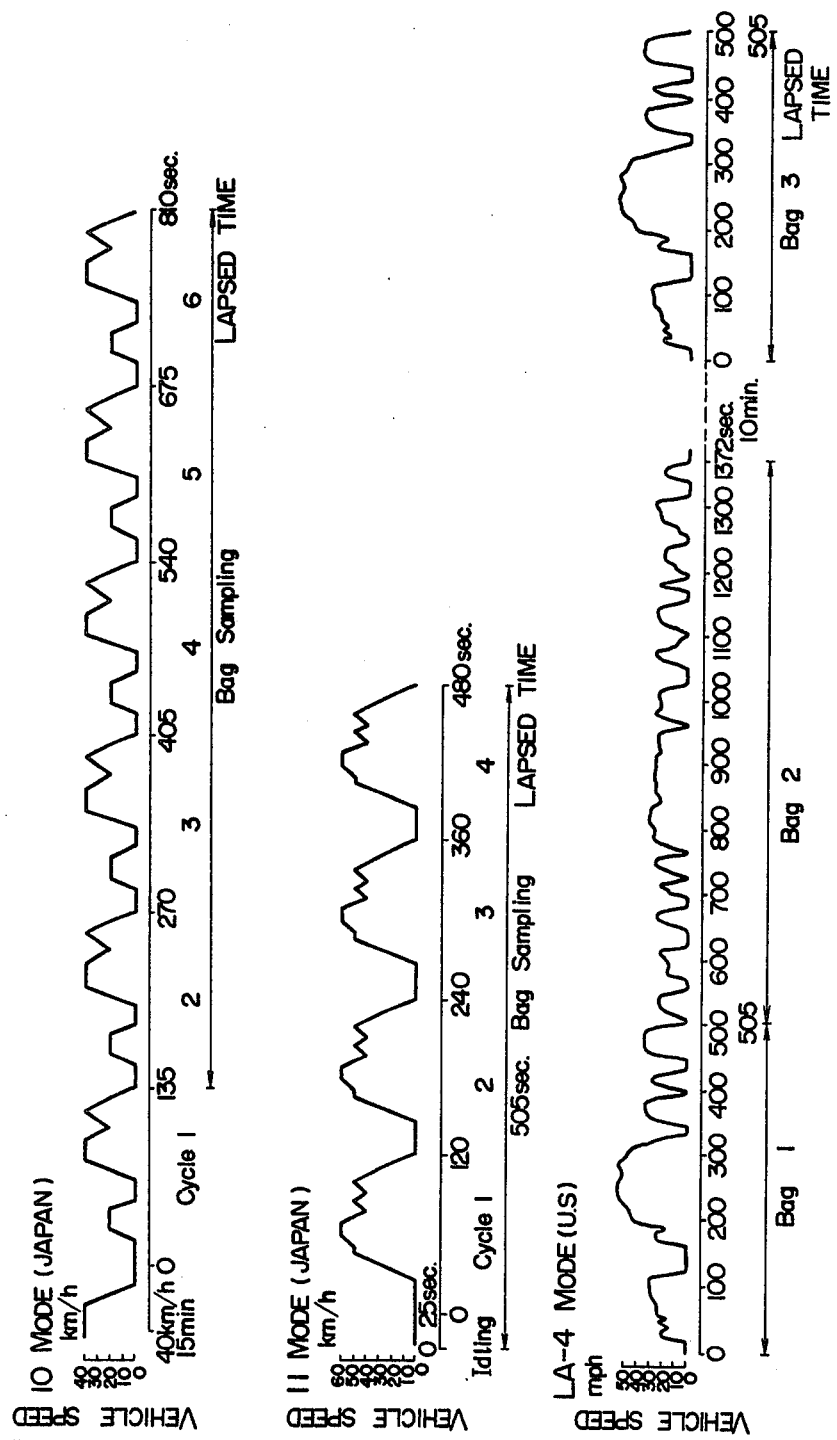
FIG. 2 shows diagrams showing test drive patterns (vehicle speeds-lapsed time relation) and time of sampling specified by the Japanese 10 and 11 test modes and the United States LA-4 test mode.

The pollutant emission test modes are e.g. the LA-4 mode of the United States, and the 10 mode and 11 mode of Japan which are respectively shown in FIG. 2 and which specify vehicle speeds of the test vehicle with regard to lapsed time.

In LA-4 and Japanese 10 modes, the test vehicles run on a chassis dynamometer according to the drive pattern set by the modes. The exhaust gases emitted from the vehicle are collected in bags to measure weights of pollutants. The mean emission of the pollutants expressed in terms of g/mile or g/km and calculated according to the predetermined formulae must not exceed the limits set by the standards, respectively.

In the Japanese 11 mode, the test vehicles run also on a chassis dynamometer according to the drive pattern set by the mode, and the emission of nitrogen oxides, hydrocarbons and carbon monoxide each expressed in terms of g/test must not exceed the limits set by the standards which limits are not shown in Table 1.

From the foregoing, it is understood that the emission of pollutants which are caused by the rich operation at a combination of a certain engine power level with a certain engine speed level which often appears in the test mode drive pattern must be suppressed, but that, on the other hand, the emission of pollutants caused by the rich operation at another combination of another engine power level with another engine speed level not be supressed.

The engine for motor vehicles must be so designed and constructed that it can produce high engine power for emergency use for the safety of a driver and a passenger. The high engine power for emergency use is required e.g. for a sudden acceleration to escape an accident or for climbing up a very steep slope. The high engine power for emergency use is so rarely required that such a high power is not required in the test mode drive patterns, that is, the combination of engine power level and engine speed level which reproduces the emergency case does not appear in the test mode drive patterns. The prior art lean operation engine produces such a rarely required high power for emergency use by changing operations of all combustion chambers from the lean operation to the rich operation. If the prior art lean operation engine is not so constructed to do such changing, the displacement of the engine must become very large so as to produce high engine power for emergency use.

It is relatively easy to oxidize hydrocarbons and carbon monoxide emitted from the combustion chamber, but is is difficult to reduce nitrogen oxides emitted from the combustion chambers. Therefore, it is wise to suppress the formation of nitrogen oxides in the combustion chamber but to tolerate the formation of unburned hydrocarbons and carbon monoxide in the combustion chamber and to afterburn the unburned hydrocarbons and carbon monoxide.

Therefore, when the rich operation and the lean operation coexist in series, (1) the formation of nitrogen oxides is suppressed by the rich operation and the lean operation because, as shown in FIG. 1 and as already mentioned, the nitrogen oxides formation is low in the rich operation and also in the lean operation, and (2) unburned hydrocarbons and carbon monoxide formed by the rich operation are oxidized by surplus oxidizing of the lean operation.

This kind of idea is old in the art and is disclosed in e.g. Society of Automotive Engineers paper 720,736.

In a typical kind of engine according to this invention, the fundamental operation of the engine is a lean operation, e.g. when the vehicle is cruising at 100 km/h (62.5 mile/h) on a level road, all of the combustion chambers are in a lean operation. When the upper medium power, e.g. necessary to meet a low engine speed, high torque requirement for a low vehicle speed acceleration, or high power, e.g. necessary to meet a medium engine speed, high torque requirement for a medium vehicle speed acceleration, is demanded, the additional fuel is added to a suitable number of the combustion chambers. Further when high power is demanded at high engine speeds, e.g. for emergency use, all of the combustion chambers operate on a rich operation.

The idea that only some of the combustion chambers produce power at partial loads and that all of the combustion chambers produce power at high engine power demand is already known as a "split" engine in the art, e.g. the U.S. Pat. No. 2,918,047.

The idea that a low engine power demand (1) only some of the combustion chambers produce power and (2) the remaining combustion chambers simply pump air and (3) hydrocarbons and carbon monoxide emitted from the combustion chambers are afterburned by help of the pumped air and that at higher engine power demand all of the combustion chambers produce power is already known in the art as illustrated by the U.S. Pat. No. 3,192,706.

As mentioned before, when the rich operation is made in some of the combustion chambers at a combination of an engine power demand level with an engine speed level which frequently appears in the emission test modes, the emission of pollutants must be retained within predetermined limits. In this case, since hydrocarbons and carbon monoxide can be diminished by surplus oxidizing of the lean operation fuel of the nitrogen oxides formation must be supressed. One of the most important features of this invention is that when additional fuel is supplied to the rich operation combustion chambers, the formation of nitrogen oxides is positively suppressed by the adoption of appropriate countermeasures.

The first countermeasure is exhause gas recirculation. When the exhaust gases are recirculated to the rich operation combustion chambers, the combustion temperature is lowered whereby the formation of nitrogen oxides is subdued.

The second countermeasure is the adoption of torch engines. Torch engines have a trap chamber or a pre-combustion chamber in each of the combustion chambers. When a rich operation is made in the combustion chamber with a trap or pre-combustion chamber, the nitrogen oxides formation is subdued, because of the torch effect of the trap or pre-combustion chamber.

In the case of rotary engines, the formation of nitrogen oxides during a rich operation is low as compared with the conventional reciprocating engine because the combustion temperature of the rotary engine is inherently low. Therefore, the adoption of a rotary engine as a fundamentally lean operation engine can be said to be the third countermeasure.

The fourth countermeasure is the adoption of fuel injection nozzles each disposed in each intake port of each of the combustion chambers of the reciprocating engine. When the formation of nitrogen oxides is critical because of a combination of an engine power level with a certain engine speed in which combination the rich operation is made and because of the stringent standards, the number of times in which the rich operation is made in a certain series of sequential combustion chances of the engine should be reduced to one rich operation for every certain number of sequential combustion chances of the engine. The fuel injection nozzles each disposed in each intake port enables this kind of operation.

The fuel injection nozzle can be disposed, if wanted, directly in the combustion chamber to do a direct fuel injection rather than disposed in the intake port as above. But in case of direct fuel injection, the production cost of the engine becomes high because, for example, the nozzle must be constructed with heat-resisting material so that it can withstand high temperatures within the combustion chambers.

The similar countermeasure can be taken, in case of a rotary engine, with the adoption of a fuel injection nozzle disposed in a rotary housing.

A carburetor or carburetors can be usable in an engine according to this invention if the standards are moderate or if the carburetor is used jointly with one or two of the above-mentioned countermeasures. Although the carburetor incorporated unto the engine according to this invention has the disadvantage as mentioned in the summary of invention, the most attractive advantage is simple construction and less production cost.

The above-mentioned countermeasures or adoption of a carburetor or carburetors are used in various combinations in this invention and the effect of such combinations on the nitrogen oxides, hydrocarbon and carbon monoxide formation is by way of example shown in FIGS. 1A and 1B. All of the above countermeasures or adoption of a carburetor or carburetors are, of course, not always used in one engine according to this invention.

With the engine according to this invention there are some operational phases in which some combustion chambers do rich operational with or without exhaust gas recirculation and the remaining combustion chambers do lean operation. The engines some of whose combustion chambers always do rich operation to produce large power and whose remaining combustion chambers always do lean operation to produce small power are known in the art, e.g. U.S. Pat. No. 3,708,980 and Japanese Laid Open Patent Application Publication Toku-Kai-Sho 49-62808.

These prior art engines are far from the fundamentally lean operation engine in contrast to the engine according to this invention and perform rich and lean operations at the low power demand, especially at the low engine speed at which the vibration of the engine becomes very big due to unbalance of torque produced in the combustion chambers of rich or lean operation unless the torque unbalance is intentionally subdued.

In the U.S. Pat. No. 3,708,980 to subdue such vibration to make a practical engine, the richness or leanness of rich or lean air-fuel charge, respectively, had to be very moderate and the major work to decrease emission of hydrocarbons, carbon monoxide and nitrogen oxides had to depend on the oxidizing and reducing catalysts.

If the richness of rich air-fuel charge and the leanness of lean air-fuel charge are big, the emission of nitrogen oxide, hydrocarbons and carbon monoxide can be decreased without help of catalysts as with Japanese Laid Open Patent Application Publication Toku-Kai-Sho 49-62808. But, in this case, at the low engine power demand operation, especially at the low engine speed the vibration of the engine becomes untolerable from the practical point of view, if such special measures cannot be taken as (1) an installation of a counterbalance mechanism to the engine or as (2) the lowering of the rich operation torque to the level of the lean operation torque by retarding the ignition timing of rich operation.

It is very hard to make, only by incorporation of the counterbalance mechanism, a practical engine for motor vehicles which engine performs a rich operation and a lean operation at the same time at the low engine power demand at the low engine speed if the difference of air-fuel ratios of a rich airfuel charge and of a lean air-fuel charge is big without ignition timing retard of rich operation. If the ignition timing retard of rich operation is adopted to avoid the vibration, the fuel consumption rate of the engine becomes worse because of a considerable deterioration of fuel consumption rate of the ignition retarded rich operation.

As the engine according to this invention performs only a lean operation at the low engine power demand and at the large part of medium engine power demand, it does not suffer from such a problem of vibration or of fuel consumption deterioration. At the upper medium and high engine power demand where the rich and lean operation coexist, as the torque produced by the lean operation is relatively high and, in general, the engine speed is relatively high, the difference of torque between rich and lean operation combustion chambers does not cause a big vibration.

As the torque of the combustion chamber in a rich operation of the torch ignition engine is effectively high enough to produce more power and to give the engine a good driveability as seen in FIGS. 1A and 1B but is not so high as the torque of the combustion chamber in rich operation without any trap or pre-combustion chamber, because of the torch effect of the torch engine which is effective for the suppression of nitrogen oxides formation, the torque difference of rich and lean operations is moderate thereby contributing ot th mitigation of the vibration.

In the case of a rotary engine there are two ways of performing rich and lean operations: one is that all working chambers of a rotor housing performs a rich operation while all working chambers of another rotor housing perform a lean operation; another is that working chambers of one rotor housing alternately receive a rich air-fuel charge with the remaining receiving a lean air-fuel charge, or intermittently receiving a rich air-fuel charge the remaining receiving a lean air-fuel charge.

The torque difference of working chambers causes a torsional vibration, but it does not practically affect the operation of such engines. In this specification, a working chamber of a rotary engine is a combustion chamber.

There are two ways for the method to add the additional fuel:

one is the supply of the additional fuel to the combustion chamber, which is receiving a lean air-fuel charge, in order to form a rich mixture in it, this method being usable with engines having fuel injection nozzles or a carburetor or carburetors; another is that (1) in a carburetor a rich air-fuel charge is formed, (2) when a combustion chamber performs a lean operation, air is injected to the combustion chamber whereby the combustion chamber receives a lean air-fuel charge and (3) when a combustion chamber performs a rich operation, the air injection is stopped whereby the combustion chamber receives a rich air-fuel mixture. The expression in the summary of invention, that "to add additional fuel to a suitable number of combustion chambers of the lean operation engine relative to the sucked-in quantity of air to the combustion chambers to form an air-fuel charge richer or substantially richer than stoichiometric" includes the above two ways.

One of the most distinguished features worth mention of in this invention is the adoption of a trap chamber or a pre-combustion chamber installed in each combustion chamber of the reciprocating engine according to this invention, especially the adoption of such a trap chamber as described below:

(1) The trap chamber has an enclosure enclosing a set of electrodes of a spark plug and has at least one suction aperture and at least one discharge aperture, the enclosure being closed except for the above-mentioned apertures.

(2) The trap chamber is disposed in a combustion chamber and further has a partition disposed within the trap chamber between the suction and discharge apertures to form within the trap chamber a uniflow path in communication with the suction and discharge apertures to which path the electrodes of the spark plug are exposed.

(3) The air-fuel charge fed to the combustion chamber consists of a richer portion and a leaner portion. The engine is so constructed that during the suction process the richer portion is directed toward the suction aperture to be sucked in through it to the trap chamber whereby the trap chamber is scavenged by the richer portion which replaces the exhaust gases formed during the previous combustion process and which remained in the trap chamber and further is sucked out from the discharge aperture.

(4) The richer portion remains around the electrodes at the ignition time whereby the ignition becomes easy and then the flame or so-called "torches" made in the trap chamber spurts out through the suction and discharge apertures during the combustion process to burn the leaner portion in the combustion chamber.

(5) Thus the reciprocating engine according to this invention can burn an air-fuel charge having a very lean total air-fuel ratio wherein the total air-fuel charge consists of the richer and leaner portions. The total air-fuel ratio is the ratio of the summed up weight of fuels contained in the richer and leaner portions to the summed up weight of air contained in the richer and leaner portions. The total air-fuel ratio can be larger (leaner) than 19 with the reciprocating engine according to this invention.

(6) If the air pollution control standards become very stringent, the reciprocating engine according to this invention burns an air-fuel charge having a very lean total air-fuel ratio in the fundamental lean operation thus effectively reducing the emission of nitrogen oxides, hydrocarbons and carbon monoxide. When this engine is in a rich operation according to this invention to the extend necessary to meet the power demand and the driveability demand, the reciprocating engine has reduced emission of pollutants to thereby meet the stringent air pollution control standards while having improved power and driveability performance.

Eight specific embodiments of this invention are hereinafter disclosed, but it is apparent that various modifications may be made within the scope of the invention.

FIRST EMBODIMENT

In this embodiment, a four-cylinder reciprocating engine employs a fuel injection system as an air-fuel charge feed system. The fuel injection system feeds such an amount of fuel that a lead air-fuel charge is provided in each cylinder under normal operating conditions, and under high engine power demand operating conditions extra fuel is fed to some of the cylinders thus feeding a sufficient amount of fuel to provide a rich air-fuel charge in these cylinders. Also under high engine power demand operating conditions, a portion of the exhaust gases is recirculated to the cylinders to which the additional fuel is supplied.

Referring to FIGS. 3 and 4, first, second, third and fourth cylinders $C_1$, $C_2$, $C_3$ and $C_4$, respectively, are formed within a cylinder block 1 with a cylinder head 2 fastened securely to the upper end of the cylinder block 1. The cylinder block 1 is provided with four cylinder bores 3, each forming a part of the cylinders $C_1$ through $C_4$. The cylinder head 2 is provided with four concavities and with four intake ports 4 and four exhaust ports 5. Each of the concavities is in communication with the corresponding one of the intake ports 4 and the corresponding one of the exhaust ports 5. Each of the concavities and the corresponding one of the cylinder bores 3 forms the corresponding one of the cylinders $C_1$ through $C_4$. Therefore, each of the cylinder bores 3 is in communication with the corresponding one of the intake ports and with the corresponding one of the exhaust ports.

In the fourth cylinder $C_4$ (the other cylinders will not be fully described, since they are similar in the main construction to the fourth cylinder), a piston 6 is movably disposed in the cylinder bore 3 of the cylinder block 1, and the upper end face of the piston 6 forms a main combustion chamber 7 in cooperation with the cylinder bore 3 and the surface of the concavity formed in the cylinder head 2. The piston 6 reciprocates in the cylinder bore 3 (illustrated schematically) and is connected to a connecting rod 9 whose other end is connected to a crankshaft 8 (also illustrated schematically). The crankshaft 8 is rotated by the reciprocating motive force of the piston 6.

A cup 10 is fitted, together with a spark plug adapter 11, in the cylinder head 2, and the space within the cup 10 constitutes a trap chamber or precombustion chamber 12. The hemispherical forward end of the cup 10 extends into the main combustion chamber 7 beyond the surface of the concavity forming the main combustion chamber, and at least a suction aperture 13 and at least a discharge aperture 14, are formed in the portion of the cup 10 extending into the main combustion chamber 7. Through both the suction aperture 13 and the discharge aperture 14, the trap chamber 12 communicates with the main combustion chamber 7. In particular, the suction aperture 13 is so formed that it faces the intake port 4. A partial dividing wall 15 is so disposed within the cup 10 that it inwardly extends from the inner wall of the end of the cup 10 which extends into the main combustion chamber to divide the trap chamber 12 into a first chamber communicating with the main combustion chamber through the suction aperture 13 and a second chamber communicating with the main combustion chamber through the discharge aperture 14. A spark plug 16-4 is fixedly mounted in the cylinder head 2 by the spark plug adapter 16 so that an electrode 16a of the spark plug 16-4 is located at the portion of the chamber 12 opposite to the extending portion of the wall 15. Thus the first and second chambers communicate with each other at the portion where the electrode 16a is located.

The intake port 4, which is formed in the cylinder head 2 is curved from the horizontal direction to the downward direction to open in the main combustion chamber 7, and provided at this opening is a valve seat 17 and an intake valve 18 for opening and closing the intake port 4. The intake valve 18 includes a valve head 18a and a valve stem 18b, with the valve stem 18 extending through a guide sleeve 19. As is well known in the art, the intake valve 18 is moved back and forth so that the intake port 4 is opened and closed by the valve head 18a. The cup 10 is so located that it is close to a portion of the valve seat 17 which portion is in the extension of the outer curvature of the downwardly curved portion of the intake port 4. When the intake valve 18 opens, its valve head 18a is positioned beyond the suction aperture 13 of the cup 10 so that the suction aperture 13 is positioned close to the intake port 4 than the valve head 18a of the intake valve 18.

The above-described construction of the fourth cylinder $C_4$ is the same as the first, second and third cylinders, and the spark plugs 16-1, 16-2, 16-3 and 16-4 of the respective cylinders are connected to an ignition system 300. The details of the ignition system 300 will be described later.

An intake manifold 20 is secured to the cylinder head 2 and connected with the intake ports 4 of the respective cylinders. A throttle assembly 22 having a throttle valve 21 therein is connected to the upstream end of the intake manifold 20 and the upstream end of the throttle assembly 22 is connected to an intake air flow rate sensor 23 whose upstream end is connected to an air cleaner 24. The intake manifold 20 distributes air to the intake port 4 of each cylinder and the air flow rate is controlled by the throttle valve 21. The throttle valve 21 is connected to the accelerator pedal which is not shown. The intake air flow rate sensor 23 is of a known type which includes a deflector plate 23a which is opened and closed in accordance with the flow rate of air drawn in and converting means (not shown) for converting the degree of opening of the deflector plate 23a into an electric signal.

Also secured to the cylinder head 2 is a thermal reactor 25 which constitutes an exhaust gas afterburner with the thermal reactor 25 being connected to all the exhaust ports 5 in the cylinder head 2. The thermal reactor 25 includes an outer shell comprising an outside outer shell 26 and an inside outer shell 26a forming therein a combustion space, outside and inside inner shells 27 and 28 located within the outside outer shell 26 and each similarly forming therein a combustion space (each of the inner shells has its ends opened), exhaust gas inlet pipes 29 each thereof having its one end connected to each of the exhaust ports 5 and its other end opened into the inside outer shell 26a and an exhaust gas discharge pipe 30 having its one end opened into the inside inner shell 28. The space between the outside outer shell 26 and the inside outer shell 26a is filled with a heat insulating material 31. The exhaust gas discharge pipe 30 of the thermal reactor 25 is connected to an exhaust pipe 32.

The intake manifold 20 is provided with a fuel injection system 40. The fuel injection system 40 injects fuel into the intake port 4 of each cylinder to form an air-fuel mixture in the intake port 4 with the air drawn in so that the air-fuel mixture formed in the intake port 4 is sucked into the cylinder in the suction stroke. In the fuel injection system 40, fuel injection nozzles 41-1, 41-2, 41-3 and 41-4 for the first, second, third and fourth cylinders, respectively, are disposed at the down-stream ends of the intake manifold 20 connected to the intake ports 4 of the cylinders. The position and direction of each fuel injection nozzle are so prearranged that when the intake valve 18 is open, the direction of the fuel injected from an injection orifice 41a substantially coincides with the tangential direction with respect to the sucked-in air stream at the outer curvature of the downwardly curved portion of the intake port 4 which stream hits the suction aperture 13 of the trap chamber 12 and thus the injected fuel is entrained on this air stream which, as a result, carries a substantial portion of the fuel into the trap chamber 12 through the suction aperture 13. Each of the fuel injection nozzles 41-1 through 41-4 is of the type that the fuel injection nozzles are electromagnetically operated to inject fuel which is supplied thereto at a constant fuel pressure and the fuel injection quantity is controlled in accordance with the duration of the valve opening. The orifice 41a of each of the fuel injection nozzles has the same diameter. The fuel in a fuel tank 42 is fed under pressure by a fuel pump 43 to each of the fuel injection nozzles 41-1 through 41-4 and a pressure regulator 44 regulates the fuel pressure at a constant pressure (normally 2 atmospheres) for feeding the fuel. The fuel injection nozzles are also connected to a control unit 100 which controls the injection of fuel (the duration of valve opening). The control unit 100 whose detailed construction will be described later, operates to control the timing of fuel injection so that each of the fuel injection nozzles injects the fuel in the suction stroke in the cylinder in which the fuel injection nozzle is mounted. In consequence, each fuel injection nozzle injects the fuel once for every cycle. The injection order for the cylinders is 1-3-4-2. The fuel injection quantity is basically controlled in such a manner that the amount of fuel injected from each fuel injection nozzle during the suction stroke is controlled in accordance with the flow rate of air drawn in and that the fuel is injected in an appropriate amount to form an air-fuel charge with the air drawn in having an air-fuel ratio between 17 and 22 (more preferably about 18). For this reason, the control unit 100 receives, as inputs, an electric signal from the intake air flow rate sensor 23 which signal corresponds to the flow rate of air drawn in and synchronizing signals from a synchronizing signal generator 46 which synchronize with the rotation of the crankshaft 8. Under high engine power demand operating conditions, beside the above-mentioned basic fuel injection amount, the control unit 100 makes the fuel injection nozzles 41-1 and 41-4 respectively mounted in the first and fourth cylinders supply additional fuel by increasing the opening duration of these fuel injection modes in relation to the amount of air drawn in. For this purpose, a pressure sensing switch 48 which acts as an engine power demand sensor is mounted in the intake manifold 20 to detect the pressure in the intake manifold 20. The pressure sensing switch 48 generates, under high-engine power demand operating conditions, an electric signal which in turn is applied to the control unit 100. The increase in injected fuel is so controlled as to produce with the sucked-in air an air-fuel charge having an air-fuel ratio between 11 and 14.7 (stoichiometric air-fuel ratio) and more preferably on the order of 13.

An exhaust gas recirculating system 50 is connected to the first and fourth cylinders $C_1$ and $C_4$. The exhaust gas recirculating system 50 includes an exhaust gas delivery port 51 formed in the valve seat 17 of each of the first and fourth cylinders $C_1$ and $C_4$. The exhaust gas delivery port 51 is positioned in that portion of the valve seat 17 which is closest to the suction aperture 13 of the trap chamber 12. The exhaust gas delivery port 51 is formed to penetrate the valve seat 17 from a point at an outer periphery of the valve seat 17 to another point which is closest to the suction aperture 13 and opens at a portion of the valve seat 17 which contacts the back face of the valve head 18a. An annular groove 52 is formed in the cylinder head 2 to encircle the outer periphery of the valve seat 17 in such a manner that this annular groove 52 communicates with the exhaust gas delivery port 51. An exhaust gas delivery passage 53 is also formed through the cylinder head 2 and a wall portion of the intake manifold 20 to communicate with the annular groove 52. While this arrangement is illustrated only for the fourth cylinder, the same arrangement is also made for the first cylinder. Each of the exhaust gas delivery passages 53 in the intake manifold 20 is connected to a corresponding one of two branches of a recirculation pipe 54. The other end of the recirculation pipe 54 is connected to a control valve 55. The control valve 55 is of a known type which includes a diaphragm 55b defining a pressure chamber 55a and a valve 55f connected to the diaphragm 55b by a rod 55c and adapted to make and break the communication between an exhaust gas inlet 55d and an exhaust gas outlet 55e. The exhaust gas outlet 55e is connected to the recirculation pipe 54. The exhaust gas inlet 55d is connected through a venturi 56 to a recirculation pipe 57 which in turn is connected to the exhaust pipe 32. The intake manifold pressure is introduced through a three way solenoid valve 58 into the pressure chamber 55a of the control valve 55. The three way solenoid valve 58 is controlled by the control unit 100.

The exhaust gas recirculating system 50 is designed so that when the intake manifold pressure having a value smaller than the atmopsheric pressure is introduced into the pressure chamber 55a of the control valve 55 through the three way solenoid valve 58, the valve 55f is opened and a portion of the exhaust gases in the exhaust pipe 32 is recirculated to the first and fourth cylinders through the respective exhaust gas delivery ports 51 from the recirculation pipe 57, the control valve 55, the recirculation pipe 54, the exhaust gas delivery passages 53 and the exhaust gas delivery passage 52. The amount of recirculated exhaust gas is metered by the orifice 56. On the other hand, when the control valve is open so that the pressure chamber 55a is opened to the atmosphere, the recirculation of the exhaust gas is stopped. The recirculated gas is a portion of the exhaust gases collected from all the cylinders and mixed together.

FIGS. 5A and 5B illustrate a detailed construction of the control unit 100 which controls the fuel injection nozzles 41-1, 41-2, 41-3 and 41-4 of the fuel injection system 40 and the three way solenoid valve 58. The portion of the control unit 100 which controls the fuel injection nozzles will be described first with reference to the graphs of FIG. 6 along with a description of means for supplying its input signals. Although no detailed construction is illustrated, the synchronizing signal generator 46 includes a permanent magnet fixedly mounted on the distributor shaft which rotates together with a cam shaft 301 of the ignition system 300 which will be described later in connection with FIG. 7 and which rotates once for every two revolutions of the engine crankshaft 8. The generator 46 also includes four wound cores arranged around the rotary shaft 301 at equal intervals. In operation, the four synchronizing signals shown in graphs ($A_1$), ($A_2$), ($A_3$) and ($A_4$) of FIG. 6 are generated for every two crankshaft revolutions. In this embodiment, the synchronizing signals $A_1$, $A_2$, $A_3$ and $A_4$ are respectively synchronized with the beginning of the suction stroke in the first, second, third and fourth cylinders. A reshaping circuit 110 includes logical delay circuits 110a, 110b, 110c and 110d and an OR gate 111. The logical delay circuit 110a comprises a DC amplifier 112 (eg. a Motorola IC MC 3302P), a buffer circuit 113, a resistor 114, a capacitor 115, an inverter 116 and a NOR gate 117. The logical delay circuits 110b, 110c and 110d are identical in construction with the circuit 110a and accordingly are not described in detail. The synchronizing signals $A_1$, $A_2$, $A_3$ and $A_4$ are amplified and reshaped in the reshaping circuit 110 which generates the synchronizing signals $B_1$, $B_2$, $R_3$ and $B_4$ respectively shown in graphs ($B_1$), ($B_2$), ($B_3$) and ($B_4$) of FIG. 6. The reset signals R shown in FIG. 6(R) are provided at the output of OR gate 111. Though not shown in detail, a conventional clock circuit 120 which may for example, be a known type of crystal resonator generates clock signals CL of a predetermined frequency. The clock circuit 120 includes four frequency dividers and it supplies clock signals to the respective circuits. A D-A converter circuit 130 includes a binary counter 131 and a ladder resistance network employing resistors having, respectively, resistance values $R_1$ and $R_2$ so that each time the binary counter 131 is reset by the reset signal R generated by the reshaping circuit 110, the clock signals applied from the clock circuit 120 are counted. Consequently, the sawtooth waveform voltage shown in FIG. 6(C) is generated at the output terminal of the D-A converter circuit 130 at point C. A comparison circuit 140 includes a comparator 141, an R-S flip-flop 142 and a NOR gate 143. The comparator 141 compares the sawtooth waveform voltage (FIG. 6C) with the output voltage $V_Q$ (shown by a dotted line in FIG. 6C) of the intake-air flow rate sensor 23 so that a "1" signal is generated to set the R-S flip-flop 142 when the sawtooth waveform voltage becomes higher than the voltage $V_Q$ which as aforementioned is proportional to the intake air flow rate. When this occurs, the NOR gate 143 generates at its output terminal at point D the pulse signal D shown in FIG. 6(D) in response to the Q output signal of the R-S flip-flop 142 and the reset signal R. In other words, the time width $T_Q$ of this pulse signal is proportional to the intake air flow rate Q. A selection circuit 150 includes an R-S flip-flop 151 (the RCA IC CD4013), a NOR gate 152, inverters 153, 157 and 159, and NAND gate 158, a selector gate 160 comprising, e.g., two units of the RCA IC CD4019, resistors 154 and 155 and a capacitor 156, whereby when the selector gate 160 has a "1" at its input terminal Ka and a "0" at its input terminal Kb, binary code input data $H_8$, ..., $H_1$ of the selection circuit 150 appear at outputs $I_8$, ..., $I_1$, whereas when a "1" is present at the input terminal Kb and a "0" is present at the input terminal Ka, binary code input data $G_8$, ..., $G_1$ of the selection circuit 150 appear at the outputs $I_8$, ..., $I_1$. The R-S flip-flop 151 includes two R-S flip-flops so that the signal shown in FIG. 6($E_1$) is generated at one Q output in response to the synchronizing signals $B_1$ and $B_3$ shown in FIG. 6, whereas the signal shown in FIG. 6($E_2$) is generated at another Q output in response to the synchronizing signals $B_4$ and $B_2$. The logical operation is performed on the signals $E_1$ and $E_2$ by the NOR gate 152 and the inverter 153 producing the signals shown in FIG. 6(F). The resistors 154 and 155 and the capacitor 156 eliminate external noise and at the same time one end of the resistor 155 is connected to a power supply $V_{CC}$ of the control circuit so that a "1" is applied to the inverter 157 when the pressure sensing switch 48 is not in operation (when the value of the intake manifold pressure is small and the switch 48 is open). On the other hand, when the pressure sensing switch 48 is in operation (when the intake manifold pressure is great so that the switch 48 is closed), a "0" is applid to the inverter 157. In this embodiment, the preset value of the pressure sensing switch 48 is selected so that the pressure sensing switch 48 is normally opened, whereas the switch 48 is closed when the intake manifold pressure, in terms of the absolute pressure, becomes greater than 660 mmHg. The outputs of the inverters 153 and 157 are processed and applied to the input terminals $K_a$ and $K_b$ through the NAND gate 158 and the inverter 159. When the pressure sensing switch 48 is not in operation, the input terminals $K_a$ and $K_b$ always have respectively a "1" and "0", whereas the input terminals $K_a$ and $K_b$ have respectively a "0" and "1" only when the pressure sensing switch 48 is in operation and the signal of FIG. 6(F) goes to "1". The selector gate 160 delivers its input data, i.e., $K_A = (H_8, ..., H_1)$, to its outputs $I_8, ... I_1$ when a "1" is present at the input terminal $K_a$ and a "0" is present at the input terminal $K_b$, whereas its input data, i.e., $K_B = (G_8, ..., G_1)$ is delivered to the outputs $I_8, ..., I_1$. The input data $K_A$ and $K_B$ are quantities which determine the air-fuel ratio (A/F) of mixtures and which may be preset as desired by presetting the respective binary code input terminals of selector 160 to either "1" or "0". The input $K_A$ represents a quantity which provides an air-fuel ratio between 17 : 1 to 22 : 1 (the optimum ratio is 18 : 1), whereas the input $K_B$ represents a quantity which provides an air-fuel ratio between 11 : 1 to 14.7 : 1 (the optimum ratio is 13 : 1). A first multiplier circuit 170 includes a parallel adder 171 (the RCA IC CD4008), a memory 172 (the RCA IC CD4035), a memory 173 (the RCA IC CD4042), an AND gate 174, and a decade divider/counter 175 (the RCA IC CD4017). The memory 172 has its outputs $L_{18}$ through $L_1$ connected to inputs $J_{18}$ through $J_1$ of the parallel adder 171 whose inputs $K_8$ through $K_1$ always receive the binary coded input corresponding to either one of the constants $K_A$ and $K_B$, and the decade divider/counter 175 is designed to stop its counting operation by applying a signal to its CE (clock enable) terminal when the number of applied clock signals exceed 6. When the output of the comparison circuit 140 or the pulse signal D of the time width $T_Q$ goes to "1", N clock signals from the clock circuit 120 are generated at the output terminal of the AND gate 174 in proportion to the time width $T_Q$ as shown in FIG. 6(G). When the output of the comparison circuit 140 goes to "0", the clock signals are counted by the decade divider/counter 175 so that the "1" signals shown in FIGS. 6($G_2$), 6($G_4$) and 6($G_6$) are respectively generated at terminal points $G_2$, $G_4$ and $G_6$ when the second, fourth and sixth clock signals are counted by the counter 175. When the fourth clock signal is counted by the counter 175, the memory 172 is reset causing its outputs $L_{18}, \ldots, L_1$ to go to 0, . . . , 0. Thereafter, as the clock signals shown in FIG. 6(G) are sequentially applied from the AND gate 174, the outputs $L_{18}$ through $L_1$ of the memory 172 change sequentially to $K_8, \ldots, K_1, 2 \times (K_8, \ldots, K_1)$ and $n(K_{10}, \ldots, K_1)$, and in response to the clock signal of FIG. 6($G_2$), the memory 173 stores as $M_{10}, \ldots, M_1$ the higher 10 bits of the output $n(K_8, \ldots, K_1)$. Since the number of clock signals n is a value proportional to the intake air amount Q as mentioned earlier and since the $K_8, \ldots, K_1$ represent the binary code corresponding to either one of the constants $K_A$ and $K_B$, the first multiplier circuit 170 generates a product K·Q in binary codedform. chambers, in such a manner that each of said combustion chambers receives occasion Regarding the number of revolutions of the engine, this embodiment utilizes the fact that the period of the reset signals R shown in FIG. 6(R) is inversely proportional to the number of the revolutions of the engine. A second multiplier circuit 180 is almost identical in construction with the first multiplier circuit 170 and the principal differences reside in that an R-S flip-flop 186 is additionally provided so that when an input signal to memory 183 is generated, the application of clock signals to memory 182 through an AND gate 184 is prevented. With this second multiplier circuit 180, the output $M_{10}, \ldots, M_1$ of the first multiplier circuit 170 is added as many times as the number of clock signals m generated from the clock circuit 120 during a time width $T_N$ which is inversely proportional to the number of revolutions N, and it provides as its output $N_{10}, \ldots, N_1$ representing $m \times (M_{10}, \ldots, M_1)$. In other words, the second multiplier circuit 180 performs the operation K $\times$ Q/N and it generates a binary coded output. In this case, if the pressure sensing switch 48 is in operation and if the signal of FIG. 6(F) goes to "1" thus generating the value of the constant $K_B$ at the output of the selection circuit 150 as mentioned earlier, the second multiplier circuit 180 generates an output $K_B \times$ Q/N. In all other conditions, the second multiplier circuit 18 generates $K_A \times$ Q/N. A converter circuit 200 includes a binary counter 201, EXCLUSIVE-OR gates 202–211, a NOR gate 212, R-S flip-flops 213 – 217 and AND gates 218 – 221. Consequently, when the binary counter 201 and the R-S flip-flop 213 are reset by the reset signal R the binary counter 201 counts the number of clock signals CL so that the R-S flip-flop 213 is set when the count of the binary counter 201 becomes equal to the binary output $N_{10}, \ldots, N_1$ (shown by a thick arrow alone) of the second multiplier circuit 180. The time interval from the point of resetting the R-S flip-flop 213 to the point of setting the R-S flip-flop 213 or the time when a "1" is generated at its $\overline{Q}$ output terminal is proportional to the binary output of the second multiplier circuit 180. On the other hand, the R-S flip-flop 214 is set by the synchronizing signal $B_1$ and it is reset by the synchronizing signal $B_3$, whereas the R-S flip-flop 215 is set by the synchronizing signal $B_3$ and it is reset by the synchronizing signal $B_4$. Similarly, the R-S flip-flop 216 is set by the synchronizing signal $B_4$ and it is reset by the synchronizing signal $B_2$, whereas the R-S flip-flop 217 is set by the synchronizing signal $B_2$ and it is reset by the synchronizing signal $B_1$. Consequently, in synchronism with the synchronizing signals $B_1$, $B_3$, $B_4$ and $B_2$, the AND gates 218, 219, 220 and 221 respectively generate a "1" for the duration of times $\tau_1$, $\tau_2$, $\tau_3$ and $\tau_4$ which are proportional to the binary output of the second multiplier circuit 180. When this occurs, the output pulse signals of the AND gates 218, 219, 220 and 221 which are shown respectively in ($T_1$), ($T_2$), ($T_3$) and ($T_4$) of FIG. 6 are respectively applied through a power amplifier circuit 250 (not shown in any detail since this circuit is well known in the art) to the fuel injection nozzles 41 mounted on the first, third, fourth and second cylinders, and in this way the fuel is injected sequentially into the first, third, fourth and second cylinders in this order during the suction strokes of the cylinder. Under normal operating conditions of the engine where the intake manifold pressure is below 660 mmHg and the pressure sensing switch 48 is open, the time widths $\tau_1$, $\tau_2$, $\tau_3$ and $\tau_4$ of the pulse signals applied to the fuel injection nozzles all assume the same value $K_A \times$ Q/N, i.e., the same time width corresponding to a fuel injection quantity which provides a lean air-fuel mixture having an air-fuel ratio between 17 : 1 to 22 : 1 (the optimum ratio is 18 : 1). On the other hand, under high-load operating conditions of the engine where the intake manifold pressure is above 660 mmHg and the pressure sensing switch 48 is in the closed position, while the time widths $\tau_2$ and $\tau_3$ of the pulse signals applied to the fuel injection nozzles 41-2 and 41-3 on the second and third cylinders are maintained at the same value $K_A \times$ Q/N, i.e., the time width corresponding to the injection quantity which provides the above-mentioned lean-air fuel mixture, the time width of the pulse signals applied to the fuel injection nozzles 41-1 and 41-4 on the first and fourth cylinders assumes the value $K_B \times$ Q/N, i.e., the time width corresponding to that fuel injection quantity which provides a rich-air fuel mixture with an air-fuel ratio between 11 : 1 to 14.7 : 1 (the optimum ratio is 13 : 1).

The portion of the control unit 100 which controls the three way solenoid valve 58 of the exhaust gas recirculating system 50 will now be described. A power amplifier 260 is connected to the pressure sensing switch 48. The three way solenoid valve 58 is connected to the power amplifier 260. Consequently, when the intake manifold pressure becomes greater than 660 mmHg so that the pressure sensing switch 48 is closed, the three way solenoid valve 58 is brought into operation. The operation of the solenoid valve 58 brings the intake manifold pressure into the pressure chamber 55a of the control valve 55 and the valve 55f is opened to recirculate a portion of the exhaust gases.

FIGS. 7 and 8 illustrate details of the ignition system 300 connected to the spark plugs 16-1, 16-2, 16-3 and 16-4 mounted in the cylinders. The ignition system 300 includes two contact breaker units 302 and 303 which are sequentially opened and closed by the rotation of the same cam shaft 301, and the contact breaker units 302 and 303 are respectively mounted on breaker plates 302a and 303a. The first (advanced position) contact breaker unit 302 which is opened and closed earlier by the rotation of the cam shaft 301 is adapted for the burning of a lean-air mixture with a ratio between 17 : 1 to 22 : 1 (the optimum ratio is about 18 : 1), whereas the second (retarded position) contact breaker 303 which is opened and closed later by the rotation of the cam shaft 301 is adapted for the burning of a rich air-fuel mixture with a ratio between 11 : 1 to 14.7 : 1 (the optimum ratio is about 13 : 1). The breaker plates 302a and 303a are respectively connected to diaphragm type vacuum advance mechanisms 304 and 305 so that as is well known in the art, the make and break timing of the contact breaker units 302 and 303 (the ignition timing) is controlled by rotating the breaker plates 302a and 303a relative to the cam shaft 301 in accordance with the pressure in the intake manifold 20 just downstream of the throttle valve 21. Although not shown, as is well known in the art, the make and break timing of the contact breaker units 302 and 303 in relation to the rotation of the cam shaft 301 are also controlled by their respective flyweight type centrifugal governors in accordance with the number of revolutions of the engine. A diaphragm type ignitiion timing retarder 306 is connected to the breaker plate 303a carrying the second retarded position contact breaker unit 303. A pressure chamber 306b which is defined by a diaphragm 306a is adapted to receive the intake manifold pressure. A three way solenoid valve 307 is mounted in the pressure passage to the pressure chamber 306b. The three way solenoid valve 307 is actuated through a timer 307a by the pressure sensing switch 48 (the same switch as used for supplying signals to the control unit 100) so that the pressure passage is connected to the atmosphere through an orifice 307b under normal operating conditions of the engine when the pressure sensing switch 48 is open, whereas the pressure passage is shut off from the atmosphere to introduce the intake manifold pressure into the pressure chamber 306b during the time determined by the timer 307a when the pressure sensing switch 48 is in the closed position. The ignition timing retarder 306 is designed so that the breaker plate 303a is forcibly rotated in a direction which retards the ignition timing only during the introduction of the intake manifold pressure into the pressure chamber 306b. After the expiration of a certain time, the breaker plate 303a is returned to its original position when the difference between the pressures on both sides of the diaphragm 306a is reduced to zero by the movement of air through the orifice 307b.

In FIG. 8, numeral 308a designates a distributor, 308b an ignition coil, 308c an external resistor for the primary winding of the ignition coil 308b, and 309 a battery. These elements are all of known types which are usually installed in a vehicle. Numerals 310 and 320 designate first and second ignition timing signal generating circuits for respectively generating different ignition timing signals, i.e., advanced ignition timing signals and retarded ignition timing signals, 330 is a cylinder discrimination signal generating circuit, 340 an ignition selector circuit, 350 a transistorized ignition system, and 360 a voltage regulator circuit.

During normal operating conditions of the engine, only the advanced ignition timing signals from the first ignition timing signal generating circuit 310 which are suited for burning a lean air-fuel mixture are selected by the ignition selector circuit 340 to control the ignition timing of the spark plugs 16-1, 16-2, 16-3 and 16-4 mounted in the cylinders. On the other hand, under high-load operating conditions of the engine, the ignition selector circuit 340 selects and applies the advanced ignition timing signals to the transistorized ignition system 350 to control the ignition timing of the spark plugs 16-2 and 16-3 mounted in the second and third cylinders, while the retarded ignition timing signals from the second ignition timing signal generating circuit 320 which are suited for burning a rich air-fuel mixture are selected and applied to the transistorized ignition system 350 by the ignition selector circuit 340 to control the ignition timing of the spark plugs 16-1 and 16-4 mounted in the first and fourth cylinders.

Next, the first and second ignition timing signal generating circuits 310 and 320, the designated cylinder discrimination signal generating circuit 330, the ignition selector circuit 340, the transistorized ignition system 350 and the voltage regulator circuit 360 will be described in detail. The output signal of the first advanced position contact breaker unit 302 shown in FIG. 7 is applied to the first ignition timing signal generating circuit 310. The first ignition timing signal generating circuit 310 includes resistors 311, 312, 313, 314 and 315, transistors 316 and 317 and a capacitor 318. On the other hand, the output signal of the second retarded position contact breaker unit 303 shown in FIG. 7 is applied to the second ignition timing signal generating circuit 320. The second ignition timing signal generating circuit 320 includes circuit elements 321 through 328 similar to those of the first ignition timing signal generating circuit 310. The designated cylinder discrimination signal generating circuit 330 includes a pickup 336 formed by winding a lead wire several times around the high tension cord of the first cylinder to which the rich air-fuel mixture is fed from the fuel injection system 40 and which is ignited with the retarded ignition timing under high-load operating conditions, and the pickup 336 picks up a high frequency electromagnetic wave generated in the high tension cord on ignition. The circuit construction of the designated cylinder discrimination signal generating circuit 330 includes resistors 331, 332 and 333 and transistors 334 and 335. The ignition selector circuit 340 receives the ignition timing signals from the first and second ignition timing signal generating circuits 310 and 320, the discrimination signal from the designated cylinder discrimination signal generating circuit 330 and an operating condition signal $E_O$ (the output signal of the inverter 157 of the selection circuit 150 shown in FIG. 5A), whereby the advanced ignition timing signals optimum for burning the lean air-fuel mixture are fed to the spark plugs in all the cylinders under normal operating conditions of the engine, whereas under high-load operating conditions of the engine the advanced ignition timing is selected for the spark plugs in the second and third cylinders and the retarded ignition timing optimum for the combustion of the rich air-fuel mixture is selected for the spark plugs in the first and fourth cylinders. The ignition selector circuit 340 includes a frequency divider 341 of a known type, inverters 343, 346, 347 and 349, NAND gates 342, 344 and 345 and a NOR gate 348. The resulting ignition timing selection signals selected by the ignition selector circuit 340 are applied to the transistorized ignition system 350. The transistorized ignition system 350 includes a resistor 351, transistors 352 and 353 and a Zener diode 354. The voltage regulator circuit 360 is provided to drive these circuits and it includes a resistor 361, a Zener diode 362 and a capacitor 363.

The operation of the above-described circuits will now be described in reference to the time chart shown in FIG. 9. FIG. 9A shows the advanced ignition timing signals generated from the first ignition timing signal generating circuit 310 and the signals are adapted for the combustion of the lean air-fuel mixture as mentioned earlier. FIG. 9B shows the retarded ignition timing signals generated from the second ignition timing signal generating circuit 320 and the signals are adapted for the combustion of the rich air-fuel mixture as mentioned earlier. Numerals 1 through 4 respectively designate the numbers of the first to fourth cylinders in the internal combustion engine. FIG. 9C shows the discrimination signals generated by the designated cylinder discrimination signal generating circuit 330 and in this embodiment the signals are derived from the ignition signals for the first cylinder which is ignited with the retarded ignition timing signals. Under normal operating conditions of the engine, the output signal of the inverter 157 in the selection circuit 150 of FIG. 5A which is the operating condition signal $E_0$ consequently the output signal of the NAND gate 342 remains at "1" irrespective of the output signal of the frequency divider 341. Consequently, the advanced ignition timing signals generated from the first ignition timing signal generating circuit 310 are passed through the NAND gate 344 and the retarded ignition timing signals generated from the second ignition timing signal generating circuit 320 are prevented by the NAND gate 345 thus delivering to the output of the ignition selector circuit 340, the ignition timing selection signals comprising only the advanced ignition timing signals which in turn are supplied to the following transistorized ignition system 350. In response to the applied ignition timing selection signals the transistorized ignition system 350 breaks the supply of current to the primary winding of the ignition coil 308b inducing a high voltage in the ignition coil secondary winding and the spark plugs 16-1, 16-3, 16-4 and 16-2 are sequentially caused through the distributor 308a to produce ignition sparks, thus controlling the ignition of all the cylinders to which the lean air-fuel mixture is fed.

On the other hand, under high-load operating conditions of the engine, the operating condition signal $E_0$ goes from "0" to "1". When this occurs, the advanced ignition timing signals shown in FIG. 9(a) are applied to the frequency divider 341 and the discrimination signal shown in FIG. 9(c) is used as the reset signal for the frequency divider 341. Consequently, the divided output signals of the frequency divider 341 are passed through the NAND gate 342 generating the selection signals shown in FIG. 9(d). The selection signals and the advanced ignition timing signals are passed through the NAND gate 344 and the inverter 346 thus selecting only the advanced ignition timing signals shown in FIG. 9(f) for the second and third cylinders. The selection signals are also applied to the inverter 343 producing the inverted selection signals shown in FIG. 9(e). The inverted selection signals and the retarded ignition timing signals are similarly passed through the NAND gate 345 and the inverter 347 thus selecting only the retarded ignition timing signals shown in FIG. 9(g) for the first and fourth cylinder. These advanced and retarded ignition timing signals are then passed through the NOR gate 348 and the inverter 349 thus producing the ignition timing selection signals shown in FIG. 9(h) which are made up of the suitably arranged ignition timing signals required by the respective cylinders and these ignition timing selection signals are sent to the semi-conductor ignition system 350. In response to the applied ignition timing selection signals, the transistorized ignition system 350 brakes the current flow to the primary winding of the ignition coil 308b to generate a high voltage in the ignition coil secondary winding and the spark plugs in the respective cylinders are sequentially caused through the distributor 308a to produce an ignition spark.

With the ignition system 300 described above, under normal operating conditions of the engine the spark plugs in all the cylinders are operated with the ignition timing optimum for the combustion of the lean air-fuel mixture. On the other hand, when the engine is operating at high loads, the spark plugs in the second and third cylinders are operated with the same ignition timing optimum for the combustion of the lean air-fuel mixture, while the spark plugs in the first and fourth cylinders are operated with the retarded ignition timing optimum for the combustion of the rich air-fuel mixture. Moreover, by virtue of the construction shown in FIG. 7, during the transition period from the normal operation to the high-load operation, the second contact breaker unit 303 adapted for the combustion of the rich air-fuel mixture is temporarily retarded forcibly when the intake manifold pressure is introduced into the pressure chamber 306b through the three way solenoid valve 307 in response to the application of a pulse from the timer 307a and the second contact breaker unit 303 is gradually returned from the retarded position to the original position as the pressure in the pressure chamber 306b gradually returns to the atmospheric pressure through the orifice 307b of the three way solenoid valve 307 upon termination of the pulse applied thereto. Consequently, the spark timing of the spark plugs in the first and fourth cylinders is retarded in relation to the proper spark timing during the transition period after which the spark timing is returned to the proper timing.

While, in the ignition system described above, mechanical ignition contact breaker units are employed, contactless ignition circuit breaker units may be used to prevent any erroneous counting operation of the frequency divider 341 due to hunting or chattering of the contacts and in this case the processing of signals in the ignition selector circuit 340 is accomplished in the same manner.

The fuel injection system 40 operates as follows. The fuel injection system 40 injects fuel into the intake port 4 of each cylinder through the associated fuel injection nozzle during the suction stroke of the cylinder. The fuel injected to each cylinder is mixed with the air entering into the intake port 4 from the intake manifold producing a mixture of the fuel and air. However, the fuel is not uniformly mixed with the air. In other words, a very rich air-fuel mixture is formed in the vicinity of the curved outer peripheral portion of the intake port 4 to which the direction of injection is aimed, and a very lean air-fuel mixture is formed in the other portion. Thus, this very rich air-fuel mixture is delivered to the suction aperture 13 of the trap chamber 12 which is positioned in the direction of flow of the very rich air-fuel mixture and the very rich air-fuel mixture enters into the trap chamber 12. On the other hand, the very lean air-fuel mixture is drawn into the main combustion chamber 7. The introduction of the very rich air-fuel mixture into the trap chamber 12 is effected by virtue of the fact that the residual gases in the trap chamber 12 are mainly discharged from the trap chamber 12 by being sucked into the main combustion chamber 7 through the discharge aperture 14 and hence the very rich air-fuel mixture is directed to the suction aperture 13. In this case, the partial dividing wall 15 provided in the trap chamber 12 prevents the occurrence of a phenomenon where a fresh supply of the very rich air-fuel mixture introduced through the suction aperture 13 is discharged through the discharge aperture 14 while retaining the residual gases in the trap chamber 12, and in this way the partial dividing wall 15 facilitates the scavenging of the trap chamber 12. The fresh supply of the very rich air-fuel mixture introduced through the suction aperture 13 is guided into the vicinity of the electrodes 16a of the spark plug 16. The very rich air-fuel mixture in the trap chamber 12 is suitably diluted by the very lean air-fuel mixture introduced into the trap chamber 12 from the main combustion chamber 7 during the compression stroke to provide the optimum air-fuel mixture for ignition and this optimum air-fuel mixture is ignited by a spark discharge caused by the spark plug electrodes. The ignited air-fuel mixture is spurted out as torch jets into the main combustion chamber 7 through the suction and discharge apertures 13 and 14 thus igniting the air-fuel mixture in the main combustion chamber 7. In this way, a so-called stratified combustion is produced in each cylinder. The exhaust gases produced by the combustion are discharged during the exhaust stroke through the exhaust port 5 into the thermal reactor 25. The exhaust gases from all the cylinders are collected into the thermal reactor 25 where the collected exhaust gases are mixed and reburned. The exhaust gases are eventually discharged to the atmosphere through the exhaust pipe 32.

The fuel injection system 40 injects the fuel in the above-mentioned manner into the first, second, third and fourth cylinders in this order in which the suction stroke takes place in these cylinders. The quantity of fuel to be injected by this fuel injection system 40 is adjusted in accordance with the amount of air drawn into each cylinder. The fuel injection quantity is adjusted so that a lean air-fuel mixture having an air-fuel ratio between 17 : 1 to 22 : 1 (the optimum ratio is about 18 : 1) is fed to each cylinder during the suction stroke under normal operating conditions of the engine where the intake manifold pressure is below 660 mmHg and the engine load is small. On the other hand, under high-load operating conditions of the engine where the intake manifold pressure is above 660 mmHg, while the fuel injection quantity which provides the lean air-fuel mixture having the same air-fuel ratio as under the normal operating conditions is fed to each of the second and third cylinders during the intake stroke, the fuel injection quantity to the first and fourth cylinders is increased to produce a rich air-fuel mixture having an air fuel-ratio between 11 : 1 to 14.7 : 1 (the optimum ratio is about 13 : 1) in these cylinders. This increased fuel quantity is fed to the first and fourth cylinders during every intake stroke thereof under high-load operating conditions of the engine.

In this way, the lean air-fuel mixture is fed to all the cylinders under normal operating conditions of the engine and to the second and third cylinders under high-load operating conditions, and this lean air-fuel mixture is completely burned positively and stably by the above-mentioned stratified combustion process. Generally, the stable and positive combustion of the lean air-fuel mixture ensures a reduction in the Nox, CO and HC emissions in the exhaust gases. Consequently, a positive control of the harmful exhaust emissions is ensured under normal operating conditions.

On the other hand, under high-load operating conditions while the combustion of the lean air-fuel mixture is continued in the second and third cylinders, the rich air-fuel mixture is fed and burned in the first and fourth cylinders in place of the lean air-fuel mixture. Since the sparking order of the spark plugs is in the order of the first, third, fourth and second cylinders, the combustion of the lean air-fuel mixture and the combustion of the rich air-fuel mixture take place alternately. By burning the rich air-fuel mixture in the first and fourth cylinders, the brake torque of these cylinders is increased. Thus, the required power output for high-load operation is ensured. Moreover, if the air-fuel ratio of the rich air-fuel mixture is on the order of 13 : 1, then the generation of NOx can still be held at a low level. Further, the amounts of CO and HC emissions generated by the combustion of the rich air-fuel mixture can be reduced by mixing together the exhaust gases resulting from the combustion of both the lean and rich air-fuel mixtures and burning them again in the thermal reactor 25.

When the rich air-fuel mixture is burnt in the first and fourth cylinders under high-load operating conditions, a portion of the exhaust gases if recirculated to these cylinders. This recirculation of exhaust gas takes place when the intake mainfold pressure becomes above 660 mmHg so that the three way solenoid valve 58 comes into operation to open the control valve 55 in the exhaust gas recirculating system 50. The recirculated exhaust gas is discharged through the exhaust gas delivery port 51 formed in the valve seat 17 in each of the first and fourth cylinders so that a large part of the exhaust gas is fed into the trap chamber 12 through the suction aperture 13 in response to the opening of the intake valve 18 due to the relative position of the trap chamber 12 and the suction aperture 13. The introduction of the exhaust gas into the trap chamber 12 has an important effect on the combustion of the air-fuel mixture.

The above-mentioned recirculation of exhaust gas into the first and fourth cylinders under high-load operating conditions has the effect of reducing NOx generation in the first and fourth cylinders and hence the total amount of NOx generation is reduced. In addition, since the rich air-fuel mixture is burned in the first and fourth cylinders, the supply of the exhaust gas does not considerably deteriorate the ignitability of the mixture and it does not give rise to such problem as misfiring. While the recirculation of exhaust gas reduces the power output, there is a very small reduction in the power output during the combustion of the rich air-fuel mixture. Some reduction in the brake torque in the first and fourth cylinders tends to act in a direction which reduces the difference in power output between the first and fourth cylinders and the second arfd third cylinders and thus it compensates for the unbalance in the power output.

Under normal operating conditions of the engine where the combustion of the lean air-fuel mixture is effected in all the cylinders by the ignition system 300, each cylinder is sparked and fired by its spark plug with the corresponding optimum ignition timing. On the other hand, under high-load operating conditions, the ignition timing of the first and fourth cylinders is ultimately changed to one which is optimum for the combustion of the rich air-fuel mixture (the one which is retarded other than normal operating conditions). Of course, as is well known in the art, the ignition timing is also controlled in accordance with the number of revolutions of the engine and the intake manifold pressure. However, the ignition timing of the first and fourth cylinders is forcibly retarded with respect to the said optimum ignition timing during the transition period from the normal operating conditions to the high-load operating conditions. This forced retarding of the ignition timing is effected temporarily only for the duration of a predetermined time and the ignition timing is thereafter gradually returned to the optimum ignition timing. As a result, no rapid increase in the output takes place in the first and fourth cylinders during the transition period from the combustion of lean air-fuel mixture to the combustion of rich air-fuel mixture. Consequently, the power output of the engine on the whole is not increased rapidly and moreover practically no unbalance in the output is caused between the first and fourth cylinders and the second and third cylinders, thus ensuring a smooth transition from the normal operation to the high-load operation.

FIGS. 10 and 11 show the results of the experiments conducted by using the engines according to the above-described embodiment. FIG. 10 shows the relationship between the intake manifold pressure and the brake torque, and it is apparent that the brake torque can be increased by about 20% as shown by the solid line by switching one half of the cylinders from the combustion of the lean air-fuel mixture to the combustion of the rich air-fuel mixture when the intake manifold pressure goes above 660 mmHg. FIG. 11 shows the relationship between the air-fuel ratio of the mixtures fed to the cylinders and the amounts of the exhaust gas emissions. It is evident that the amounts of NOx, CO and HC emissions are all at low levels after switching one half of the cylinders from the lean air-fuel mixture to the rich air-fuel mixture.

While, in the first embodiment described above, the switch 48 in FIG. 7 which is responsive to the intake manifold pressure is used to detect the high-load operation of the engine, as shown in FIG. 12 which illustrates in part a modified form of the first embodiment, the same effect may be obtained by using a switch 48A which is opened and closed in association with the throttle valve 21. Further, in a broader sense, the same effect may be obtained by any arrangement in which an electric signal changes in the transition from normal operating conditions of the engine to high-load operating conditions of the engine.

Further, as shown in FIG. 13 which shows in part another modified form of the first embodiment, the exhaust gas recirculating system 50 may be provided with an exhaust gas delivery pipe 51' which is extended to the intake port 4 of the rich burning cylinders and the pipe 51' may be opened to the back of the valve head 18a of the intake valve 18 at a position near the suction aperture 13 of the trap chamber 12. The exhaust gas delivery pipe 51' recirculates a portion of the exhaust gases to the cylinders under high-load operating conditions.

SECOND EMBODIMENT

The second embodiment of the invention is a four-cylinder, reciprocating engine with a fuel injection system which is designed so that basically an amount of fuel which provides a lean air-fuel mixture is fed to each cylinder in every cycle, whereas additional fuel is supplied so that an increased amount of fuel which provides a rich air-fuel mixture is fed to each cylinder in alternate cycles under high-load operating conditions of the engine. Further, under high-load operation of the engine, a portion of the exhaust gases is recirculated to each cylinder in each of those cycles in which the increased amount of fuel is fed for providing the rich air-fuel mixture.

FIGS. 14 and 15 show the four-cylinder, reciprocating engine according to the second embodiment, with the exception of the exhaust gas recirculating system 50A, the control unit 100A and the ignition system 300A. These component elements of the second embodiment are identical with those of the first embodiment and therefore they will not be described.

The exhaust gas recirculating system 50A includes a total of four exhaust gas feed nozzles 51A-1, 51A-2, 51A-3 and 51A-4 for the cylinders which are respectively led to the upstream side of the fuel injection nozzles 41-1 through 41-4 mounted on the intake manifold 20. One end of a recirculation pipe 54A is connected to the exhaust pipe 32 and the other ends of its four distribution lines are connected to the respective exhaust gas feed nozzles. Each of the exhaust gas feed nozzles is of the electro-magnetically operated type which is similar to the fuel injection nozzles 41-1 through 41-4. The exhaust gas feed nozzle, when open, feeds a portion of the exhaust gases into the intake manifold 20 through an orifice 51a. The opening of each exhaust gas feed nozzle for the recirculation of exhaust gas is controlled by the control unit 100A.

In FIGS. 16A and 16B, there is illustrated a detailed construction of the control unit 100A. The control unit 100 A controls the amount of fuel injected from each of the fuel injection nozzles 41-1 through 41-4 in accordance with several operating parameters of the engine such as intake air flow rate, number of engine revolutions, manifold pressure, and cooling water temperature. To accomplish the fuel quantity control, the control unit 100A receives as its inputs the output signal of the intake-air flow rate sensor 23 and the synchronizing signal generator 46 which are the same as used in the embodiment of FIG. 3, i.e., an electric signal corresponding to the flow rate of air taken in the synchronizing signals synchronized with the rotation of the crankshaft 8. The control unti 100 A also receives as its input the electric output signal of a water temperature sensor 47 which corresponds to the temperature of the cooling water in the cooling water passage in the cylinder block 1. It also receives as its input the electric output signal of the pressure sensing switch 48 which is the same as shown in FIGS. 4 and 5 and which detects the load condition of the engine.

In FIGS. 16A and 16B, numeral 110 designates a reshaping circuit for amplifying and reshaping the output signals $A_1$, $A_2$, $A_3$ and $A_4$ of the synchronizing signal generator 46 to generate synchronizing signals $B_1$, $B_2$, $B_3$ and $B_4$. The reshaping circuit also performs an OR operation on the synchronizing signals $B_1$, $B_2$, $B_3$ and $B_4$ to generate reset signals R and inverts the reset signals R to generate inverted reset signals $\overline{R}$. Numeral 120 designates a clock circuit comprising an oscillator and frequency dividers for supplying clock pulses of different frequencies to various circuits. Numeral 130 designates the same D-A converter circuit as used in the first embodiment, 140 a comparison circuit in which the output voltage of the intake-air flow rate sensor 23 corresponding to the intake air flow rate Q is compared with the output voltage of the D-A converter circuit 130 and is converted into a binary code, 400 a first multiplier circuit for performing the operation of multiplication to produce a product Q × x 1/N in accordance with the binary coded output of the comparison circuit 140, the clock pulses and the inverted reset signals $\overline{R}$. Numeral 410 designates a first adder circuit in which a correction value K' for the output voltage of the cooling temperature sensor 47 which is converted into a binary code $Y_1, \ldots, Y_{10}$ by an A–D converter 47a with a memory and a constant X for a predetermined binary code $X_1, \ldots, X_{10}$ are added to produce a sum (X + K'), 420 a second adder circuit in which the correction value K' for the binary code $Y_1, \ldots, Y_{10}$ and a constant X' for a predetermined binary code $X'_1, \ldots, X'_{10}$ are added to produce a sum (X' + K'). Numeral 430 designates a first conversion circuit for receiving the sum output of the first adder circuit 410, the reset signal R from the reshaping circuit 110 and the clock pulses from the clock circuit 120. The conversion circuit 430 converting the binary coded output value of the first adder circuit 410 to a time width. Numeral 440 designates a second coversion circuit identical in circuit construction to the first conversion circuit 430 and adapted for converting the binary coded output value of the second adder circuit 420 to a time width. Numeral 450 designates a second multiplier circuit for generating a product Q × x 1/N × (X + K') in accordance with the binary coded output value Q × 1/N of the first multiplier circuit 400 and the output time width of the first conversion circuit 430. Numeral 460 is a third multiplier circuit identical in circuit construction with the second multiplier circuit 450 and is adapted for generating a product Q × 1/N × (X' + K') in accordance with the output value Q × 1/N of the first multiplier circuit 400 and the output time width of the second conversion circuit 440. Numerals 470 and 480 designate third and fourth conversion circuits for respectively generating a pulse signal having a time width proportional to the output value of the second multiplier circuit 450 while 490 and 500 are fifth and sixth conversion circuits for respectively generating a pulse signal having a time width proportional to the output value of the third multiplier circuit 460. Numeral 510 designates a selection circuit for selectively passing the pulse signals generated from the third conversion circuit 470, the fourth conversion circuit 480, the fifth conversion circuit 490 and the sixth conversion circuit 500 in accordance with the synchronizing signals $B_1$ to $B_4$ and the output signal of the pressure sensing switch 48.

Under normal operating conditions where the pressure sensing switch 48 is open, the selection circuit 510 sequentially passes only the output pulse signals of the fifth and sixth conversion circuits 490 and 500 which correspond to the fuel injection quantity that provides the lean air-fuel mixture and blocks the passage of the output pulse signals of the third and fourth conversion circuits 470 and 480 which correspond to the fuel injection quantity that provides the rich air-fuel mixture, whereas only under high-load operating conditions where the pressure sensing switch 48 is in the closed position and a high brake torque is required, all the output pulse signals of the third, fourth, fifth and sixth conversion circuits 470, 480, 490 and 500 are sequentially passed. Numeral 520 designates a correction circuit for multiplying the input by two correction terms, i.e., a value for compensating for a delay time in the operation of the fuel injection nozzles 41-1 through 41-4, and another value for compensating for variation in the supply voltage, 530 a first distribution circuit for distributing the output signals of the correction circuit 520 to the first and fourth cylinder fuel injection nozzles 41-1 and 41-4, is a second distribution circuit for distributing the output signals of the correction circuit 520 to the second and third cylinder fuel injection nozzles 41-2 and 41-3, 250 is a power amplifier circuit.

The detailed construction and operation of the above-described circuits will now be described with reference to FIGS. 17 and 18. Although the detailed construction of the synchronizing signal generator 46 is not shown, it comprises a permanent magnet fixedly mounted on the rotary shaft of the distributor which makes one rotation for every two revolutions of the crankshaft 8. Four wound cores are arranged around the rotary shaft at regular intervals. One each of the synchronizing signals shown in graphs ($A_1$), ($A_2$), ($A_3$) and ($A_4$) of FIG. 17 are generated for every two revolutions of the crankshaft 8. In this embodiment, the synchronizing signals $A_1$, $A_2$, $A_3$ and $A_4$ are respectively synchronized with the beginning of the suction stroke in the first second, third and fourth cylinders. The reshaping circuit 110 includes logical delay circuits 110a, 110b, 110c and 110d, an OR gate 111 and an inverter 111a. The logical delay circuit 110a includes a DC amplifier 112 (e.g., a Motorola IC M03302P), a buffer circuit 113, a resistor 114, a capacitor 115, an inverter 116 and a NOR gate 117. The other logical delay circuits 110b, 110c and 110d will not be described since they are identical in construction with the logical delay circuit 110a. The synchronizing signals $A_1$, $A_2$, $A_3$ and $A_4$ are amplified and rectified in the reshaping circuit 110 which in turn generates the synchronizing signals $B_1$, $B_2$, $B_3$ and $B_4$ shown in graphs ($B_1$), ($B_2$), ($B_3$) and ($B_4$) of FIG. 17. The reshaping circuit 110 also generates the reset signals R shown in FIG. 17(R) and the inverted reset signals $\overline{R}$ shown in FIG. 17($\overline{R}$). It will be apparent that the synchronizing signals $B_1$, $B_2$, $B_3$ and $B_4$ shown in FIG. 17 have a short time width on the order of 50 μs and the time width between the inverted reset signals $\overline{R}$ is inversely proportional to the number of revolutions of the engine.

Although the detailed construction of the clock circuit 120 is not illustrated, it includes a conventional oscillator employing a crystal resonator and conventional frequency dividers for generating clock pulses of different frequencies corresponding to the respective circuits. The D-A converter circuit 130 includes an 8-bit binary counter 131, a ladder type resistor network employing resistors having either a resistance value $R_1$ or $R_2$, so that the clock pulses applied from the clock circuit 120 are counted each time the binary counter 131 is reset by the reset signal R applied from the reshaping circuit 110. Consequently, the sawtooth waveform voltage shown in FIG. 17(C) is generated at an output terminal C of the binary counter 131. It is evident that the slope of the sawtooth waveform voltage can be made proportional to the air-fuel ratio (A/F) of mixtures depending on the frequency of th clock pulses. The comparison circuit 140 includes a comparator 141 and a memory 144. The comparator 141 compares the sawtooth waveform (FIG. 17(C)) with the output voltage of the intake-air flow rate sensor 23 (shown by a dotted line in FIG. 17(C)). Consequently, when the sawtooth waveform voltage becomes higher than the voltage proportional to the intake air flow rate so that the "1"

level pulse signal shown in FIG. 17(C') is generated, the binary counter 131 by that time is stored in the memory 144 from which it is generated as a binary code $I_8, \ldots, I_1$. Therefore, the output of the memory 144 or the output value of the comparison circuit 140 is a binary coded signal proportional to the intake air flow rate Q.

The first multiplier circuit 400 includes a parallel adder 401 (e.g., the RCA IC CD4008), a memory 402 (e.g., the RCA IC CD 4035), a memory 403 (e.g., the RCA IC CD4035), and AND gate 404 and a decade divider/counter 405 (e.g., the RCA IC CD4017). Outputs $L_{18}, \ldots, L_1$ of the memory 402 are connected to inputs $J_{18}, \ldots, J_1$ of the parallel adder 401. The decade divider/counter 405 stops its counting operation each time the number of applied clock pulses reaches 6. When the output of the reshaping circuit 110 i.e., the inverted reset signal $\overline{R}$ (FIG. 17($\overline{R}$)) is at a "1" level, n clock pulses from the clock circuit 120 are delivered to the output terminal of the AND gate 404 in proportion to the duration of the "1" level as shown in FIG. 17 ($F_o$). When the inverted reset signal $\overline{R}$ goes to a "0", the decade divider/counter 405 starts counting the clock pulses so that the "1" level signals shown in FIGS. 17($F_2$), 17($F_4$) and 17($F_6$) are respectively generated at output terminal points $F_2$, $F_4$ and $F_6$ when the second, fourth and sixth clock pulses are respectively counted. At the instant that the fourth clock pulse is counted by the counter 405, the memory 402 is reset thus clearing its outputs $L_{18}, \ldots, L_1$ to O, . . ., O. Thereafter, as the clock pulses shown in FIG. 17($F_o$) are sequentially applied from the AND gate 404, the outputs $L_{18}, \ldots, L_1$ of the memory 402 are changed sequentially from the binary code $I_8, \ldots, I_1$ to $2 \times (I_8, \ldots, I_1), \ldots, n \times (I_8, \ldots, I_1)$ and the higher 10 bits of the output $n \times (I_8, \ldots, I_1)$ are stored as a binary code $M_{10}, \ldots, M_1$ in the memory 403. In this case, since the number of clock pulses n is inversely proportional to the number of engine revolutions N as mentioned earlier and $I_8, \ldots, I_1$ is the binary code proportional to the intake air flow rate Q, the first multiplier circuit 400 generates a product $Q \times 1/N$.

The first adder circuit 410 includes a parallel adder (e.g., the RCA IC CD4008) in which its inputs $X_{10}, X_9, \ldots, X_1$ represent a binary code corresponding to a constant X, its inputs $Y_{10}, Y_9, \ldots, Y_1$ represent a binary code corresponding to a water temperature correction value K' and its outputs $Z_{10}, Z_9, \ldots, Z_1$ represent a binary code indicating a sum output $\{(X_{10}, X_9, \ldots, X_1) + (Y_{10}, Y_9, \ldots, Y_1)\}$. In this case, if it is desired for example to obtain the constant $X = 1.0$ and the water temperature correction value $K' = 0.2$, it is necessary to arrange so that $X_{10}, X_9, \ldots, X_1 = 0001100100$ and $Y_{10}, Y_9, \ldots, Y_1 = 0000010100$. To vary the binary code representing the water temperature correction value K' with the water temperatures, the output voltage of the water temperature sensor 47 comprising a thermisor and its series and parallel connected resistors may be subjected to the analog-to-digital conversion of a known A-D converter 47a with a memory. The A-D converter 47a is of the same type as a circuit obtained by combining together the D-A converter circuit 130 and the comparison circuit 140 shown in FIG. 16. The A-D converter 47a may for example be a 10-bit A-D converter or any other commercially available A-D converter unit. The second adder circuit 420 is idential in circuit construction with the first adder circuit 410 and its input binary code $Y_{10}, \ldots, Y_1$ represent the same input value as the first adder circuit 410 but its input binary code $X'_{10}, \ldots, X'_1$ represent the value of a constant X' which is different from the constant X.

The first conversion circuit 430 includes a presettable counter 431 (e.g., three units of the RCA IC CD4029) an inverter 432 and an R-S flip-flop 433. The presettable counter 431 is preset by the reset signal R from the reshaping circuit 110 so that the output value of the first adder circuit 410 is read into the presettable counter 431 and at the same time the R-S flip-flop 433 is reset causing its $\overline{Q}$ output to go to the "1" level. The presettable counter 431 counts in the reverse direction in response to the clock pulses from the clock circuit 120 and at the instant that its contents reach the states O, . . .O, a "0" level signal is generated at its carry output CO. The "0" level signal, after inversion through the inverter 432, sets the R-S flip-flop 433 and thus the $\overline{Q}$ output of the R-S flip-flop 433 goes to the "0" level providing the output signal having a time width $T_1$ shown in FIG. 17($H_1$). The time width $T_1$ between the resetting and setting of the R-S flip-flop 433 is proportional to the sum $(X + K')$. Similarly, as shown in FIG. 17($H_2$), the output of the second conversion circuit 440 is an output signal with a time width $T_2$ which is proportional to the sum $(X' + K')$.

While the detailed construction and operation of the second and third multiplier circuits 450 and 460 will not be described here since they are identical in circuit construction with the first multiplier circuit 400, the second multiplier circuit 450 multiplies the output value $M_{10}, \ldots, M_1$ of the first multiplier circuit 400 and the output signal of the first conversion circuit 430 together and it generates a binary code $N_{10}, \ldots, N_1$ corresponding to the $Q \times 1/N + (X + K')$. Similarly, the third multiplier circuit 460 generates a binary code $O_{10}, \ldots, O_1$ corresponding to the $Q \times 1/N(X' + K')$.

Also the detailed construction and operation of the third, fourth, fifth and sixth conversion circuits 470, 480, 490 and 500 will not be described here since they are identical in circuit construction with the first conversion circuit 430. The third and fourth conversion circuits 470 and 480 respectively convert the binary coded output $N_{10}, \ldots, N_1$ of the second multiplier circuit 450 into a pulse signal of time width $T_{A_1}$ corresponding to the rich air-fuel mixture in accordance with the output signals of OR gates 111b and 111c respectively shown in FIGS. 17($B_6$) and 17($B_7$). On the other hand, the fifth and sixth conversion circuits 490 and 500 respectively convert the binary coded output $O_{10}, \ldots, O_1$ of the third multiplier circuit 460 into a pulse signal of a time width $T_{A_2}$ corresponding to the lean air-fuel mixture in accordance with the output signals $B_6$ and $B_7$ of the OR gates 111b and 111c. The output pulse signals of the third, fourth, fifth and sixth conversion circuits 470, 480, 490 and 500 are respectively shown in FIGS. 17($P_3$), 17($P_4$), 17($P_5$) and 17($P_6$).

The selection circuit 510 includes a binary counter 511, OR gates 512a, 512b, 518 and 519, an inverter 513 and AND gates 514, 515, 516 and 517. Under normal operating conditions where the pressure sensing switch 48 is not in operation (in the open position), the OR gates 512a and 512b are closed causing their outputs to go to the "1" level and the output of the inverter 513 to go to the "0" level and the binary counter 511 does not operate maintaining its Q output at the "0" level. Consequently, the AND gates 514 and 517 are closed to block the passage of the pulse signals from the third and fourth conversion circuits 470 and 480 which correspond to the rich air-fuel mixture, and the AND gates 515 and 516 are opened thus passing the pulse signals from the fifth and sixth conversion circuits 490 and 500 which correspond to the lean air-fuel mixture. On the other hand, under high-load operation where the pressure sensing switch 48 is in operation (in the closed position), the OR gates 512a and 512b are opened and the binary counter 511 comes into operation, so that when the synchronizing signal $B_1$ is applied from the reshaping circuit 110 to the clock input terminal CL of the binary counter 511, the signal shown in FIG. 18(Q) which was subjected to a ½ frequency division is generated at the output Q of the binary counter 511 and the AND gate 514 opens during the "1" level of this signal Q thus passing the pulse signal $P_3$ from the third conversion circuit 470. At this time, the AND gate 515 is closed by the inverter 513 and consequently the pulse signal $P_5$ from the fifth conversion circuit 490 is not passed. Thus, the OR gate 518 passes the pulse signal $P_3$ of the third conversion circuit 470 as the output of the selection circuit 510. On the other hand, when the output Q of the binary counter 511 is held at the "0" level, the OR gate 518 passes the pulse signal $P_5$ of the fifth conversion circuit 490. The selection circuit 510 also generates the pulse signal $P_7$ which is shown in FIG. 17($P_7$) and whose time width changes every two crankshaft revolutions. When the output Q of the binary counter 511 is at the "1" level, the AND gate 516 opens to pass the pulse signal $P_6$ of the sixth conversion circuit 500, whereas when the output Q of the binary counter 511 is at the "0" level the AND gate 517 opens to pass the pulse signal $P_4$ of the fourth conversion circuit 480. The selection circuit 510 also generates at the output of the OR gate 519 the pulse signal $P_8$ which is shown in FIG. 18($P_8$) and whose time width changes every two crankshaft revolutions.

The correction circuit 520 includes a 6-bit A-D converter 521 which is identical with the A-D converter circuit comprising the D-A converter circuit 130 and the comparison circuit 140, a 7-bit adder 522 which is identical with the first adder circuit 410, a 6-bit converter 523 which is identical in circuit construction with the first conversion circuit 430, another converter 524 which is identical with the converter 523 and OR gates 525 and 526. In operation, in order to compensate the delay time of the injection nozzle operation in accordance with change of power source voltage, each time the reset pulse R is applied, a variation in the voltage applied to the fuel injection nozzles from the power source (not shown) is converted into a binary code by the A-D converter 521. The unit voltage variation converted to the binary code corresponds to the correction value of the duration of opening of the fuel injection nozzles per 1 volt drop in the supply voltage and it may be preset by adjusting the frequency of the clock pulses. The adder 522 has two parallel inputs, i.e., an input U (binary code) which receives the output of the A-D converter 521 and an input V to which is preliminarily applied a binary code corresponding to a preset time $\Delta T$ for making compensation for the delay in the operation of the fuel injection nozzles namely, a unit time (e.g., 2 msec) corresponding to the delay in the opening and closing operation of the fuel injection nozzle which is determined in consideration of the minimum time required for the injection nozzle to actually open in response to the application of an injection pulse thereto and the delay time due to the inertia of the injection nozzle in closing upon termination of the injection pulse, respectively. Consequently, the adder 522 generates at its output a binary code proportional to a sum (supply voltage variation $\Delta E + \Delta T$). In response to the output of the adder 522, the pulse signal $P_7$ from the selection circuit 510 and the clock pulses from the clock circuit 120, the converter 523 converts the output binary code of the adder 522 into a pulse signal having a time width $T_E$ starting at a point when the pulse signal $P_7$ goes to the "0" level. This pulse signal is shown in FIG. 18($W_1$) and the time width $T_E$ is equal to the value ($\Delta T + \Delta E$). Similarly, in response to the output of the adder 522, the pulse signal $P_8$ from the selection circuit 510 and the clock pulses from the clock circuit 120, the conver 524, starting at a point when the pulse signal $P_8$ goes to the "0" level, converts the output binary code of the adder 522 into the time width $T_E$ and generates the pulse signal shown in FIG. 18($W_2$). Consequently, the correction circuit 520 generates through the OR gates 525 and 526 the two voltage compensated pulse signals $W_3$ and $W_4$ shown in FIGS. 18($W_3$) and 18($W_4$), respectively.

The first distribution circuit 530 includes an R-S flip-flop 531 and AND gates 532 and 533, and the synchronizing signals $B_1$ and $B_4$ from the reshaping circuit 110 are respectively applied to the set terminal S and reset terminal R of the R-S flip-flop 531 thus generating the pulse signals shown in FIGS. 18($R_1$) and 18($R_2$) at the outputs Q and $\overline{Q}$, respectively, of the R-S flip-flop 531. Consequently, the AND gate 532 which receives as its inputs the pulse signal $W_3$ from the correction circuit 520 and the pulse signal $R_1$ from the R-S flip-flop 531, generates in synchronism with the synchronizing signal $B_1$ the signal $S_1$ shown in FIG. 18 ($S_1$). Also the AND gate 533 which receives as its inputs the pulse signal $W_3$ from the correction circuit 520 and the pulse signal $R_2$ from the R-S flip-flop 531, generates in synchronism with the synchronizing signal $B_4$ the pulse signal $S_2$ shown in FIG. 18($S_2$). The second distribution circuit 540 is identical in circuit construction with the first distribution circuit 530 and its R-S flip-flop 541 generates, in response to the synchronizing signals $B_3$ and $B_2$, the pulse signals shown in FIGS. 18($R_3$) and 18($R_4$) at its outputs Q and $\overline{Q}$, respectively. Consequently, AND gates 542 and 543 respectively generate, in synchronism with the synchronizing signals $B_3$ and $B_2$, the pulse signals $S_3$ and $S_4$ shown in FIGS. 18($S_3$) and 18($S_4$), respectively.

The pulse signals $S_1$, $S_2$, $S_3$ and $S_4$ are amplified by the power amplifier circuit 250 and are used to open the fuel injection nozzles 41-1, 42-2, 41-3 and 41-4 in the order of the first, third, fourth and second cylinders. The quantity of fuel injected is controlled by the time width of these signals.

In FIGS. 18($S_1$), 18($S_2$), 18($S_3$) and 18($S_4$), it will be seen that symbols R and L indicate respectively the time widths $T_{A_1} + T_E$ and $T_{A_2} + T_E$, and the values of the time widths R and L are respectively proportional to the $K \times Q \times 1/N \times (X + K')$ and $K_1 \times Q \times 1/N \times (X' \times K')$. By preselecting the values of X and X' so that $X > X'$, we obtain a relation $R > L$ and thus the rich and lean air-fuel mixtures may be supplied. Consequently, each cylinder receives alternately the rich and lean air-fuel mixtures during the suction strokes at intervals of two engine revolutions or at intervals of one cycle including the four strokes of intake, compression, power and exhaust.

A logical circuit 590 includes AND gates 591 and 592, R-S flip-flops 593 and 594, AND gates 595, 596, 597 and 598 and an inverter 599 and it receives the synchronizing signals $B_1$, $B_2$, $B_3$ and $B_4$ from the reshaping circuit 110, the output signal of the OR gate 512a in the selection circuit 510, the inverted output signal of the OR gate 512a and the output signal of the pressure sensing switch 48. Consequently, under normal operating conditions, the pressure sensing switch 48 does not operate causing the output signal of the inverter 599 to go to the "0" level and consequently each of the AND gates 595, 596, 597 and 598 is closed thus generating a "0" level signal. Consequently, the exhaust gas feed nozzles 51A-1, 51A-2, 51A-3 and 51A-4 remain closed and no exhaust gas is recirculated. On the other hand, under high-load operating conditions, the lean and rich air-fuel mixtures are alternately fed to each cylinder and therefore a portion of the exhaust gases is recirculated to each cylinder simultaneously with the feeding of the rich air-fuel mixture. In other words, under high-load operation, the pressure sensing switch 48 is closed so the output signal of the inverter 599 which receives the output signal of the switch 48 goes to the "1" level and the AND gates 595, 596, 597 and 598 are opened. Further, since the rich air-fuel mixture is fed to the first and fourth cylinders and the lean air-fuel mixture is fed to the third and second cylinders when the binary counter 511 of the selection circuit 510 operates as shown in FIG. 18(Q) and the output Q of counter 511 goes to the "1" level, the output signal of the OR gate 512a passing therethrough the "1" level output Q as such and the synchronizing signals $B_1$ and $B_4$ are applied respectively to the AND gate 591 and the R-S flip-flop 593 so that the R-S flip-flop 593 generates at its outputs a pulse signal which remains at the "1" level during the time interval between the generation of the synchronizing signal $B_1$ and the generation of the synchronizing signal $B_4$ and its inverted pulse signal. On the other hand, since the rich air-fuel mixture is fed to the third and second cylinders and the lean air-fuel mixture is fed to the first and fourth cylinders when the output Q of the binary counter 511 is at the "0" level, the "1" level output signal of the inverter 513 in the selection circuit 510 and the synchronizing signals $B_3$ and $B_2$ are applied respectively to the AND gate 592 and the R-S flip-flop 594 so that the R-S flip-flop 594 generates at its outputs a pulse signal which remains at the "1" level during the time interval between the generation of the synchronizing signal $B_3$ and the generation of the synchronizing signal $B_2$ and its inverted pulse signal. The pulse signals and the inverted pulse signals generated from the R-S flip-flops 593 and 594 are respectively applied through the AND gates 595, 596, 597 and 598 to a power amplifier circuit 580 for power amplification and the amplified signals are used to actuate the respective exhaust gas feed nozzles 51B-1, 51B-2, 51B-3 and 51B-4 thereby recirculating the exhaust gas to the cylinders simultaneously with the feeding of the rich air-fuel mixture.

Although the details of the ignition system 300A are not illustrated, it may be provided by slightly modifying the ignition system 300 used in the first embodiment so that the spark plugs 16-1, 16-2, 16-3 and 16-4 may be caused to produce sparks with the optimum ignition timing for the air-fuel ratios of air-fuel mixtures to be burned. In addition, during the transition period form the normal operation to the high-load operation, the ignition timing optimum for the combustion of the rich air-fuel mixture may be retarded temporarily than the optimum timing.

With the second embodiment described above, the combustion of the lean air-fuel mixture is effected in every cycle of all the cylinders under normal operating conditions. On the other hand, when the engine is at high-load operation, the lean and rich air-fuel mixtures are alternately burned repeatedly in all the cylinders at intervals of one cycle. The air-fuel ratios of the lean and rich air-fuel mixtures correspond to those used in the first embodiments. In addition, a portion of the exhaust gases is recirculated to the cylinders in which the rich air-fuel mixture is burned under high-load operating conditions. The recirculation of the exhaust gas is effected by the opening of the exhaust gas feed nozzles 51A-1 through 51A-4 and the exhaust gas is mainly fed into the main combustion chamber 7 of each cylinder. The recirculated gas is derived from the mixture of the exhaust gases collected from all the cylinders.

Thus, on the similar grounds as the first embodiment, both the exhaust emmision control and the provision of the desired power output are accomplished simultaneously by the second embodiment.

THIRD EMBODIMENT

The third embodiment described herein is a four-cylinder, reciprocating engine with a fuel injection system wherein an amount of fuel which provides a lean air-fuel mixture is fed to all the cylinders during the suction stroke of all the continuous, sequential cycles of the cylinders (the fuel injection is effected repeatedly in the order of the first, third, fourth and second cylinders). Under high-load operating conditions an increased amount of fuel which results in a rich air-fuel mixture is fed to the cylinders during the selected suction strokes of all the cycles which are repeated at a predetermined period. In addition, the recurrence period of feeding the increased amount of fuel is decreased as the engine load increases so that at full-load operation, the increased amount of fuel which provides the rich air-fuel mixture is fed during the suction stroke of every cycle. At higher-loads excepting at full load, a portion of the exhaust gases is recirculated to the cylinders during each suction stroke on which the increased amount of fuel is injected.

The construction of the third embodiment is identical with the secnd embodiment except for the control unit which controls the fuel injection nozzles 41-1 through 41-4 and the exhaust gas feed nozzles 51B-1 through 51B-4 mounted on the cylinders, and therefore only the control unit will be described herein. The fuel injection system of this embodiment is of the same type as used in the first embodiment but is modified to accommodate the air-fuel ratios of air-fuel mixtures fed to the cylinders.

Referring now to FIGS. 19A and 19B and the graphs of FIG. 21, there is illustrated the detailed construction of the control unit. The circuit construction of this control unit differs from that of the control unit shown in FIG. 16 in that the binary counter 519a, the OR gates 512a and 512b and the inverter 513 in the selection circuit 510 of FIG. 16 are replaced with inverters 513a and 513b. The control unit further includes a pressure sensor 550 for generating an output voltage proportion to the intake manifold pressure, a computing circuit 560 for receiving and operating on the output voltage of the pressure sensor 550 to apply selection instruction signals to the selection circuit 510. A logical circuit 570 is provided for receiving, along with the selection circuit 510, the selection instruction signals from the computer circuit 560 to control the opening of the exhaust gas feed nozzles 51A-1 through 51A-4. A power amplifier circuit 580 for amplifying the output signals of the logical circuit 570 is provided to operate the exhaust gas feed nozzles mounted on the cylinders.

In the computing circuit 560, numeral 561 designates an analog amplifier for amplifying the output voltage of the pressure sensor 550, 562 is an A-D converter for subjecting the output signal of the analog amplifier 561 to analog-to-digital conversion to a binary code, whereby at higher engine loads with an increase in the intake manifold pressure any one of 8 different binary coded signals is generated in accordance with the magnitude of the intake manifold pressure and any codes greater than these 8 different binary codes are held back. Numeral 563 designates a presettable down counter (e.g., the RCA IC 4029) which is preset to the output binary code of the A-D converter 562 upon application of a preset pulse to its preset terminal, whereby the preset count is counted down each time a pulse or the reset signal R is applied to its clock terminal from the reshaping circuit 110 in addition to an initial pulse passed through an OR gate 563a, thus generating at its carry output terminal a signal $B_9$ which goes and remains at the "1" level during the time interval between the presetting of the counter and the time at which the preset count is reduced to zero. Numeral 564 designates an inverter for inverting the signal $B_9$ to produce an output signal $\bar{B}_9$, 565 a decoder/counter (e.g., the RCA IC 4017) which is reset at the instant that the output signal $\bar{B}_9$ of the inverter 564 goes to the "0" level to count the clock pulses applies to its clock terminal from the clock circuit 120 and generate pulse signals $B_{10}$ and $B'_{10}$ which are synchronized with the resetting operation and have a short time width. The pulse signal $B_{10}$ is applied to the presettable down counter 563 to preset it. Shortly after the presetting the pulse signal $B'_{10}$ is applied to the OR gate 563a. Numerals 566 and 567 designate AND gates for respectively performing an AND operation on the control pulse signal $B_{10}$ from the decoder/counter 565 and the synchronizing signals $B_6$ and $B_7$ from the OR gates 111b and 111c and the control signal of the A-D converter 562 to generate logical pulses $B_{11}$ and $B_{12}$.

The detailed construction of the A-D converter 562 will now be described with reference to FIG. 19C, in which numeral 562a designates a frequency divider for dividing the input clock pulses and generating a reset pulse at each predetermined period, 562b a 4-bit counter which is reset by the reset pulse to count the input clock pulses, 562c a count-voltage converter circuit consisting of a ladder resistance network. A circuit provided by the combination of the counter 562b and the count-voltage converter circuit 562c is identical in construction with the D-A converter circuit 130 but differs from the latter in the number of bits involved. Numeral 562d designates a comparator for comparing the output signal of the analog amplifier 561 and the output voltage of the count-voltage converter circuit 562c and performing a similar function as the comparator 141 in the comparison circuit 140. Numeral 562e designates an OR gate for performing the OR operation on its three inputs, 562f an AND gate for performing the AND operation on its two inputs. The OR gate 562e and the AND gate 562f constitute a logical circuit for generating an output signal which changes from the "0" level to "1" level when the count of the counter 562b becomes greater than the decimal number 9. Numeral 562g designates an OR gate for performing the OR operation on its two inputs, 562h a memory for storing the count of the counter 562b existing at the time when the output signal of the OR gate 562g changes from the "0" level and it is identical in construction with the memory 144 in the comparison circuit 140 but differs in the number of bits involved. Numeral 562i designates a NAND gate for performing the NAND operation on its two inputs and generating a "0" level control signal when the binary code generated from the memory 562h is 1001 corresponding to the decimal number 9.

With the construction described above, the input clock pulses are counted by the counter 562b which is reset by the output pulse of the frequency divider 562a for dividing the clock pulses and the count of the counter 562b is converted into a voltage by the count-voltage converter circuit 562c and applied to one input of the comparator 562d. When this converted voltage attains the voltage value of the analog signal applied from the analog amplifier 561 to the other input of the comparator 562d, the output signal of the comparator 562d changes from the "0" level to "1" level. On the other hand, the OR gate 562e and the AND gate 562f generate a signal which changes from the "0" level to "1" level when the count of the counter 562b reaches the decimal number 9. When the counter 562b is reset, one of the two output signals of the comparator 562d and the AND gate 562f which was generated first is passed through the OR gate 562g and the passage of the other output signal is prevented. When the signal passed through the OR gate 562g is applied to the memory 562h, the count of the counter 562b existing at that time is stored in the memory 562h.

Consequently, under normal operating conditions of the engine where the intake manifold pressure is low, the voltage of the analog signal generated from the analog amplifier 561 is high, whereas the AND gate 562f generates an output signal which changes from the "0" level to "1" level when the count of the counter 562b reaches the decimal number 9 prior to the generation of a "1" signal from the comparator 56d. This output signal is then applied through tge OR gte 562g to the memory 562h thus causing it to store the binary code 1001 corresponding to the decimal number 9. With the conversion operation described so far, under normal operating conditions, the memory 562h generates a binary code corresponding to the decimal number 9 and the NAND gate 562i generates a "0" level control signal.

Under high-load operating conditions where the intake manifold pressure is high, the voltage of the analog signal generated from the analog amplifier 561 is low and consequently the comparator 562d generates a "1" level signal with the count of the counter 562b being lower than the decimal number 8. This signal is applied through the OR gate 562g to the memory 562h thus causing it to store a binary code corresponding to the magnitude of the analog signal. When this occurs, the output of the NAND gate 562i goes to the "1" level thus terminating the control signal. Numerals 568 and 569 designate decoders/counters (e.g., the RCA IC 4017) which are respectively reset by the logical control pulses $B_{11}$ and $B_{12}$ which are applied to their reset terminals to generate selection instruction signals $B_{13}$ and $B_{14}$ which remain at the "1" level until the application of pulses or the synchronizing signals $B_6$ and $B_7$ to their clock terminals. The selection instruction signals $B_{13}$ and $B_{14}$ are respectively applied to the inverters 513a, 513b, the AND gate 514 and 516 in the selection circuit 510.

In the logical circuit 570, numeral 571 designates an OR gate, 572, 573, 574, 575, 576 and 577 AND gates, whereby the AND operation is performed on the selection instruction signals $B_{13}$ and $B_{14}$ and the pulse signals $S_1$, $S_2$, $S_3$ and $S_4$ from the distribution circuits 530 and 540 to selectively pass the pulse signals $S_1$, $S_2$, $S_3$ and $S_4$ while the selection instruction signals $B_{13}$ and $B_{14}$ are at the "1" level thereby open the corresponding exhaust gas feed nozzles in synchronism with the feeding of the rich air-fuel mixture to the cylinders.

With the construction of the principal parts described above, the operation of the control unit will now be described with reference to the characteristic diagram of FIG. 20 and the waveform diagram of FIG. 21. Fig. 20 shows a variation characteristic of the binary coded output of the A-D converter 562 of the computing circuit 560 in relation to the intake manifold pressure under high-load operating conditions of the engine. The value of the binary code output decreases as the engine load increases to gradually increase the number of times the rich air-fuel mixture is fed. Under normal operating conditions of the engine, the A-D converter 562 holds the binary coded output held at a value greater than "8" closing the ANd gates 566 and 567 by the control signal of the "0" level. In FIG. 21 which shows the signal waveforms generated at various points in the computing circuit 560, (R) shows the waveform of the reset signal R from the reshaping circuit 110, ($B_9$) the waveform of the signal $B_9$ generated at the carry output terminal of the presettable down counter 563, ($\bar{B}_9$) the waveform of the inverted signal $\bar{B}_9$ of the signal $B_9$, ($B_{10}$) the waveform of the control pulse signal $B_{10}$ from the decoder/counter 565, ($B_6$) and ($B_7$) the waveforms of the synchronizing signals $B_6$ and $B_7$ from the OR gates 111b and 111c, respectively, ($B_{11}$) the waveform of the logical control pulse $B_{11}$ from the AND gate 566, ($B_{13}$) the waveform of the selection instruction signal ($B_{13}$) from the decoder/counter 568, ($B_{14}$) the waveform of the selection instruction signal $B_{14}$ from the decoder/counter 569, and ($P_7$) and ($P_8$) the waveforms of the pulse signals $P_7$ and $P_8$ from the two lines of the selection circuit 510. FIG. 21 shows the signal waveforms generated when the value of the binary code output of the A-D converter 562 is "3".

Consequently, when the output value of the A-D converter 562 becomes "3", the computing circuit 560 directs a single injection of the rich air-fuel mixture for each three reset pulses R generated. In other words, in response to the selection instruction signals $B_{13}$ and $B_{14}$ from the computing circuit 560, the selection circuit 510 selectively passes, in a similar manner as the second embodiment shown in FIGS. 16A and 16B, theulse signals $P_3$, $P_4$, $P_5$ and $P_6$ generated from the third, fourth, fifth and sixth conversion circuits 470, 480, 490 and 500, respectively, so that the pulse signals $S_1$, $S_2$, $S_3$ and $S_4$ for accomplishing a single injection of the rich air-fuel mixture for each three fuel injections are generated through the correction cirucit 520 and the distribution circuits 530 and 540. The pulse signals $S_1$, $S_2$, $S_3$ and $S_4$, after amplification by the power amplifier circuit 250, are used to sequentially open the fuel injection nozzles in the first, third, fourth and second cylinders in that order. The amount of fuel injected is controlled by the duration of opening of the fuel injection nozzles.

On the other hand, the pulse signals $S_1$, $S_2$, $S_3$ and $S_4$ are also applied to the logical circuit 570 along with the selection instruction signals $B_{13}$ and $B_{14}$ from the computing circuit 560, so that by way of the OR gate 571 and the AND gates 572, 573, 574, 575, 576 and 577 in the logical circuit 570 and the power amplifier circuit 580, the exhaust gas feed nozzles associated with the cylinders fed with the rich air-fuel mixture are opened to recirculate the exhaust gas into the cylinders in addition to the rich air-fuel mixture.

Under normal operating conditions of the engine where the value of the binary code output of the A-D converter 562 in the computing cirucit 560 is held at a value greater than "8", the selection instruction signals $B_{13}$ and $B_{14}$ generated from the computing circuit 560 remain at the "0" level so that the lean air-fuel mixture is fed to all the cylinders and none of the exhaust gas feed nozzles are opened.

When the intake manifold pressure increases so that the value of the binary code outut of the A-D converter 560 becomes "8" (i.e., when the intake manifold pressure is at 690 mmHg), the rich air-fuel mixture is fed once for each 8 fuel injections, and the number of times the rich air-fuel mixture is fed is increased gradually as the value of the binary code output decreases. At the full-load operation where the value of the binary code output becomes lower than "1" (the intake manifold pressure is above about 730 mmHg), the selection instruction signals $B_{13}$ and $B_{14}$ generated from the computing circuit 560 remain at the "1" level so that the rich air-fuel mixture is fed during every suction stroke of all the cylinders and simultaneously the exhaust gas feed nozzles are closed through the action of the OR gate 571 to stop the recirculation of the exhaust gas. Consequently, at the full-load operation where the value of the binary code output is held below "1", the recirculation of the exhaust gas is stopped despite the fact that the rich air-fuel mixture is burned in every cycle of all the cylinders.

With the four-cylinder enging equipped with the above described control unit, under normal operating conditions of the engine, the lean air-fuel mixture is burned in every cycle of all the cylinders which are fired in the order 1-3-4-2. On the other hand, under high-load operating conditions, the rich air-fuel mixture is burned in place of the lean air-fuel mixture in one of plurality of continuous cycles. In addition, the recurrence period of the cycles in which the rich air-fuel mixture is burned is reduced to increase the number of times the rich air-fuel is burned as the engine load increases, and eventually the rich air-fuel mixture is burned in every cycle of the cylinders under the full-load operation. A portion of the exhaust gases is recirculated to the cylinders in which the rich air-fuel mixture is burned, however the recirculation of the exhaust gas is stopped under the full load operation.

Consequently, in addition to the exhaust gas purifying effect achieved by the combustion of the lean air-fuel mixture, the provision of an increased power output is ensured by the combustion of the rich air-fuel mixture in selected cycles thus meeting the power requirements under high-load operating conditions. The power output is increased to suit an increase in the load thus ensuring a smooth increase in the load. The cleaning of the exhaust gases is simultaneously accomplished. The recirculation of exhaust gas to the cylinders burning the rich air-fuel mixture has the effect of further reducing NOx emissions. At full-load operation, the engine is operated by feeding the rich air-fuel micture in every cycle of the cylinders and at the same time the recirculation of the exhuast gas is stopped thus considerably increasing the power output. The combustion of the rich air-fuel mixture in every cycle of all the cylinders increases the amounts of CO and HC in the exhaust gases. However, considering the actual driving conditions of automobiles, the full-load operation (in the present embodiment, any operation where the intake manifold pressure is above about 720 mmHg) is required only in the case of an emergency such as rapid acceleration when a particularly high power output is demanded. The frequency of such emergencies is very low and the harmfull components contained in the exhaust gases emitted has a very limited detrimental effect on the environment. Therefore, though the rich air-fuel mixture is burned in every cycle of all the cylinders to ensure the required power output only at full-load operation, the desired exhaust emission control on the whole is in effect accomplished satisfactorily.

FOURTH EMBODIMENT

The fourth embodiment illustrated and described herein is a four-cylinder, reciprocating engine employing a carburetor as an air-fuel mixture feeding device. In this embodiment, while the carburetor is designed to feed both lean and rich air-fuel mixtures to the cylinders, as an overall average air-fuel mixture a lean air-fuel mixture is fed to the cylinders. However, under high-load operating conditions, a rich air-fuel mixture (as compared with the average air-fuel mixture prevailing in the cylinders) is fed to some cylinders, while at high-load and high-speed operation the rich air-fuel mixture is fed to all the cylinders. The recirculation of exhaust gas is made to some cylinders to which the rich air-fuel mixture is fed under high-load operating conditions except at high speeds.

Referring to FIGS. 22 and 23 which show the four-cylinder, reciprocating engine according to the fourth embodiment of the invention, a cylinder head 2 is formed with intake ports 4 and exhaust ports 5, and a total of four rich mixture delivery passages 33 are provided for the cylinders. In each cylinder, the rich mixture delivery passage 33 is positioned practically adjacent to the inner wall of the curved outer periphery portion of the intake port 4 and it also opens just to the back of a valve head 18 of an intake valve 18. When the intake valve 18 opens, the open end of the rich mixture delivery passage 33 is positioned opposite to a suction aperture 13 in a cup 10 so that the passage 33 communicates with the suction aperture 13 through a portion of the intake port 4 and a portion of a main combustion chamber 7. The communication between the rich mixture delivery passage 33 and the suction aperture 13 is interrupted by the intake valve 18 which also interrupts the communication between the intake port 4 and the main combustion chamber 7.

An intake manifold assembly 20A which is secured to the cylinder head 2 comprises in combination a single manifold 20A-1 for conducting a lean air-fuel mixture and a pair of manifolds 20A-2 and 20A-3 for rich air-fuel mixture. The lean mixture manifold 20A-1 of the intake manifold assembly 20A communicates with the respective intake ports 4 in the cylinder head 2, whereas the first rich mixture manifold 20A-2 communicates with the rich mixture delivery passage 33 of each of first and fourth cylinders $C_1$ and $C_4$ and the second rich mixture manifold 20A-3 communicates with the rich mixture delivery passage 33 of each of second and third cylinders $C_2$ and $C_3$. The lower end of the intake manifold assembly 20A in connected to a thermal reactor 25 so that the intake manifold assembly 20A is heated by the exhaust gases.

A carburetor 60 is connected to the upper ends of the intake manifold assembly 20A. The carburetor 60 includes three barrels, namely, a lean mixture barrel 61 and first and second rich mixture barrels 62 and 63. The lean mixture barrel 61 communicates with the lean mixture manifold 20A-1 of the intake manifold assembly 20A, while the first rich mixture barrel 62 communicates with the first rich mixture manifold 20A-2 and the second rich mixture barrel 63 communicates with the second rich mixture manifold 20A-3. The barrels 61, 62 and 63 are respectively formed with venturies 61a, 62a and 63a, and a small venturi 61b is also provided in the lean mixture barrel 61. A main nozzle 64 for lean air-fuel mixture opens to the small venturi 61b in the lean mixture barrel 61, while a first rich mixture main nozzle 65 opens to the venturi 62a in the first rich mixture barrel 62 and a second rich mixture main nozzle 66 opens to the venturi 63a in the second rich mixture barrel 63. As is customary in the art, the main nozzles 64, 65 and 66 are connected to a float chamber 67 through the respective main fuel passages and the main jets. Although the main jet leading to the first rich mixture main nozzle 65 is not shown, it is identical with the main jet leading to the second rich mixture main nozzle 66. The lean mixture barrel 61 and the first and second rich mixture barrels 62 and 63 are further provided respectively with throttle valves 68, 69 and 70 which are mounted downstream of their venturies. Although not shown, the throttle valves 68, 69 and 70 are operatively associated with one another and they are opened and closed by the accelerator pedal. Slow ports 71, 72 and 73 respectively open to the barrels 61, 62 and 63 at positions which correspond to the position of the throttle valves 68, 69 and 70, and idle ports 74, 75 and 76 also respectively open to the barrels 61, 62 and 63 downstream of the slow ports 71, 72 and 73. These ports are connected to the main fuel passages through the respective slow fuel passages as is known in the art.

A first mixture enrichment device 80 is provided in a main fuel passage 77 leading to the first rich mixture main nozzle 65. The first mixture enrichment device 80 is formed therein with a fuel passage 81 communicating with the float chamber 67 on one end and joining the main fuel passage 77 on the other, and a fuel jet 82 and a valve 83 are provided in the fuel passage 81. The valve 83 which opens and closes the fuel passage 81 is connected to a piston 84 and the piston 84 is fitted in a control cylinder 85. The control cylinder 85 is designed so that the pressure downstream of the throttle valve in the lean mixture barrel 61 (namely, the intake manifold pressure) is introduced into the control cylinder 85 through a passage 86. A three way solenoid valve 87 is mounted in the passage 86, and the three way solenoid valve 87 is designed to control the passage 86 to be opened and closed to the atmosphere. The three way solenoid valve 87 is controlled by a control circuit 88. Consequently, the intake manifold pressure is introduced into the control cylinder 85 only when the passage 86 is not opened to the atmosphere by the solenoid valve 87 which is controlled by the control circuit 88. The details of the control circuit 88 will be described later. The load by a spring 89 acts on the piston 84 in a direction which causes the valve 83 to open the fuel passage 81.

A second mixture enrichment device 80A is provided in a main fuel passage 78 leading to the second rich mixture main nozzle 66. The second mixture enrichment device 80A is practically the same in construction with the first mixture enrichment device 80. However a fuel passage 81A which is opened and closed by a valve 83A is communicated with the main fuel passage 78. The opening and closing of a solenoid valve 87A is controlled by the control circuit 88.

The first and second mixture enrichment devices 80 and 80A come into operation when the respective control cylinders 85 and 85A are opened to the atmosphere so that the fuel passages 81 and 81A are opened by their valves 83 and 83A under the action of the springs 89 and 89A, whereas the first and second mixture enrichment devices 80 and 80A are brought out of operation when the intake manifold pressure is introduced into the respective control cylinders 85 and 85A so that the fuel passages 81 and 81A are closed by the valves 83 and 83A. When operated, the first and second mixture enrichment devices 80 and 80A respectively supply fuel to the first and second rich mixture main nozzles 65 and 66 with which they are associated. This fuel supply increases the amount of fuel discharged through each of the main nozzles 65 and 66.

The carburetor 60 is adjusted so that a very lean mixture with an air-fuel ratio of above 17 : 1 (more preferably a ratio of about 20 : 1) is formed in the lean mixture barrel 61, whereas when the mixture enrichment devices 80 and 80A are not in operation a very rich mixture with an air-fuel ratio between 1.5 : 1 to 9 : 1 (more preferably a ratio of about 5.3 : 1) is formed in each of the second and third rich mixture barrels 62 and 63, and when the mixture enrichment devices 80 and 80A are in operation a richer mixture with an air-fuel ratio between 1 : 1 to 6 : 1 (more preferably a ratio of about 1.4 : 1) is formed in each of the barrels 62 and 63. The weight flow rate of air contained in each of these mixtures is adjusted so that the weight flow rate of air contained in the rich mixtue formed in and measured at the first rich mixture barrel 62 is practically the same as the weight flow rate of air contained in the rich mixture formed and and measured at the second rich mixture barrel 63, and the sum of delivery passages 33 of the first and fourth cylinders through the first rich mixture manifold 20A-2. The exhaust gas delivery port 51B is connected to a recirculation pipe 54B by a joint 52B and it is also connected to an exhaust pipe 32 through a control valve 55B (of the same construction as used in the first embodiment), an orifice 56B and a recirculation pipe 57B. Cooling fins 57B' are provided on the recirculation pipe 57B. The intake manifold pressure is introduced into a pressure chamber 55a of the control valve 55B through a three way solenoid valve 58B. The pressure developed downstream of the throttle valve in the lean mixture barrel 61 of the carburetor 60 is taken out as the intake manifold pressure. The solenoid valve 58B is controlled by the control circuit 88 which also controls the mixture enrichment devices 80 and 80A.

In FIG. 24, there is illustrated a detailed construction of the control circuit 88 which controls the three way solenoid valves 87 and 87A of the first and second mixture enrichment devices 80 and 80A and the three way solenoid valve 58B of the exhaust gas recirculating system 50B.

In the control circuit 88, the temperature of the engine cooling water is detected by a thermistor 88a so that when the water temperature exceeds a preset value, a comparator 88b generates a "1" output. The preset value is 20° C. On the other hand, the number of revolutions of the engine is detected by means of, for example, an engine revolution signal generator 88c which is similar to the engine revolution signal generator 46 shown in FIG. 4 so that when the value of the engine revolutions exceeds a first preset value a first comparator 88d generates a "1" output, whereas a second comparator 88e generates a "1" output when the value of the engine revolutions becomes lower than a second preset value. The first preset value is selected to be 1,000 rpm and the second preset value is selected to be 3,000 rpm. One of a pair of semi-conductor pressure sensors 88f and 88g detects the pressure in the intake manifold and the other sensor detects the atmospheric pressure, so that a comparator 88h generates a "1" output when the pressure difference becomes lower than a predetermined value. The predetermined value is selected 80 mmHg (corresponding to the intake manifold pressure of 680 mmHg).

An AND gate 88i receives the output of the cooling water temperature comparator 88b, the first revolution comparator 88d and the intake manifold pressure comparator 88h so that when all the comparator outputs are "1's", a "1" output is generated to turn on a transistor 88j. When the transistor 88j is turned on, the three way solenoid valve 87 of the first mixture enrichment device 80 in the carburetor 60 is energized by a battery 309. When the three way solenoid valve 87 is de-energized, the communication between the passage 86 and the atmosphere is interrupted, whereas the passage 86 is opened to the atmosphere when the solenoid valve 87 is energized. Consequently, when the solenoid valve 87 is energized, the atmospheric pressure is introduced into the control cylinder 85 and thus the first mixture enrichment device 80 comes into operation.

On the other hand, an AND gate 88k receives directly the output of the cooling water temperature comparator 88b and the intake manifold pressure comparator 88h and it also receives the output of the second revolution comparator 88e through an inverter 88l. Only when the cooling water temperature comparator 88b and the intake manifold pressure comparator 88h respectively generates a "1" output and the second revolution comparator 88e generates a "0" output, does the AND gate 88k generate a "1" output to turn on a transistor 88m. When the transistor 88m is turned on, current is supplied from the battery 309 to the three way solenoid valve 87A of the second mixture enrichment device 80A in the carburetor 60. The energization of the three way solenoid valve 87A causes a passage 86A to open to the atmosphere to introduce the atmosphere pressure into the control cylinder 85A and thus bring the second mixture enrichment device 80A into operation.

On the other hand, an AND gate 88n generates a "1" output when the outputs of the first and second revolution comparators 88d and 88e are all "1's". An AND gate 88p generates a "1" signal and turns on a transistor 88q only when the outputs of the cooling water temperature comparator 88b, the AND gate 88n and the intake manifold pressure comparator 88h are all "1's". The conduction of the transistor 88q causes a flow of current from the battery 309 to the three way solenoid valve 58B of the exhaust gas recirculating system 50B. When the three way solenoid valve 58B is energized, the intake manifold pressure is introduced into the pressure chamber 55a of the control valve 55B.

With the control circuit constructed as above described, the first mixture enrichment device 80 of the carburetor 60 operates in a high-load operating range where three conditions, namely, the cooling water temperature higher than 20° C, engine speed greater than 1,000 rpm and intake manifold pressure higher tha 680 mmHg, are all satisfied. The second mixture enrichment device 80A similarly comes into operation in another high-load operating range where all of the following three conditions are met, namely, the cooling water temperature is above 20° C, engine speed is 3,000 rpm and intake manifold pressure is above 680 mmHg.

On the other hand, the exhaust gas recirculating system 50B recirculates a portion of the exhaust gases to the first and fourth cylinders under high-load operating conditions except under the high-speed operating conditions, where all of the following conditions are met, namely, the cooling water temperature is above 20° C, engine speed is between 1,000 rpm and 3,000 rpm and intake-manifold pressure is above 680 mmHg. In this range of operating conditions for exhaust gas recirculation, only the first mixture enrichment device 80 of the carburetor 60 comes into operation.

Although an ignition system 300B which is connected to spark plugs 16-1, 16-2, 16-3 and 16-4 mounted on the cylinders is not shown in any detail, it may be provided by slightly modifying an ignition system of the type used in the first embodiment. Consequently, the spark plugs may be caused to produce ignition sparks with the proper ignition timing that suits the air-fuel ratios of the mixtures burned.

With the construction described above, the fourth embodiment operates as follows. The lean air-fuel mixture formed in the lean mixture barrel 61 of the carburetor 60 is delivered to the intake port 4 of each cylinder through the lean mixture manifold 20A-1. On the other hand, the rich air-fuel mixture formed in the first rich mixture barrel 62 of the carburetor 60 is delivered through the first rich mixture manifold 20A-2 to the rich mixture delivery passages 33 of the first and fourth cylinders, while the rich air-fuel mixture formed in the second rich mixture barrel 63 of the carburetor 60 is delivered through the second rich mixture manifold 20A-3 to the rich mixture delivery passages 33 of the second and third cylinders.

During the suction stroke of each cylinder, the lean air-fuel mixture is drawn into the main combustion chamber 7 through the intake port 4 and the rich air-fuel mixture fed from the rich mixture delivery passage 33 is sucked into a trap chamber 12 through the suction aperture 13 thus accomplishing the stratified combustion in the same manner as the first embodiment.

With the carburetor 60 constructed as above described, in any operating range of the engine where any one of three conditions is satisfied, that is, where the cooling water temperature is below 20° C, the engine speed is below 1,000 rpm or the intake manifold pressure is below 680 mmHg (i.e., the operating range corresponding substantially to normal engine operating conditions), the lean air-fuel mixture with a ratio of above 17 : 1 (the optimum ratio is about 20 : 1) is sucked into the main combustion chamber 7 through the intake port 4 and the rich air-fuel mixture with a ratio between 1.5 : 1 to 9 : 1 (the optimum ratio is about 5.3 : 1) is sucked into the trap chamber 12 through the rich mixture delivery passage 33 in every one of the cylinders. The proportion of the amount by weight of the air in the rich air-fuel mixture to that contained in the combined air-fuel mixture is between 1 to 10% (the optimum rate is about 4). Consequently, the average air-fuel ratio of the combined mixture prevailing in the cylinder is between 17 : 1 to 22 : 1 (the optimum ratio is about 18 : 1) and this lean air-fuel mixture is burned by the stratified combustion process. It is to be noted that an increased amount of fuel for warming-up operation is supplied by means of a known type of choke device.

When the engine comes into a high-load operation with the engine speed below 3,000 rpm, the first mixture enrichment device 80 of the carburetor 60 comes into operation so that the rich air-fuel mixture formed in the first rich mixture barrel 62 and sucked into the trap chamber 12 of the first and fourth cylinders is enriched to provide an air-fuel ratio between 1 : 1 to 6 : 1 (the optimum ratio is about 1.4 : 1). Consequently, the average air-fuel ratio of the combined mixture prevailing in each of the first and fourth cylinders is now between 11 : 1 to 14.7 : 1 (the optimum ratio is about 13 : 1), and this rich air-fuel mixture is burned in the first and fourth cylinders. Thus, the required power output is produced. In this operating range, the control valve 55B is opened in the exhaust gas recirculating system and thus a portion of the exhaust gases is recirculated to the first and fourth cylinders in which the rich air-fuel mixture is burned. In this case, a portion of the mixed exhaust gases collected from all the cylinders and the exhaust gas is added to the rich air-fuel mixture or it is recirculated into the trap chamber 12. In this way, both the exhaust emission control and the provision of the required power output are ensured.

When the engine speed becomes higher than 3,000 rpm under high-load operating conditions, also the second mixture enrichment device 80A also comes into operation so that the rich air-fuel mixture is burned in the second and third cylinders in addition to the first and fourth cylinders. Simultaneously, the recirculation of the exhaust gas is stopped. Thus, the required power output is ensured.

While, in the fourth embodiment described above, the intake manifold assembly 20A and the carburetor 60 include three subunits, namely, one for the lean air-fuel mixture and the other two for the rich air-fuel mixture, the same results may be obtained with a different set of three sub-units, namely, two units for the lean air-fuel mixture and the remaining one unit for the rich air-fuel mixture.

This type of arrangement is shown in FIG. 25 showing a modified form of the fourth embodiment. In FIG. 25, the intake manifold assembly 20A includes a first lean mixture manifold 20A-1 connected to the intake port 4 of the first and fourth cylinders, respectively, a second lean mixture manifold 20A-2 connected to the intake port 4 of each of the second and third cylinders and a rich mixture manifold 20A-3 connected to the rich mixture delivery passage 33 of each cylinder. Although not shown, a carburetor which is a modification of the type shown in FIG. 23 is connected to the intake manifold assembly 20A so that the lean air-fuel mixture is supplied to the first and second lean mixture manifolds 20A-1 and 20A-2 and the rich air-fuel mixture is supplied to the rich mixture manifold 20A-3. The lean air-fuel mixture delivered to the first lean mixture manifold 20A-1 is enriched when the engine speed during high-load operation exceeds 1,000 rpm, while the lean air-fuel mixture delivered to the second lean mixture manifold 20A-2 is enriched when the engine speed at high-load operation exceeds 3,000 rpm. The air fuel ratios of the mixtures and the weight percents of the air contained in the mixtures are selected in such a manner that the same average air-fuel ratio of the mixtures as in the case of the fourth embodiment is obtained in consideration of the stratified condition of the mixtures in the cylinders.

In this modified arrangement, the exhaust gas recirculating system 50B recirculates a portion of the exhause gases to the downstream end of the rich mixture manifold 20A-3 which is connected to the first and fourth cylinders.

Thus, this modification has the same functional effect as the fourth embodiment.

FIFTH EMBODIMENT

The fifth embodiment is a four-cylinder, reciprocating engine in which the delivery of a lean air-fuel mixture to a main combustiion chamber and the delivery of a rich air-fuel mixture to a trap chamber are accomplished through a single intake port in each cylinder. In this embodiment, the carburetor basically feeds the lean air-fuel mixture to the cylinders and the rich air-fuel mixture is fed to some cylinders under high-load operating conditions.

In the fifth embodiment engine shown in FIGS. 26 and 27, each of its four cylinders includes a main combustion chamber 7 and a trap chamber 12 which are similar in construction with those shown in FIGS. 22 and 23. However, there is only a single mixture delivery passage to the two chambers, namely, an intake port 4 which is opened and closed by an intake valve 18. The intake port 4 is curved and a suction aperture 13 in the trap chamber 12 is positioned on an extension of the curved outer peripheral wall surface of the intake port 4.

An intake manifold assembly 20B includes first and second manifolds 20B-1 and 20B-2 which are respectively connected to the intake ports 4 of the first and fourth cylinders and the intake ports 4 of the second and third cylinders.

A carburetor 60A includes a first barrel 61A connected to the first manifold 20B-1 and a second barrel 62A connected to the second manifold 20B-2. The first and second barrels 61A and 62A are respectively provided with main nozzles 65A and 66A, slow ports 72A and 73A, idle ports 75A and 76A and throttle valves 69A and 70A which are similar in construction to those shown in FIG. 23. The main nozzles 65A and 66A are respectively provided with first and second mixture enrichment devices 80 and 80A which are identical in construction with those shown in FIG. 23. The mixture enrichment devices 80 and 80A come into operation under the same operating conditions as those shown in FIG. 23. The construction of a control circuit 88 is also the same as that shown in FIG. 24.

The carburetor 60A constructed as described above is adjusted so that when the mixture enrichment devices 80 and 80A are not in operation, the lean mixture with an air-fuel ratio between 17 : 1 to 22 : 1 (the optimum ratio is about 18 : 1) is formed) in each of the barrels 61A and 62A, whereas when the mixtue enrichment devices 80 and 80A are in operation, the rich air-fuel mixture with a ratio between 11 : 1 to 14.7 : 1 (the optimum ratio is about 13 : 1) is formed in each barrel to which is fed an additional fuel.

An exhaust gas recirculating system 50B is identical in construction with the system shown in FIG. 23 except for its exhause gas delivery section. A control valve 55B also comes into operation under the same conditions as in the case of FIG. 23. The exhaust gas delivery section includes an exhaust gas delivery duct 51B' provided for the intake port 4 in each of the first and fourth cylinders and each delivery duct 51B' opens to the back of a valve head 18a of the intake valve 18 at a position adjacent to the suction aperture 13 of the trap chamber 12.

With the construction described above, the operation of the fifth embodiment is as follows.

A mixture with a substantially uniform air-fuel ratio is delivered to the intake port 4 in each cylinder. The intake port 4 is curved downwardly so that the air-fuel mixture is separated into a relatively rich mixture portion and a relatively lean mixture portion under the action of its inertia with the rich mixture portion gathering in the outward portion. Thus, the rich mixture is sucked into the trap chamber 12 through the suction aperture 13. This results in a stratified combustion of the mixture.

By virtue of the arrangements of the carburetor 60A and the exhaust gas recirculating system 50B, the same functional effects as the previously described fourth embodiment are produced. The recirculation of exhause gas is effected by delivering a portion of the exhaust gases to the suction aperture 13 in each of the first and fourth cylinders through the delivery duct 51B'.

SIXTH EMBODIMENT

This embodiment is a four-cylinder, reciprocating engine wherein each cylinder is fed with air in addition to an air-fuel mixture under normal operating conditions, whereas the supply of air to some cylinders is stopped under high-load operating conditions where a high power output is required. The air supply to all the cylinders is stopped under high-load operating conditions where a still higher power output is required. In this way, the same operation as the previously described fourth embodiment is accomplished.

The sixth embodiment of FIG. 28 differs from the fourth embodiment in that an intake manifold assembly 20B includes a lean mixture manifold 20B-1 connected to the intake ports 4 in all the cylinders, a rich mixture manifold 20B-2 connected to the rich mixture delivery passages 33 of all the cylinders, a first air manifold 20B-3 which is opened to those portions of the lean mixture manifold 20B-1 which communicate with the first and fourth cylinders, and a second air manifold 20B-4 which is opened to those portions of the lean mixture manifold 20B-1 which communicate with the second and third cylinders.

A carburetor 60B which is shown in FIG. 28B is connected to the intake manifold assembly 20B so that the lean air-fuel mixture which is formed in a lean mixture barrel 61B is delivered to the lean mixture manifold 20B-1 and the rich air-fuel mixture which is formed in a rich mixture barrel 62B is delivered to the rich mixture manifold 20B-2. The air-fuel ratios and the amounts of air in these mixtures are selected so that when these mixtures only are fed to each cylinder, the average air-fuel mixture of the resulting mixture in each cylinder is between 11 : 1 to 14.7 : 1 (the optimum ratio is about 13 : 1). On the other hand, air is supplied to the first and second air manifolds 20B-3 and 20B-4 through first and second air barrels 63B-1 and 63B-2, respectively. The flow rate of air supply is controlled by throttle valves 70B-1 and 70B-2 which are operatively associated, respectively with the throttle valves 68B and 69B which respectively control the amount of the lean and rich air-fuel mixtures. The flow rate of air supply is controlled in such a manner that when air is supplied, the lean air-fuel mixtue is diluted and thus the average air-fuel ratio of the resulting mixture in the cylinder falls between 17 : 1 and 22 : 1 (the optimum ratio is about 18 : 1).

The first and second air barrels 63B-1 and 63B-2 are provided respectively with means 90 and 90A for interrupting the supply of air so that under normal operating conditions both of barrels 63B-1 and 63B-2 supply air, whereas under high-load operating conditions the supply of air from the first air barrel 63B-1 is stopped, and the supply of air from the second air barrel 63B-2 is also stopped under high-speed, high-load operating conditions. The means 90 and 90A for interrupting the supply of air may comprise, as shown in FIGS. 28B, 28C and 28D (though only the means 90 for the first air barrel 63B-1 is shown, the other means 90A is identical in construction with the means 90), an on-off valve 91 mounted in the barrel 63B-1 upstream of the throttle valve 70B-1, and a lever 92 is rotatably mounted on the portion of a valve shaft 91a of a valve 91 which is extended to the outside of the carburetor 60B. A solenoid 94 is connected to the lever 92 by means of a link 93. A spring 95 for holding the on-off valve 91 in its full open position is provided to act on the lever 92. When energized, the solenoid valve 94 attracts the lever 92 through the link 93 and places the on-off valve 91 in its full closed position. The operation of the solenoids 94 and 94A of the means 90 and 90A which are respectively mounted in the first and second air barrels 63B-1 and 63B-2, may be controlled by the control circuit shown in FIG. 24. (For instance, the three way solenoid valve 87 is replaced with the solenoid valve 94 for the first air barrel 63B-1 and the three way solenoid valve 87A is replaced with the solenoid valve 94A for the second air barrel 63B-2. Each of the barrels is opened when its solenoid valve is de-energized, whereas the barrel is closed when the solenoid valve is energized.)

It will thus be seen that the sixth embodiment performs the same operation as the fourth embodiment.

SEVENTH EMBODIMENT

The embodiment illustrated and described herein is a twin-rotor, rotary piston engine with a fuel injection system. In this embodiment, the fuel injection system basically feeds in each cycle of the cylinders an amount of fuel which results in a lean air-fuel mixture, whereas under high-load operating conditions an increased amount of fuel which provides a rich air-fuel mixture as fed to one of the cylinders. Under full-load operating conditions, an increased amount of fuel which provides a rich air-fuel mixture is fed to all the cylinders. Under high-load operating conditions except the full-load operation, a portion of the exhaust gases is recirculated to that one cylinder.

Referring to FIGS. 29 and 30 which show the seventh embodiment rotary piston engine, a housing 800 includes side housings 801 and 802, a center housing 803 and rotor housings 804 and 805, and a pair of chambers are defined inside the housing 800. Among the various surfaces of the housing 800, the inner surfaces of the side housings 801 and 802 and the sides of the center housing 803 are all plane surfaces, while each of the rotor housings 804 and 805 has an inner surface which is made of torochoidal curves with two arches. The two chambers respectively contain first and second rotors 806. Each of the rotors 806 is formed into a triangular shape and the rotors 806 are mounted on a common output shaft 807. The first and second rotors 806 are mounted on the output shaft 807 with a phase difference of 180° therebetween in terms of the degrees of rotation of the output shaft 807.

Since rotor assmeblies $C_1$ and $C_2$ respectively including the first and second rotors 806 are identical in construction with each other, the construction of the first rotor assembly $C_1$ will be described by way of example. The rotor 806 is provided with an apex seal 808 fitted in each of the rotor apexes. The apex seals 808 are held in contact with the inner surface of the rotor housing 804. The sides of the rotor 806 are also held in contact with the inner side of the side housing 801 and the side of the center housing 803. The peripheral faces of the rotor 806 divide the chamber of the housing 800 into three working chambers 809, 810 and 811. The rotor 806 makes a planetary rotary motion in the direction of an arrow so that each of the working chambers performs the four strokes of suction, compression, power and exhaust as the rotor 806 makes the planetary rotary motion.

The side housing 801 is formed with an intake port 812 which opens inside the inner surface of the rotor housing 804. The intake port 812 is opened on the inner surface of the rotor housing 804 in direction which is slightly advanced with respect to the torochoid minor axis as viewed in the direction of rotation of the rotor 806. The rotor housing 804 is formed with an exhaust port 813 which opens in the inner surface thereof. The exhaust port 813 is opened at a position somewhat retarded with respect to the torochoidal minor axis as viewed in the direction of rotation of the rotor 806. The rotor housing 804 is further formed with a fuel injection port 814 which is opened in the inner surface thereof. The fuel injection port 814 is opened at a position on the forward side of the intake port 812 as viewed in the direction of rotation of the rotor 806. While the fuel injection port 814 and the intake port 812 are positioned relative to each other as mentioned above in relation to the direction of rotation of the rotor 806, the working chamber during the suction stroke first communicates with the intake port 812 and it is then communicated with the fuel injection port 814 as the rotor 806 rotates.

A fuel injection nozzle 841-1 of a fuel injection system 840 is mounted in the fuel injection port 814. The fuel injection nozzle 841-1 is positioned in such a direction that it is inclined in the direction of rotation of the rotor 806 with respect to the normal line of the inner surface of the rotor housing 804. The detailed construction of the fuel injection system 840 is the same as the system shown in FIGS. 3 and 4. A pair of spark plugs, namely, leading and trailing spark plugs 815 and 816 are mounted in the rotor housing 804 to face the working chamber on the compression stroke at positions which are on the leading and trailing sides in the direction of rotation of the rotor 806 on both sides of the torochoidal minor axis.

The housing 800 is connected to an intake manifold 820 which is connected to the intake ports 812 of the first and second rotor asemblies $C_1$ and $C_2$. The intake manifold 820 includes a throttle valve 821 which controls the amount of air supply to the intake ports 812. The housing 80 is also connected to a manifold reactor 825 which in turn is connected to an exhaust pipe 832. The manifold reactor 825 is connected to the exhaust ports 813 of the rotor assemblies $C_1$ and $C_2$.

An exhaust gas recirculating system 850 is connected to the downstream end of the intake manifold 820 which is connected to the intake port 812 of the first rotor assembly $C_1$. The exhaust gas recirculating system 850 includes an exhaust gas delivery port 851 at the downstream end of the intake manifold 820 communicating with the first rotor assembly $C_1$, and it also includes a control valve 855 which opens in response to the introduction of the intake manifold pressure, a three way solenoid valve 858 which controls the introduction of the intake manifold pressure and atmospheric pressure into the control valve 855 and recirculation lines 854 and 857. The detailed construction of the exhaust gas recirculating system 850 is the same as the system shown in FIG. 3.

The fuel injection nozzles of the fuel injection system 840 and the three way solenoid valve 858 of the exhaust gas recirculating system 850 are controlled by a control unit 900. The details of the control unit 900 are shown in FIG. 31.

The circuit construction of the control unit 900 shown in FIG. 31 differs from that of the second embodiment shown in the circuit diagram of FIG. 16 in that the synchronizing signal generator 46 generates two synchronizing signals $A'_1$ and $A'_2$ for every revolution of the rotary engine output shaft 807 in synchronizm with the fuel injection times of the cylinders, the reshaping circuit 110 includes two logical delay circuits 110a and 110b for respectively generating two reshaped synrhnizing signals $B'_1$ and $B'_2$, and the OR gates 111b and 111c are eliminated. In addition, the selection circuit 510, the correction circuit 520 and the first and second distribution circuits 530 and 540 are replaced by a sequential selection circuit 600, the four line power amplifier circuit 250 is replaced by a two line power amplifier circuit 610, the logical circuit 590 is replaced by an AND gate 620 and the four line power amplifier circuit 580 is replaced by a single line power amplifier circuit 630 to thereby control the fuel injection nozzles 841-1 and 841-2 and the solenoid valve 858.

The sequential selection circuit 600 receives the output signal of a first pressure sensing switch 48 which closes under high-load operating conditions where the intake manifold pressure becomes greater than about 680 mmHg and the output signal of a second pressure sensing switch 48a which closes under full-load operating conditions where the intake manifold pressure becomes greater than about 720 mmHg, whereby under normal operating conditions where the intake manifold pressure is below about 680 mmHg, a lean air-fuel mixture (the range of air-fuel ratios is similar to that of the first embodiment) is fed to all the cylinders, whereas a rich air-fuel mixture is fed to the first cylinder only under the high-load operation, while the rich air-fuel mixture (the range of air fuel ratios is similar to that of the first embodiment) is fed to all the cylinders under the full-load operation. In this embodiment, the timing of fuel injection from each fuel injection nozzle is selected so that the fuel injection begins as soon as any apex seal 808 of the rotor 806 moves past the fuel injection port 814 in the rotor housing 804.

In the sequential selection circuit 600, numerals 601 and 602 designate inverters for respectively inverting the first and second output signals of the first and second pressure sensing switches 48 and 48a after the absorption of the chattering thereof. Numerals 603, 604, 605 and 606 designate AND gates for performing the AND operation on the first and second switch output signals, the inverted switch output signals and the pulse signals $P_3$, $P_4$, $P_5$ and $P_6$ from the third, fourth, fifth and sixth conversion circuits 470, 480, 490 and 500. Numerals 607 and 608 designate OR gates for respectively performing the OR operation on the output pulse signals of the AND gates 603 and 604 and the output pulse signals of the AND gates 605 and 606. The fuel injection nozzles 841-1 and 841-2 of the first and second cylinders are controlled in accordance with the output pulse signals of the OR gates 607 and 608 through the power amplifier circuit 610. On the other hand, the AND gate 620 performs the AND operation on the inverted output signal of the inverter 601 and the second switch output signal which is also applied to the inverter 602 so that the solenoid valve 858 of the exhaust gas recirculating system 850 which is connected to the first cylinder, is opened through the power amplifier circuit 630 only during high-load operation where the engine load is less than the full load.

With the construction described above, the operation of the control unit 900 will now be described with reference to the waveform diagram of FIG. 32. In FIG. 32, $(A'_1)$ and $A'_2)$ respectively show the waveform of the synchronizing signals $A'_1$ and $A'_2$ generated from the synchronizing signal generator 46, and $(B'_1)$ and $(B'_2)$ show the waveforms of the synchronizing signals $B'_1$ and $B'_2$ reshaped respectively by the logical delay circuits 110a and 110b. The other waveforms will not be described since they are the same as those of the second embodiment. Namely, the pulse signals respectively shown in $(P_3)$, $(P_4)$, $(P_5)$ and $(P_6)$ of FIG. 32 are generated from the third, fourth, fifth and sixth conversion circuits 470, 480, 490 and 500 through the same circuits as used in the second embodiment. Under normal operating conditions, both of the first and second pressure sensing switches 48 and 48A are held open thus applying "0's" to the AND gates 603 and 605 respectively following the inverters 601 and 602 and consequently the AND gates 603 and 605 are closed preventing the passage of the rich mixture pulse signals $P_3$ and $P_4$ generated from the third and fourth conversion circuits 470 and 480, while on the other hand "1's" are applied to the AND gates 604 and 606 which are connected in parallel with the inverters 601 and 602 and thus the AND gates 604 and 606 are opened to pass the lean mixture pulse signals $P_5$ and $P_6$ generated from the fifth and sixth conversion circuits 490 and 500. The pulse signals $P_5$ and $P_6$ are then applied respectively through the OR gates 607 and 608 and the power amplifier circuit 610 to the fuel injection nozzles 841-1 and 841-2 and a quantity of fuel corresponding to the pulse width is injected thus feeding the lean air-fuel mixture to each cylinder. In this case, the AND gate 620 generates a "0" output signal in response to a "0" signal applied from the inverter 601 so that the three way solenoid valve 858 is not operated and thus no exhaust gas is recirculated.

Thereafter, as the engine load increases so that the intake manifold pressure becomes higher than about 680 mmHg but lower than about 720 mmHg, the first pressure sensing switch 48 closes and the second pressure sensing switch 48a remains open. Consequently, the AND gate 603 following the inverter 601 is opened and the AND gate 604 which is connected in parallel with the inverter 601 is closed, with the result that the rich mixture pulse signal $P_3$ from the third conversion circuit 470 is passed and the passage of the lean mixture pulse signal $P_5$ from the fifth conversion circuit 490 is prevented. When this occurs, the fuel injection nozzle 841-1 opens and feeds the rich air-fuel mixture to the first cylinder in response to the application of the pulse signal $P_3$ through the AND gate 603 and the OR gate 607, while the lean air-fuel mixture is still fed to the second cylinder as under the normal operating conditions. At the same time, in response to the application of "1" signals from the inverter 601 and the second pressure sensing switch 48a, the AND gates 620 generates a "1" output signal to operate the three way solenoid valve 858 through the power amplifier circuit 630 and thus recirculate a portion of the exhaust gases into the first cylinder in addition to the rich air-fuel mixture.

Then, after the intake manifold pressure becomes greater than about 720 mmHg at the full-load operation, both of the first and second pressure sensing switches 48 and 48a are closed. Consequently, "1's" are applied to the AND gates 603 and 605 following the inverters 601 and 602 thus opening the AND gates 603 and 605 while the AND gates 604 and 606 which are connected in parallel with the inverters 601 and 602 are closed, with the result that the rich mixture pulse signals $P_3$ and $P_4$ from the third and fourth conversion circuits 470 and 480 are passed and the passage of the lean mixture pulse signals $P_5$ and $P_6$ from the fifth and sixth conversion circuits 490 and 500 are prevented. Consequently, the pulse signals $P_3$ and $P_4$ are applied through the AND gates 603 and 605, the OR gates 607 and 608 and the power amplifier circuit 610 to the fuel injection nozzles 841-1 and 841-2 so that an amount of fuel corresponding to the pulse width is injected to thereby feed the rich air-fuel mixture to each cylinder. At the same time, the AND gate 620 generates a "0" output signal in response to the "0" signal applied from the second pressure sensing switch 48a and thus the three way solenoid valve 858 is de-energized to stop the recirculation of the exhaust gas.

While, in the control unit 900 described above, the injection of fuel is directly controlled in accordance with the output pulse signals of the third, fourth, fifth and sixth conversion circuits 470, 480, 490 and 500, the correction circuit 520 may be example be provided as in the second embodiment to make various corrections.

With the construction described above, the operation of the seventh embodiment is as follows. When, in each of the rotor assemblies $C_1$ and $C_2$, the rotor 608 makes a planetary rotary motion, each of the working chambers 809, 810 and 811 goes through the four strokes of suction compression, power and exhaust. On the suction stroke, the working chamber first communicates with the intake port 812 to draw in air. Shortly after the commencement of the air drawing the working chamber communicates with the fuel injection port 814 to be fed with fuel from the fuel injection nozzles. In this case, the fuel is injected toward the leading or forward end portion of the working chamber. Consequently, a large portion of the fuel injected from the fuel injection nozzle into the working chamber is distributed into the forward end portion of the working chamber and the trailing or the rear end portion of the working chamber is filled mostly with air. Consequently, the stratified distribution of the air-fuel mixture consisting of the rich mixture in the forward end portion and the lean mixture in the rear end portion is obtained in the working chamber and this stratified charge is ignited and burned by the spark plugs. The exhaust gases discharged from the rotor assemblies $C_1$ and $C_2$ through their exhaust ports 813 are collected and mixed in the thermal reactor 825.

With the control unit 900 constructed as previously described, under normal operating conditions of the engine, the lean air-fuel mixture (the air-fuel ratio is selected between 17 : 1 to 22 : 1, and the optimum ratio is 18 : 1) burned in the working chamber of each of the rotor assemblies $C_1$ and $C_2$. The stable combustion of the mixture is accomplished by advantageously utilizing the stratified distribution of the mixture, namely, by igniting the rich mixture portion. On the other hand, during high-load operation, while the lean air-fuel mixture is burned in the working chambers of the second rotor assembly $C_2$, the rich air-fuel mixture (the air-fuel ratio is between 11 : 1 to 14.7 : 1 and the optimum ratio is 13 : 1) is burned in the working chambers of the first rotor assembly $C_1$ to provide an increased power output. During these operations, a portion of the exhaust gases is recirculated into the working chambers of the first rotor assembly $C_1$. The exhaust gas is recirculated into the intake manifold 820, namely, the exhaust gas is recirculated to the air which is sucked into the working chambers through the intake port 812. Consequently, practically no exhaust gas is mixed with the rich mixture operation in the forward end portion of the working chambers which is ignited first by the spark plug and thus the recirculation of the exhaust gas does not impede the ignitability of the mixture but has the effect of reducing particularly emissions of NOx. Further, under full-load operation the rich air-fuel mixture is burned in the working chambers of all the rotor assemblies and simultaneously the recirculation of the exhaust gas is stopped thus further increasing the power output. Since the frequency of full-load operation is very low and it also takes place in circumstances where the effect on the environmental sanitation of the harmful constituents in the exhaust gases can be practically ignored, the emissions of CO and HC due to the combustion of the rich air-fuel mixture in all the rotor assemblies does not in effect give rise to any serious problem.

Thus, both the exhaust emission control and the provision of the desired power output are accomplished simultaneously.

The ignition system connected to the spark plugs 815 and 816 is comprised of a known type of rotary piston engine ignition system and the ignition system 300 used in the first embodiment to thereby ensure the optimum ignition timing control for the combustion of various air-fuel mixtures in the rotor assemblies.

While, in the seventh embodiment described above, the rich air-fuel mixture is fed and burned in the working chambers of one of the rotor assemblies under high-load operation, the same functional effect as the seventh embodiment may be obtained by for example modifying it in such a manner that the rich air-fuel mixture is burned at intervals of a predetermined number of cycles in each of the rotor assemblies during high-load operation. Further, the power output may be increased smoothly by gradually increasing, as the engine load increases, the number of times the rich air-fuel mixture is burned under high-load operation as in the case of the third embodiment and this is very effective.

EIGHTH EMBODIMENT

This embodiment is a twin-rotor, rotary piston engine with a carburetor, which is designed to operate practically in the same manner as the seventh embodiment.

Referring to FIGS. 33, 34 and 35 which show the eighth embodiment, this embodiment differs from the seventh embodiment in that each rotor assembly includes first intake ports 812A provided in each of side housings 801A and 802A of a housing 800A and a second intake ports 814A provided in each of rotor housings 804A and 805A. The first intake ports 812A are placed at the same positions as the intake ports 812 in the engine of FIG. 30 and the positions of the second intake ports 814A are the same as those of the fuel injection ports 814. An intake manifold assembly 820A includes a first lean mixture manifold 820A-1 connected to the first intake port 812A of the first rotor assembly $C_1$, a second lean mixture manifold 820A-2 connected to the first intake port 812A of the second rotor assembly $C_2$ and a rich mixture manifold 820A-3 connected to the second intake ports 814A of the first and second rotor assembles $C_1$ and $C_2$.

A carburetor 860 is secured to the intake manifold assembly 820A. The carburetor 860 includes first and second lean mixture barrels 861 and 862 and a rich mixture barrel 863. The first lean mixture barrel 861 is connected to the first lean mixture manifold 820A-1 and the second lean mixture barrel 862 is connected to the second lean mixture manifold 820A-2, while the rich mixture barrel 863 is connected to the rich mixture manifold 820A-3. Similarly with those shown in FIG. 23, each of these barrels is provided with a main nozzle, slow port and idle port and the barrels are provided respectively with throttle valves 868, 869 and 870. In addition, first and second mixture enrichment devices 880 and 880A are provided in the fuel passages connected to first and second main nozzles 864 and 865. The first and second mixture enrichment devices 880 and 880A are identical in construction with those shown in FIG. 23. A control circuit 888 controls three way solenoid valves 887 and 887A which control the introduction of the intake manifold pressure to operate the mixture enrichment devices 880 and 880A.

An exhaust gas recirculating system 850 is identical in construction with the system shown in FIG. 29 except that a three way solenoid valve 858 for introducing the intake manifold pressure into a control valve 855 is controlled by the control circuit 888.

The control circuit 888 is identical in construction with the circuit shown in FIG. 24.

With the construction described above, the air-fuel ratios and the amounts by weight of air in the lean and rich mixtures formed in the carburetor 860 are selected so that the average air-fuel ratio of all the mixtures sucked in the working chambers of each rotor assembly results in a lean mixture (the air-fuel ratio is between 17 : 1 to 22 : 1) when the first and second mixture enrichment devices 880 and 880A are not in operation, the average air-fuel ratio of all the mixtures sucked in the working chambers of the first rotor assembly $C_1$ results in a rich mixture (the air-fuel ratio is between 11 : 1 to 14.7 : 1) when the first mixture enrichment device 880 is in operation, and the average air-fuel ratio of all the mixtures sucked in the working chambers of the second rotor assembly $C_2$ results in a rich mixture when the second mixture enrichment device 880A is in operation.

The eighth embodiment operates as follows. In each rotor assembly, the working chamber on the suction stroke first communicates with the first intake port 812A at its forward end portion and it starts to draw in the lean air-fuel mixture. Thereafter, the working chamber communicates with the second intake port 814A to draw in the rice air-fuel mixture. Consequently, there results a stratified distribution of the mixtures which is similar to that obtained in the seventh embodiment and a stable combustion of the resulting air-fuel mixture is ensured though the mixture is lean on the average. By virtue of the above-described carburetor 860, under normal operating conditions the lean air-fuel mixture is burned in the working chambers of both the first and second rotor assemblies $C_1$ and $C_2$, while the working chambers of the first rotor assembly $C_1$ are only changed to the combustion of the rich air-fuel mixture under high-load operation. The rich air-fuel mixture is burned in the working chambers of both the first and second rotor assemblies $C_1$ and $C_2$ under high-load, high-speed operation. During the operation where the rich air-fuel mixture is burned only in the working chambers of the first rotor assembly $C_1$, a portion of the exhaust gases is recirculated to these working chambers through the first intake port 812A.

Thus, both the exhaust emission control and the provision of the desired power output are accomplished simultaneously.

While the invention has been particularly shown and described with reference to several embodiments the present invention is not intended to be limited to these embodiments. For instance, while the invention has been illustrated and described as embodied in four-cylinder, reciprocating engines and twin-rotor, rotary piston engines, it may be embodied in any other reciprocating engines built with one or more cylinders other than four as well as in any other rotary piston engines built with one or more rotors other than two. Further, since the number of cylinders (or the number of rotor assemblies) which will be changed to the combustion of rich air-fuel mixture or the cycle interval for changing to the rich mixture combustion under high-load operation may be basically selected properly to suit the desired power output, the number of such cylinders is not limited to one half of the entire cylinders, nor is the cycle interval limited to one cycle. More specifically, any arrangements in which the number of cylinders that will be changed to the combustion of rich air-fuel mixture is increased in accordance with an increase in the engine load should be comprehended within the meaning and range of equivalence of the first embodiment and the fourth to eighth embodiments of the invention in which the transition from the lean to rich mixture combustion takes place on the basis of the number of cylinders (or rotor assemblies) under high-load operation. Similarly, any arrangements in which the transition from the lean to rich mixture combustion is effected in some cylinders only may be comprehended to fall within the meaning and range of equivalence of the second embodiment wherein the transition from the lean to rich mixture combustion is effected on the basis of a predetermined cycle unit under high-load operation. Further, the combustion of rich air-fuel mixture in every cycle of all the cylinders under full-load operation (high-load, high-speed operation) and the recirculation of exhaust gas under high-load operation may be adopted as desired in consideration of both the exhaust emission control and the power output requirements.

While, in the above-described embodiments of the invention, a thermal reactor is used, the same function of exhaust emission control may be obtained by using any type of catalytic converter employing an oxidizing catalyst in place of the thermal reactor. Still further, the desired results may be obtained by utilizing a portion of the exhaust gases produced by the combustion of rich air-fuel mixtures for exhaust gas recirculation purposes.

We claim:

1. A method of operating an internal combustion engine having a plurality of sequentially operative combustion chambers, comprising the steps of:

supplying to said combustion chambers a lean air-fuel charge having an air-fuel ratio larger than 16;

supplying additional fuel to at least one of said combustion chambers relative to the quantity of air sucked-in said at least one of said combustion chambers as the engine power demand increases, said additional fuel rendering the air-fuel charge in said at least one combustion chamber richer than approximately stoichiometric, selecting in a sequential firing of all of said combustion chambers the number of combustion operations at which the combustion of said richer air-fuel charge is made to meet said engine power demand; and converging exhaust gases of said combustion chambers.

2. A method according to claim 1 wherein said supplying additional fuel step is made only when said engine power demand is higher than a first predetermined engine power demand value; and wherein said selecting step further comprises the step of increasing the ratio of said number of combustion operations at which the combustion of said richer air-fuel charge is made to the sequentially operative combustion operations of all of said combustion chambers as said engine power demand increases.

3. A method according to claim 1 wherein said supplying additional fuel is made only when said engine power demand is higher than a first predetermined engine power demand value; and wherein said selecting step further comprises the step of maintaining constant the ratio of said number of combustion operations at which the combustion of said richer air-fuel charge is made to the number of sequentially operative combustion operations of all of said combustion chambers when said engine power demand exceeds said first predetermined power demand value.

4. A method according to claim 1 wherein said supplying of additional fuel is made only when said engine power demand becomes the same as or higher than said predetermined engine power demand value, and further comprising a step of:

retarding said retarded ignition pulse when sid engine power demand rises to said predetermined engine power demand value to the extent that the resulting torque generated by the combustion of said richer air-fuel charge ignited by said retarded ignition pulse as further retarded becomes equal to the torque generated by the combustion of said lean air-fuel charge ignited by said advanced ignition pulse, wherein the extent of said retarding of said ignition pulse being reduced to zero in a short period of time since said engine power demand rises to said predetermined engine power demand value.

5. A method of operating an internal combustion engine having a plurality of sequentially operative combustion chambers, comprising the steps of:

supplying a lean air-fuel charge to all of said combustion chambers when the engine power demand of said engine is lower than a first predetermined engine power demand level, the air-fuel ratio of said lean air-fuel charge being greater than 16;

supplying a rich air-fuel charge to at least some of said combustion chambers substantially immediately after said engine power demand exceeds said first predetermined engine power demand level, the air-fuel ratio of said rich air-fuel charge being smaller than the stoichiometric air-fuel ratio, and supplying said lean air-fuel charge to the remaining combustion chambers; and converging exhaust gases of said combustion chambers.

6. A method according to claim 1, further comprising a step of:

recirculating a portion of said exhaust gases to the combustion chamber to which said additional fuel is supplied.

7. A method according to claim 2 wherein said additional fuel is supplied to all of said combustion chambers when said engine power demand exceeds a second predetermined engine power demand value.

8. A method according to claim 2, further comprising a step of:

recirculating a portion of said exhaust gases to the combustion chamber to which said additional fuel is supplied.

9. A method according to claim 7, further comprising steps of:

recirculating a portion of said exhaust gases to the combustion chamber to which said additional fuel is supplied when said engine power demand is between said first and second predetermined engine power demand values.

10. A method according to claim 2, wherein said supplying additional fuel is made to all of said combustion chambers when said engine power demand exceeds a second predetermined engine power demand value.

11. A method according to claim 3, further comprising a step of:

recirculating a portion of said exhaust gases to the combustion chamber to which said additional fuel is supplied.

12. A method according to claim 10, further comprising steps of:

recirculating a portion of said exhaust gases to the combustion chamber to which said additional fuel is supplied when said engine power demand is between said first and second predetermined engine power demand values.

13. A method according to claim 3 wherein said ratio of said number of combustion operations to said given number of sequentially operative combustion operations is about 0.5.

14. A method according to claim 10 wherein said ratio of said number of combustion operations to said given number of sequentially operative combustion operations is about 0.5.

15. A method according to claim 11 wherein said ratio of said number of combustion operations to said given number of sequentially operative combustion operations is about 0.5.

16. A method according to claim 12 wherein said ratio of said number of combustion operations to said given number of sequentially operative combustion operations is about 0.5.

17. A method according to claim 1 wherein the combustion chamber to which said additional fuel is supplied is changeable when the combustion chamber to which said additional fuel is supplied and the combustion chamber to which said additonal fuel is not supplied exist in said number of sequentially operative combustion operations.

18. A method according to claim 6 wherein the combustion chamber to which said additional fuel is supplied is changeable when the combustion chamber to which said additional fuel is supplied and the combustion chamber to which said additional fuel is not supplied exist in said number of sequentially operative combustion operations.

19. A method according to claim 2 wherein the combustion chamber to which said additional fuel is supplied is changeable when the combustion chamber to which said additional fuel is supplied and the combustion chamber to which said additional fuel is not supplied exist in said number of sequentially operative combustion operations.

20. A method according to claim 10 wherein the combustion chamber to which said additional fuel is supplied is changeable when the combustion chamber to which said additional fuel is supplied and the combustion chamber to which said additonal fuel is not supplied exist in said given number of sequentially operative combustion operations.

21. A method according to claim 8 wherein the combustion chamber to which said additional fuel is supplied is changeable when the combustion chamber to which said additional fuel is supplied and the combustion chamber to which said additional fuel is not supplied exist in said given number of sequentially operative combustion operations.

22. A method according to claim 12 wherein the combustion chamber to which said additional fuel is supplied is changeable when the combustion chamber to which said additional fuel is supplied and the combustion chamber to which said additional fuel is not supplied exist in said given number of sequentially operative combustion operations.

23. A method according to claim 1 wherein said additional fuel is supplied to a predetermined combustion chamber.

24. A method according to claim 6 wherein said additional fuel is supplied to a predetermined combustion chamber.

25. A method according to claim 3 wherein said additional fuel is supplied to a predetermined combustion chamber.

26. A method according to claim 10 wherein said additional fuel is supplied to a predetermined combustion chamber.

27. A method according to claim 11 wherein said additional fuel is supplied to a predetermined combustion chamber.

28. A method according to claim 12 wherein said additional fuel is supplied to a predetermined combustion chamber.

29. A method according to claim 1 wherein said additional fuel is supplied when an intake manifold pressure of said engine exceeds 660 mmHg.

30. A method according to claim 6 wherein said additional fuel is supplied when an intake manifold pressure of said engine exeeds 660 mmHg.

31. A method according to claim 1 wherein said additional fuel is supplied when an intake manifold pressure of said engine exceeds 680 mmHg.

32. A method according to claim 6 wherein said additional fuel is supplied when an intake manifold pressure of said engine exceeds 680 mmHg.

33. A method according to claim 1 wherein said supplying of additional fuel is made to less than all of said combustion chambers when an intake manifold pressure is between 680 mmHg and 720 mmHg, and
   wherein said supplying of additional fuel is made to all of said combustion chambers when said intake manifold pressure exceeds 720 mmHg.

34. A method according to claim 6 wherein said supplying of additional fuel is made to less than all of said combustion chambers when an intake manifold pressure is between 680 mmHg and 720 mmHg, and
   wherein said supplying of additional fuel is made to all of said combustion chambers when said intake manifold pressure exceeds 720 mmHg.

35. A method according to claim 7 wherein said engine power demand is represented by an intake manifold pressure, and
   wherein said first and second predetermined engine power demand values correspond to 680 mmHg and 720 mmHg of intake manifold pressure, respectively.

36. A method according to claim 9 wherein said engine power demand is represented by an intake manifold pressure, and
   wherein said first and second predetermined engine power demand values correspond to 680 mmHg and 720 mmHg of intake manifold pressure, respectively.

37. A method according to claim 1 wherein said supplying of additional fuel is made when all of the following three conditions are fulfilled:
   (1) the cooling water temperature of said engine is above a predetermined water temperature value,
   (2) the engine speed of said engine is above a first predetermined engine speed value, and p1 (3) the intake manifold pressure is above a predetermined intake manifold pressure value.

38. A method according to claim 37 wherein said predetermined water temperature value, said first predetermined engine speed value and said predetermined intake manifold pressure value are 20° C, 1,000 rpm and 680 mmHg, respectively.

39. A method according to claim 6 wherein said supplying of additional fuel is made when all of the following three conditions are fulfilled:
   (1) the cooling water temperature of said engine is above a predetermined water temperature value,
   (2) the engine speed of said engine is above a first predetermined engine speed value, and
   (3) the intake manifold pressure of said engine is above a predetermined intake manifold value;
and wherein said recirculating step is effected only when all of the following conditions are fulfilled:
   (1) said cooling water temperature is above said predetermined water temperature value,
   (2) said engine speed is between said first predetermined engine speed value and a second predetermined engine speed value, and
   (3) said intake manifold pressure is above said predetermined intake manifold pressure value.

40. A method according to claim 39 wherein said predetermined water temperature value, said first predetermined engine speed value, said second predetermined engine speed value and said predetermined intake manifold pressure value are 20° C, 1,000 rpm, 3,000 rpm and 680 mmHg, respectively.

41. A method according to claim 6 wherein said supplying of additional fuel is made to less than all of said combustion chambers and at the same time said recirculating is effected when all of the following three conditions are fulfilled:

(1) the cooling water temperature of said engine is above a predetermined water temperature value,
(2) the engine speed of said engine is between first and scond predetermined engine speed values, and
(3) the intake manifold pressure of said engine is above pressure value;
and wherein said supplying additional fuel is made to all of said combustion chambers without said recirculating when all of the following conditions are fulfilled:
(1) said cooling water temperature is above said predetermined water temperature value,
(2) said engine speed is above said second predetermined engine speed value, and
(3) said intake manifold pressure is above said predetermined intake manifold pressure value.

42. A method according to claim 41 wherein said predetermined water temperature value, said first and second predetermined engine speed values and said predetermined intake manifold pressure value are 20° C, 1,000 rpm, 3,000 rpm and 680 mmHg, respectively.

43. A method according to claim 1 wherein said air-fuel ratio of said lean air-fuel charge is maintained between 17 and 22, and wherein the air-fuel ratio of said richer air-fuel charge is maintained between 11 and 14.7 (stoichiometric).

44. A method according to claim 43 wherein in said number of sequentially operative combustion operations of said combustion chambers, the number of the combustion operations at which the combustion of said richer air-fuel charge is made is less than the number of the combustion operations at which the combustion of said lean air-fuel charge is made, when said combustion operations at which the combustion of said richer air-fuel charge is made and said combustion operations at which the combustion of said lean air-fuel charge is made exist in said given number of sequentially operative combustion operations of said combustion chambers.

45. A method according to claim 1 wherein in said given number of sequentially operative combustion operations of said combustion chambers the number of the combustion operations at which the combustion of said richer air-fuel charge is made is the same as the number of the combustion operations at which the combustion of said lean air-fuel charge is made when said combustion operation at which the combustion of said richer air-fuel charge is made and said combustion operation at which said lean air-fuel charge is made exist in said given number of sequentially operative combustion operations of said combustion chambers.

46. A method according to claim 43, further comprising a step of:
recirculating a portion of said exhaust gases to the combustion chamber to which said additional fuel is supplied.

47. A method according to claim 44, further comprising a step of:
recirculating a portion of said exhaust gases to the combustion chamber to which said additional fuel is supplied.

48. A method according to claim 45, further comprising a step of:
recirculating a portion of said exhaust gases to the combustion chamber to which said additional fuel is supplied.

49. A method according to claim 1 wherein said air-fuel ratio of said lean air-fuel charge is substantially maintained at 18, and wherein the air-fuel ratio of said richer air-fuel charge is substantially maintained at 13.

50. A method according to claim 49 wherein in said given number of sequentially operative combustion operations of said combustion chambers the number of the combustion operations at which the combustion of said richer air-fuel charge is made is less than the number of the combustion operations at which the combustion of said lean air-fuel charge is made, when said combustion operation at which the combustion of said richer air-fuel charge is made and said combustion operations at which the combustion of said lean air-fuel charge is made exist in said given number of sequentially operative combustion operations of said combustion chambers.

51. A method according to claim 49 wherein in said given number of sequentially operative combustion operations of said combustion chambers the numbers of the combustion operations at which the combustion of said richer air-fuel charge is made in the same as the number of the combustion operations at which the combustion of said lean air-fuel charge is made when said combustion operation at which the combustion of said richer air-fuel charge is made whn said combustion operation at which said lean air-fuel charge is made exist in said given number of sequentially operative combustion operations of said combustion chambers.

52. A method according to claim 49, further comprising a step of:
recirculating a portion of said exhaust gases to the combustion chamber to which said additional fuel is supplied.

53. A method according to claim 50, further comprising a step of:
recirculating a portion of said exhaust gases to the combustion chamber to which said additional fuel is supplied.

54. A method according to claim 51, further comprising a step of:
recirculating a portion of said exhaust gases to the combustion chamber to which said additional fuel is supplied.

55. A method according to claim 43 wherein
(1) said lean air-fuel charge consists of leaner and richer portions of said lean air-fuel charge,
(2) the air-fuel ratio of said leaner portion of said lean air-fuel charge is maintained larger than 17, and
(3) the air-fuel ratio of said richer portion of said lean air-fuel charge is maintained between 1.5 and 9;
and wherein
(1) said richer air-fuel charge consists of leaner and richer portions of said richer air-fuel charge,
(2) the air-fuel ratio of said leaner portion of said richer air-fuel charge is maintained larger than 17, and
(3) the air-fuel ratio of said richer portion of said richer air-fuel charge is maintained between 1 and 6.

56. A method according to claim 55 wherein in said given number of sequentially operative combustion operations of said combustion chambers, the number of the combustion operations at which the combustion of said richer air-fuel charge is made is the same as the number of the combustion operations at which the combustion of said lean air-fuel charge is made when said combustion operation at which the combustion of said richer air-fuel charge is made and said combustion operation at which said lean air-fuel charge is made exist in said given number of sequentially operative combustion operations of said combustion chambers.

57. A method according to claim 55, further comprising a step of:
recirculating a portion of said exhaust gases to the combustion chamber to which said additional fuel is supplied.

58. A method according to claim 56, further comprising a step of:
recirculating a portion of said exhaust gases to the combustion chamber to which said additional fuel is supplied.

59. A method according to claim 55 wherein the sum of a weight of air contained in said richer portion of said lean air-fuel charge sucked in by all of said combustion chambers and a weight of air contained in said richer portion of said richer air-fuel charge sucked in by all of said combustion chambers is between 1 and 10% of the total weight of air contained in said richer and lean air-fuel charges sucked in by all of said combustion chambers.

60. A method according to claim 59 wherein when in said given number of sequentially operative combustion operations of said combustion chambers the combustion operation at which the combustion of said richer air-fuel charge is made and the combustion operation at which the combustion of said lead air-fuel charge is made exist, said weight of air contained in said richer portion of said lean air-fuel charge is the same as said weight of air contained in said richer portion of said richer air-fuel charge.

61. A method according to claim 60 wherein in said given number of sequentially operative combustion operations of said combustion chambers the number of the combustion operations at which the combustion of said richer air-fuel charge is made is the same as the number of the combustion operations at which the combustion of said lean air-fuel charge is made when said combustion operation at which the combustion of said richer air-fuel charge is made and said combustion operation at which said lean air-fuel charge is made exist in said given number of sequentially operative combustion operations of said combustion chambers.

62. A method according to claim 60, further comprising a step of:
recirculating a portion of said exhaust gases to the combustion chamber to which said additional fuel is supplied.

63. A method according to claim 61, further comprising a step of:
recirculating a portion of said exhaust gases to the combustion chamber to which said additional fuel is supplied.

64. A method according to claim 49 wherein
(1) said lean air-fuel charge consists of leaner and richer portions of said lean air-fuel charge,
(2) the air-fuel ratio of said leaner portion of said lean air-fuel charge is maintained at substantially 20, and
(3) the air-fuel ratio of said richer portion of said lean air-fuel charge is maintained at substantially 5.3;
and wherein
(1) said richer air-fuel charge consists of leaner and richer portions of said richer air-fuel charge,
(2) the air-fuel ratio of said leaner portion of said richer air-fuel charge is maintained at substantially 20, and
(3) the air-fuel ratio of said richer portion of said richer air-fuel charge is maintained at substantially 1.4.

65. A method according to claim 64 wherein in said given number of sequentially operative combustion operations of said combustion chambers the number of the combustion operations at which the combustion of said richer air-fuel charge is made is the same as the number of the combustion operations at which the combustion of said lean air-fuel charge is made when said combustion operation at which the combustion of said richer air-fuel charge is made and said combustion operation at which said lean air-fuel charge is made exist in said given number of sequentially operative combustion operations of said combustion chambers.

66. A method according to claim 64, further comprising a step of:
recirculating a portion of said exhaust gases to the combustion chamber to which said additional fuel is supplied.

67. A method according to claim 65, further comprising a step of:
recirculating a portion of said exhaust gases to the combustion chamber to which said additional fuel is supplied.

68. A method according to claim 55 wherein the sum of a weight of air contained in said richer portion of said lean air-fuel charge sucked in by all of said combustion chambers and a weight of air contained in said richer portion of said richer air-fuel charge sucked in by all of said combustion chambers is substantially 4% of the total weight of air contained in said richer and lean air-fuel charges sucked in by all of said combustion chambers.

69. A method according to claim 68 wherein when in said given number of sequentially operative combustion operations of said combustion chambers the combustion operation at which the combustion of said richer air-fuel charge is made and the combustion operation at which the combustion of said lean air-fuel charge is made exist, said weight of air contained in said richer portion of said lean air-fuel charge is the same as said weight of air contained in said richer portion of said richer air-fuel charge.

70. A method according to claim 1 wherein said supplying a lean air-fuel charge comprises:
supplying to said combustion chambers a rich air-fuel charge whose air-fuel ratio is smaller than substantially 14.7 (stoichiometric), and
supplying enough air to said combustion chambers that said lean air-fuel charge is formed in said combustion chambers; and
wherein said supplying additional fuel comprises:
stopping said supplying of air to said at least one of said combustion chambers.

71. A method according to claim 70 wherein said stopping of said supply of air is made when said engine power demand is higher than a first predetermined engine power demand value;
and wherein said selecting step comprises the step of maintaining constants the ratio of said number of the combustion operations at which the combustion of said richer air-fuel charge is made to the number of sequentially operative combustion operations of all of said combustion chambers when said engine power demand exceeds said first predetermined engine power demand value.

72. A method according to claim 71 wherein said stopping is made to all of said combustion chambers when said engine power demand exceeds a second predetermined engine power demand value.

73. A method according to claim 70 wherein said rich air-fuel charge consists of richer and leaner portions of said rich air-fuel charge.

74. A method according to claim 70 wherein
(1) said air-fuel ratio of said rich air-fuel charge is maintained between 11 and 14.7 (stoichiometric), and
(2) said air-fuel ratio of said lean air-fuel charge is maintained between 17 and 22.

75. A method according to claim 70 wherein
(1) said air-fuel ratio of said rich air-fuel charge is maintained at substantially 13, and
(2) said air-fuel ratio of said lean air-fuel charge is maintained at substantially 18.

76. A method according to claim 1 further comprising steps of:
generating an advanced ignition pulse optimum for the ignition of said lean air-fuel charge and a retarded ignition pulse optimum for the ignition of said richer air-fuel charge for every one ignition operation of each of said combustion chambers;
selecting said advanced ignition pulse for the combustion chamber to which said lean air-fuel is supplied;
selecting said retarded ignition pulse for the combustion chamber to which said richer air-fuel charge is supplied;
amplifying the voltage of the selected ignition pulse; and
igniting by the amplified selected ignition pulse the air-fuel charge of the combustion chamber for which said amplified selected ignition pulse is selected.

77. A method according to claim 76, further comprising a step of:
recirculating a portion of said exhaust gases to the combustion chamber to which said additions fuel is supplied.

78. A method according to claim 77, further comprising a step of:
recirculating a portion of said exhaust gases to the combustion chamber to which said additional fuel is supplied.

79. A method according to claim 5, further comprising a step of:
recirculating a portion of said exhaust gases to the combustion chamber to which said to rush air-fuel charge is supplied.

80. A method according to claim 5, further comprising a step of:
supplying said rich air-fuel charge to all of said combustion chambers substantially immediately after said engine power demand exceeds a second predetermined engine power demand level.

81. A method according to claim 80, further comprising a step of:
recirculating a portion of said exhaust gases to the combustion chamber to which said rich air-fuel charge is supplied, when said engine power demand is between said first and second predetermined engine power demand levels.

82. A method according to claim 81 wherein said engine power demand is represented by an intake manifold pressure.

83. A method according to claim 82 wherein said first and second predetermined engine power demand levels correspond to intake manifold pressure levels of 680 mmHg and 720 mmHg, respectively.

84. A method according to claim 81 wherein said engine power demand is represented by a combination of an intake manifold pressure and an engine speed.

85. A method according to claim 84 wherein said first and second predetermined engine power demand levels correspond, respectively to a first combination of 680 mmHg and 1,000 rpm; and a second combination of 680 mmHg and 3,000 rpm.

86. A method according to claim 84 wherein said recirculation is made only when (1) said engine power demand is between said first and second predetermined engine power demand levels and (2) a cooling water temperature of said engine is above a predetermined water temperature value.

87. A method according to claim 86 wherein said first and second predetermined engine power demand levels correspond, respectively to a first combination of 680 mmHg and 1,000 rpm, and a second combination of 680 mmHg and 3,000 rpm;
and wherein said predetermined water temperature value is 20° C.

88. A method according to claim 5 wherein said supplying of a rich air-fuel charge step includes the step of increasing the ratio of the number of the combustion operations at which the combustion of said rich air-fuel charge is made to a selected number of sequentially operative combustion operations of said combustion chambers as said engine power demand increases.

89. A method according to claim 88 wherein the lowest value of said ratio is smaller than one divided by the number of all of said combustion chambers.

90. A method according to claim 5 wherein said supplying of a rich air-fuel charge step includes the step of maintaining constant the ratio of the number of the combustion operations at which the combustion of said rich air-fuel charge is made to a selected number of sequentially operative combustion operations of said combustion chambers.

91. An internal combustion engine, comprising:
a plurality of sequentially operative combustion chambers;
means connected to said combustion chambers for supplying thereto a lean air-fuel charge having an air-fuel ratio larger than 16; said supplying means supplying additional fuel to at least one of said combustion chambers relative to the quantity of sucked-in air by said one of said combustion chambers, as the engine power demand increases, in such a manner that an air-fuel charge richer than approximately stoichiometric is substantially immediately therein formed and that in a selected number of sequentially operative combustion operations of said combustion chambers the number of the combustion operations at which the combustion of said richer air-fuel charge is made is suitably selected to meet said engine power demand, said supplying additional fuel being made in the wide range of the engine speed of said engine including medium and high engine speeds; and
means connected to said combustion chambers for converging the exhaust gases of said combustion chambers.

92. An internal combustion engine according to claim 91, further comprising means connected to said combustion chambers for recirculating a portion of said exhaust gases to the combustion chamber to which said additional fuel is supplied.

93. An internal combustion engine according to claim 91 wherein said supplying means comprises:
 as many fuel injection nozzles as said combustion chambers, each of said fuel injection nozzles being operatively connected to corresponding one of said combustion chambers; and
 means connected to said fuel injection nozzles for controlling a quantity of fuel to be injected to each one of said combustion chambers.

94. An internal combustion engine according to claim 93 wherein (1) each of said combustion chambers has an intake port, and (2) each of said fuel injection nozzles being disposed in said intake port.

95. An internal combustion engine according to claim 93 wherein said controlling means controls said quantity, when said lean air-fuel charge and said richer air-fuel charge are to be formed in said combustion chambers, in such a manner that each of said combustion chambers receives said lean air-fuel charge on one occasion and said richer charge on another occasion.

96. An internal combustion engine according to claim 93 wherein said controlling means controls said quantity, when said richer and lean air-fuel charges are to be formed in said combustion chambers, in such a manner that a first set of said combustion chambers receive said richer air-fuel charge and that a second set of the remaining combustion chambers receive said lean air-fuel charge.

97. An internal combustion engine according to claim 92 wherein said supply means comprises: as many fuel injection nozzles as said combustion chambers, each of said fuel injection nozzles being operatively connected to corresponding one of said combustion chambers and to a fuel source; and means connected to said fuel injection nozzles for controlling a quantity of fuel to be injected to each one of said combustion chambers;
 and wherein said recirculating means comprises: an exhaust suction passage connection to said converging means to suck in said portion of said exhaust gases therefrom; as many delivery passages as said combustion chambers, each of said delivery passages being (1) operatively connected to each corresponding one of said combustion chambers, (2) connected to said exhaust suction passage and (3) having an exhaust gas delivery valve; and recirculation control means connected to said controlling means and to all of said exhaust gas delivery valve, said recirculation control means opening said exhaust gas delivery valve so that the combustion chamber to which said richer air-fuel charge is supplied receives said portion of said exhaust gases when said lean and richer air-fuel charges are to be formed in said combustion chambers, said controlling means working when said lean and richer air-fuel charges are to be formed in said combustion chambers receives said lean air-fuel charge on one occassion and said richer air-fuel charge on another occasion.

98. An internal combustion engine according to claim 97 wherein (1) each of said combustion chambers has an intake port, and (2) each of said fuel injection nozzles being disposed in said intake port.

99. An internal combustion engine according to claim 92 wherein said supplying means comprises:
 as many fuel injection nozzles as said combustion chambers, each of said fuel injection nozzles being operatively connected to corresponding one of said combustion chambers and to a fuel source; and means connected to said fuel injection nozzles for controlling a quantity of fuel to be injected to each one of said combustion chambers;
 said controlling means controlling said quantity, when said richer and lean air-fuel charges are to be formed in said combustion chambers, in such a manner that a first set of said combustion chambers at turn thereof always receive said richer air-fuel charge and that said second set of the remaining combustion chambers at turn thereof always receive said lean air-fuel charge; and further wherein said recirculating means comprises: an exhaust suction passage connected to said converging means to suck in said portion of said exhaust gases therefrom; an exhaust gas recirculation control valve connected to said exhaust suction passage;
 as many delivery passages as said first set of combustion chambers, each of said delivery passages being (1) operatively connected to each corresponding one of said first set of combustion chambers and (2) connected to said exhaust gas recirculation control valve; and
 recirculation control means connected to said exhaust gas recirculation control valve and to said control means, said recirculation control means opening said exhaust gas recirculation control valve so that the combustion chamber to which said richer air-fuel charge is supplied receives said portion of said exhaust gases when said lean and richer air-fuel charges to be formed in said combustion chambers.

100. An internal combustion engine according to claim 99 wherein (1) each of said combustion chambers has an intake port, and (2) each of said fuel injection nozzles being disposed in said intake port.

101. An internal combustion engine according to claim 91 wherein each of said combustion chambers has a trap chamber (1) disposed therein, (2) enclosing a spark plug, (3) having at least one suction aperture and one discharge aperture and (4) further having a partition disposed within said trap chamber between said suction and discharge apertures to form within said trap chamber a uniflow path in communication with said suction and discharge apertures, said spark plug being exposed to said path; and wherein said supplying means comprises: means connected to said combustion chambers for delivering an air-fuel charge to be supplied to each of said combustion chambers in such a manner (1) that said air-fuel charge consists of a richer portion and a leaner portion, (2) that said richer and leaner portions are delivered to each of said combustion chambers in stratified charge form, (3) that said richer portion is directed to said suction aperture to be sucked therein and (4) that said richer and leaner portions form, as a whole, said lean air-fuel charge or said richer air-fuel charge depending on said engine power demand, whereby said richer portion trapped in said trap chamber, when ignited, forms a flame which spurts out of said trap chamber to burn said leaner portion remaining outside said trap chamber.

102. An internal combustion engine according to claim 92 wherein each of said combustion chambers has a trap chamber (1) disposed therein, (2) enclosing a spark plug, (3) having at least one suction aperture and one discharge aperture and (4) further having a partition disposed within said trap chamber between said suction and discharge apertures to form within said trap chamber a uniflow path in communication with said suction and discharge apertures, said spark plug being exposed to said path; and wherein said supplying means comprises: means connected to said combustion chambers for delivering an air-fuel charge to be supplied to each of said combustion chambers in such a manner (1) that said air-fuel charge consists of a richer portion and a leaner portion, (2) that said richer and leaner portions are delivered to each of said combustion chambers in stratified charge form, (3) that said richer portion is directed to said suction aperture to be sucked therein and (4) that said richer and leaner portions form, as a whole, said lean air-fuel charge or said richer air-fuel charge depending on said engine power demand; and wherein said recirculating means supplies said portion of said exhaust gases to the combustion chamber to which said additional fuel is supplied, whereby said richer portion trapped in said trap chamber, when ignited, forms a flame which spurts out of said trap chamber to burn said leaner portion remaining outside said trap chamber.

103. An internal combustion engine according to claim 102 wherein each of said combustion chamber has an intake port and an intake valve disposed therein said intake valve having a valve head having a back face facing upstream of said valve head; and wherein said recirculating means comprises as many delivery passage as the number of the combustion chamber to which said portion of said exhaust gases is supplied, each of said delivery passage having an opening end disposed near said suction aperture of said trap chamber disposed in said combustion chamber to which said portion of said exhaust gases is supplied and in the vicinity of said back face of said intake valve to be opened or closed by said back face when said intake valve opens or closes, respectively;

said portion of said exhaust gases being supplied through said delivery passage to said combustion chamber to which said portion of said exhaust gases is supplied.

104. An internal combustion engine according to claim 102 wherein each of said combustion chamber has an intake port, an intake valve disposed therein and an intake conduit connected to said intake port; and wherein said recirculating means comprises as many delivery passage as the number of the combustion chamber to which said portion of said exhaust gases is supplied, each of said delivery passage having an end disposed in said intake conduit upstream of said intake valve, said portion of said exhaust gases being supplied through said delivery passage and through said end to said combustion chamber to which said portion of said exhaust gases is supplied.

105. An internal combustion engine according to claim 94 wherein each of said combustion chambers has a trap chamber (1) disposed therein, (2) enclosing a spark plug, (3) having at least one suction aperture and one discharge aperture and (4) further having a partition disposed within said trap chamber between said suction and discharge apertures to form within said trap chamber a uniflow path in communication with said suction and discharge apertures, said spark plug being exposed to said path; and wherein said supplying means comprises: means connected to said combustion chambers for delivering an air-fuel charge to be supplied to each of said combustion chambers in such a manner (1) that said air-fuel charge consists of a richer portion and a leaner portions, (2) that said richer and leaner portions are delivered to each of said combustion chambers in stratified charge form, (3) that said richer portion is directed to said suction aperture to be sucked therein and (4) that said richer and leaner portions form, as a whole, said lean air-fuel charge or said richer air-fuel charge depending on said engine power demand, whereby said richer portion trapped in said trap chamber, when ignited, forms a flame which spurts out of said trap chamber to burn said leaner portion remaining outside said trap chamber.

106. An internal combustion engine according to claim 95 wherein each of said combustion chambers has a trap chamber (1) disposed therein, (2) enclosing a spark plug, (3) having at least one suction aperture and one discharge aperture and (4) further having a partition disposed within said trap chamber between said suction and discharge apertures to form within said trap chamber a uniflow path in communication with said suction and discharge apertures, said spark plug being exposed to said path; and wherein said supplying means comprises: means connected to said combustion chambers for delivering an air-fuel charge to be supplied to each of said combustion chambers in said a manner (1) that said air-fuel charge consists of a richer portion and a leaner portions, (2) that said richer and leaner portions are delivered to each of said combustion chambers in stratified charge form, (3) that said richer portions is directed to said suction aperture to be sucked therein and (4) that said richer and leaner portions form, as a whole, said lean airfuel charge or said richer air-fuel charge depending on said engine power demand, whereby said richer portion trapped in said trap chamber, when ignited, forms a flame which spurts out of said trap chamber to burn said leaner portion remaining outside said trap chamber.

107. An internal combustion engine according to claim 96 wherein each of said combustion chambers has a trap chamber (1) disposed therein, (2) enclosing a spark plug, (3) having at least one suction aperture and one discharge aperture and (4) further having a partition disposed within said trap chamber between said suction and discharge apertures to form within said trap chamber a uniflow in communication with said suction and discharge apertures, said spark plug being exposed to said path; and wherein said supplying means comprises: means connected to said combustion chambers for delivering an air-fuel charge to be supplied to each of said combustion chambers in such a manner (1) that said air-fuel charge consists of a richer portion and a leaner portion, (2) that said richer and leaner portions are delivered to each of said combustion chambers in stratified charge form, (3) that said richer portion is directed to said suction aperture to be sucked therein and (4) that said richer and leaner portions form, as a whole, said lean air-fuel charge of said richer air-fuel charge depending on said engine power demand, whereby said richer portion trapped in said trap chamber, when ignited, forms a flame which spurts out of said trap chamber to burn said leaner portion remaining outside said trap chamber.

108. An internal combustion engine according to claim 98 wherein each of said combustion chambers has a trap chamber (1) disposed therein, (2) enclosing a spark plug, (3) having at least one suction aperture and one discharge and (4) further having a partition disposed within said trap chamber between said suction and discharge apertures to form within said trap chamber a uniflow path in communication with said suction and discharge apertures, said spark plug being exposed to said path; and wherein said supplying means comprises: means connected to said combustion chambers for delivering an air-fuel charge to be supplied to each of said combustion chambers in such a manner (1) that said air-fuel charge consists of a richer portion and a leaner portion, (2) that said richer and leaner portions are delivered to each of said combustion chambers in stratified charge form, (3) that said richer portion is directed to said suction aperture to be sucked therein and (4) that said richer and leaner portions form, as a whole, said lean air-fuel charge or said richer air-fuel charge depending on said engine power demand, whereby said richer portion trapped in said trap chamber, when ignited, forms a flame which spurts out of said trap chamber to burn said leaner portion remaining outside said trap chamber.

109. An internal combustion engine according to claim 100 wherein each of said combustion chamber has a trap chamber (1) disposed therein, (2) enclosing a spark plug, (3) having at least one suction aperture and one discharge aperture and (4) further having a partition disposed within said trap chamber between said suction and discharge apertures to form within said trap chamber a uniflow path in communication with said suction and discharge apertures, said spark plug being exposed to said path; and wherein said supplying means comprises: means connected to said combustion chambers for delivering an air-fuel charge to be supplied to each of said combustion chambers in such a manner (1) that said air-fuel charge consists of a richer portion and a leaner portion, (2) that said richer and leaner portions are delivered to each of said combustion chambers in stratified charge form, (3) that said richer portion is directed to said suction aperture to be sucked therein and (4) that said richer and leaner portions form, as a whole, said lean air-fuel charge or said richer air-fuel charge depending on said engine power demand, whereby said richer portion trapped in said trap chamber, when ignited, forms a flame which spurts out of said trap chamber to burn said leaner portion remaining outside said trap chamber.

110. An internal combustion engine according to claim 93 wherein
wherein said supplying means supplies said additional fuel when said engine power demand exceeds said first predetermined engine power demand value so that ratio of said number of combustion operations at which the combustion of said richer air-fuel charge is made to said selected number of sequentially operative combustion operations of said combustion chambers increases as said engine power demand increases.

111. An internal combustion engine according to claim 110 wherein said supply means supplies said additional fuel to all of said combustion chambers when said engine power demand exceeds a second predetermined engine power demand value.

112. An internal combustion engine according to claim 93 wherein said supplying means does not supply said additional fuel when said engine power demand is lower than a first predetermined engine power demand value; and wherein said supplying means so supplies said additional fuel when said engine power demand exceeds said first predetermined engine power demand value that the ratio of said number of the combustion operation at which the combustion of said richer air-fuel charge is made to said given number of sequentially operative combustion operations of said combustion chambers is constant and predetermined.

113. An internal combustion engine according to claim 112 wherein said supplying means supplies said additional fuel to all of said combustion chambers when said engine power demand exceeds a second predetermined engine power demand value.

114. An internal combustion engine according to claim 93 wherein
 (1) each of said fuel injection nozzles has a fuel injection orifice of the same size,
 (2) said engine has an intake manifold connected to said combustion chambers, and
 (3) each of said fuel injection nozzles has a fuel injection solenoid valve, said fuel injection nozzles keeping to inject fuel during the time when said fuel injection solenoid valve keeps open; and
wherein said controlling means comprises:
 means operatively connected to an engine power output shaft of said engine for producing a fuel injection initiation signal for each of said combustion chambers;
 means including an air flow sensor connected to said intake manifold for producing an air flow rate signal which represents the air flow rate sucked in by said engine;
 means for producing a rich coefficient signal which represents a first coefficient which corresponds to said air-fuel ratio of said richer air-fuel charge;
 means for producing a lean coefficient signal which represents a second coefficient which corresponds to said air-fuel ratio of said lean air-fuel charge;
 computer means connected to said fuel injection initiation signal producing means, said air flow rate signal producing means, said rich coefficient signal producing means and said lean coefficient signal producing means to receive said injection initiation signal, said air flow rate signal, said rich coefficient signal and said lean coefficient signal, for producing a rich fuel injection duration signal and a lean fuel injection duration signal for each fuel injection operation for each of said combustion chambers, said rich fuel injection duration signal being a signal whose duration determines a quantity of fuel so injected as to form said richer air-fuel charge and corresponds to a product of said first coefficient and said air flow rate divided by said engine speed, said lean fuel injection duration signal being a signal whose duration determines a quantity of fuel so injected as to form said lean air-fuel charge and corresponds to a product of said second coefficient and said air flow rate divided by said engine speed; and
 means (1) including an engine power demand sensor, (2) connected to said computer means to receive said rich and lean fuel injection duration signals, (3) connected to said fuel injection initiation signal producing means to receive said fuel injection initiation signal and (4) connected to each of said fuel injection solenoid valve of said fuel injection nozzles, for selecting said rich or lean fuel injection duration signal for each of said fuel injection nozzles, said selecting means delivering the selected fuel injection duration signal to said fuel injection solenoid valve of the fuel injection nozzle for which said selected fuel injection duration signal is selected, said fuel injection solenoid valve keeping open during the time when said fuel injection solenoid valve keeps receiving said selected fuel injection duration signal.

115. An internal combustion engine according to claim 114 wherein said controlling means further comprises:
  means connected to said rich coefficient signal producing means and to said lean coefficient signal producing means and including a water temperature sensor sensing a cooling water temperature of said engine, for producing a water temperature compensation signal which corresponds to a compensation value of said first or second coefficient, said water temperature compensation signal changing depending on said cooling water temperature; and
  wherein said rich coefficient signal producing means produces a rich base coefficient signal which represents a first base coefficient which basically corresponds to said air-fuel ratio of said richer air-fuel charge, said rich coefficient signal producing means adding said rich base coefficient signal and said water temperature compensation signal to form said rich coefficient signal, whereby said rich coefficient signal changes depending on said cooling water temperature to change said air-fuel ratio of said richer air-fuel charge depending on said cooling water temperature; and
  wherein said lean coefficient signal producing means produces a lean base coefficient signal which represents a second base coefficient which basically corresponds to said air-fuel ratio of said lean air-fuel charge, said lean coefficient signal producing means adding said lean base coefficient signal and said water temperature compensation signal to form said lean coefficient signal, whereby said lean coefficient signal changes depending on said cooling water temperature to change said air-fuel ratio of said lean air-fuel charge depending on said cooling water temperature.

116. An internal combustion engine according to claim 114 wherein said selecting means comprises:
  means including said engine power demand sensor and connected to said computer means for pre-selecting said rich or lean fuel injection duration signal to form a series of the pre-selected fuel injection signals;
  means connected to said pre-selecting means for modifying each of said pre-selected fuel injection duration signals by lengthening the duration thereof (1) by a period of time which is a delayed action time inherent to said fuel injection solenoid valve and which is a duration from when said fuel injection solenoid valve receives said selected fuel injection duration signal to when said fuel injection solenoid valve actually begins to open and (2) by another period of time which is another delayed action time of said fuel injection solenoid valve due to the decrease of voltage imposed on said fuel injection solenoid valve; and
  means connected to said modifying means and to said fuel injection initiation signal producing means for distributing each of the modified fuel injection duration signal to each of said fuel injection solenoid valve of said fuel injection nozzles, respectively.

117. An internal combustion engine according to claim 114 wherein said selecting means selects said rich or lean fuel injection duration signal in such a manner (1) that said selecting means selects only said lean fuel injection duration signal for all of said combustion chambers when said engine power demand sensor senses said engine power demand lower than a predetermined engine power demand value, and (2) that said selecting means alternately selects said rich and lean fuel injection duration signals for successive two fuel injection operations for a given one of said fuel injection nozzles when said engine power demand sensor senses said engine power demand exceeding said predetermined engine power demand value.

118. An internal combustion engine according to claim 114 wherein (1) said engine power demand is represented by an intake manifold pressure, and (2) said engine power demand sensor is an intake manifold pressure sensor connected to said intake manifold.

119. An internal combustion engine according to claim 114 wherein (1) said engine has a throttle valve connected to said intake manifold, (2) said engine power demand is represented by a throttle valve opening, and (3) said engine power demand sensor is a throttle valve opening sensor operatively connected to said throttle valve.

120. An internal combustion engine according to claim 114, further comprising means connected to said combustion chambers for recirculating a portion of said exhaust gases to the combustion chamber to which said additional fuel is supplied;
  said recirculating means comprising: an exhaust suction passage connected to said converging means to suck in said portion of said exhaust gases therefrom;
  as many deliver passages as said combustion chambers, each of said delivery passages being (1) operatively connected to each corresponding one of said combustion chambers, (2) connected to said exhaust suction passage and (3) having an exhaust gas control solenoid valve; and
  recirculation congtrol means connected to said controlling means and to all of said exhaust gas control solenoid valves, said recirculation control means opening said exhaust gas control solenoid valve so that the combustion chamber to which said richer air-fuel charge is supplied receives said portion of said exhaust gases when said lean and richer air-fuel charges are to be formed in said combustion chambers.

121. An internal combustion engine according to claim 120 wherein said selecting means selects said rich or lean fuel injection duration signal in such a manner (1) that said selecting means selects only said lean fuel injection duration signal for all of said combustion chambers when said engine power demand sensor senses said engine power demand lower than a predetermined engine power demand value, and (2) that said selecting means alternately selects said rich and lean fuel injection duration signals for successive two fuel injection operations for a given one of said fuel injection nozzles when said engine power demand sensor senses said engine power demand exceeding said predetermined engine power demand value.

122. An internal combustion engine according to claim 121 wherein said recirculation control means opens said exhaust gas control solenoid valve of the combustion chamber to which said richer air-fuel charge is supplied at least from the time when the fuel injection to said combustion chamber to which said richer air-fuel charge is supplied begins to the time when the suction process of said combustion chamber to which said richer air-fuel charge is supplied.

123. An internal combustion engine according to claim 114 wherein said selecting means comprises:
   means including said engine power demand sensor and connected to said fuel injection initiation signal producing means for producing a rich designation signal, said rich designation signal producing means producing said rich designation signal such that said rich designation signal producing means does not produce said rich designation signal when said engine power demand is lower than a first predetermined engine power demand value and that the number of said rich designation signal produced by said rich designation producing means in a given number of the sequential fuel injection initiation signals increases as said engine power demand increases and is over said first predetermined engine power demand value;
   means connected to said rich designation signal producing means and to said computer means for pre-selecting said rich or lean fuel injection duration signal to form a series of the pre-selected fuel injection duration signals, said pre-selecting means selecting said rich or lean fuel injection duration signal when said pre-selecting means does or does not receive said rich designation signal, respectively; and
   means connected to said pre-selecting means and to said fuel injection initiation signal producing means for distributing each of said pre-selected fuel injection duration signals to each of said fuel injection solenoid valve of said fuel injection nozzles, respectively.

124. An internal combustion engine according to claim 123 wherein said controlling means further comprises:
   means connected to said rich coefficient signal producing means and to said lean coefficient signal producing means and including a water temperature sensor sensing a cooling water temperature of said engine, for producing a water temperature compensation signal which corresponds to a compensation value of said first or second coefficient, said water temperature compensation signal changing depending on said cooling water temperature; and
   wherein said rich coefficient signal producing means produces a rich base coefficient signal which represents a first base coefficient which basically corresponds to said air-fuel ratio of said richer air-fuel charge, said rich coefficient signal producing means adding said rich base coefficient signal and said water temperature compensation signal to form said rich coefficient signal, whereby said rich coefficient signal changes depending on said cooling water temperature to change said air-fuel ratio of said richer air-fuel charge depending on said cooling water temperature; and
   wherein said lean coefficient signal producing means produces a lean base coefficient signal which represents a second base coefficient which basically corresponds to said air-fuel ratio of said lean air-fuel charge, said lean coefficient signal producing means adding said lean base coefficient signal and water temperature compensation signal to form said lean coefficient signal, whereby said lean coefficient signal changes depending on said cooling water temperature to change said air-fuel ratio of said lean air-fuel charge depending on said cooling water temperature.

125. An internal combustion engine according to claim 123 wherein said selecting means further comprises:
   means disposed between said pre-selecting means and said distributing means for modifying each of said pre-selected fuel injection duration signals by lengthening the duration thereof (1) by a period of time which is a delayed action time inherent to said fuel injection solenoid valve and which is duration from when said fuel injection solenoid valve receives said selected fuel injection duration signal to when said fuel injection solenoid valve actually begins to open and (2) by another period of time which is another delayed action time of said fuel injection solenoid valve due to the decrease of voltage imposed on said fuel injection solenoid valve, said distributing means receiving the modified fuel injection duration signal and distributing each of said modified fuel injection duration signal to each of said fuel injection solenoid valve of said fuel injection nozzles, respectively.

126. An internal combustion engine according to claim 123 wherein said rich designation signal producing means produces said rich designation signal for every fuel injection operation of all of said combustion chambers when said engine power demand exceeds a second predetermined engine power demand value whereby all of said combustion chambers receive said richer air-fuel charge when said engine power demand exceeds said second predetermined engine power demand.

127. An internal combustion engine according to claim 120 wherein said selecting means comprises:
   means including said engine power demand sensor and connected to said fuel injection initiation signal producing means for producing a rich designation signal, said rich designation signal producing means producing said rich designation signal such that said rich designation signal producing means does not produce said rich designation signal when said engine power demand is lower than a first predetermined engine power demand value and that the number of said rich designation signal produced by said rich designation producing means in a given number of the sequential fuel injection initiation signals increases as said engine power demand increases and is over said first predetermined engine power demand value;
   means connected to said rich designation signal producing means and to said computer means for pre-selecting said rich or lean fuel injection duration signal to form a series of the pre-selected fuel injection duration signals, said pre-selecting means selecting said rich or lean fuel injection duration signal when said pre-selecting means does or does not receive said rich designation signal, respectively; and means connected to said pre-selecting means and to said fuel injection initiation signal producing means for distributing each of said pre-selected fuel injection duration signals to each of said fuel injection solenoid valve of said fuel injection nozzles, respectively.

128. An internal combustion engine according to claim 126 wherein said controlling means further comprises:

means connected to said rich coefficient signal producing means and to said lean coefficient signal producing means and including a water temperature sensor sensing a cooling water temperature of said engine, for producing a water temperature compensation signal which corresponds to a compensation value of said first or second coefficient, said water temperature compensation signal changing depending on said cooling water temperature; and wherein said rich coefficient signal producing means produces a rich base coefficient signal which represents a first base coefficient which basically corresponds to said air-fuel ratio of said richer air-fuel charge, said rich coefficient signal producing means adding said rich base coefficient signal and said water temperature compensation signal to form said rich coefficient signal, whereby said rich coefficient signal changes depending on said cooling water temperature to change said air-fuel ratio of said richer air-fuel charge depending on said cooling water temperature; and wherein said lean coefficient signal producing means produces a lean base coefficient signal which represents a second base coefficient which basically corresponds to said air-fuel ratio of said lean air-fuel charge, said lean coefficient signal producing means adding said lean base coefficient signal and said water temperature compensation signal to form said lean coefficient signal, whereby said lean coefficient signal changes depending on said cooling water temperature to change said air-fuel ratio of said lean air-fuel charge depending on said cooling water temperature.

129. An internal combustion engine according to claim 126 wherein said selecting means further comprises:

means disposed between said pre-selecting means and said distributing means for modifying each of said pre-selected fuel injection duration signals by lengthening the duration thereof (1) by a period of time which is a delayed action time inherent to said fuel injection solenoid valve and which is a duration from when said fuel injection solenoid valve receives said selected fuel injection duration signal to when said fuel injection solenoid valve actually begins to open and (2) by another period of time which is another delayed action time of said fuel injection solenoid valve due to the decrease of voltage imposed on said fuel injection solenoid valve, said distributing means receiving the modified fuel injection duration signal and distributing each of said modified fuel injection duration signal to each of said fuel injection solenoid valve of said fuel injection nozzles, respectively.

130. An internal combustion engine according to claim 127 wherein (1) said recirculation control means is connected to said rich designation signal producing means and to said distributing means,
(2) said recirculation control means receives said rich designation signal and said rich or lean fuel injection duration signal,
(3) the exhaust gas control solenoid valve and the fuel injection solenoid valve, both operatively connected to the same combustion chamber are electrically operatively connected to each other,
(4) said exhaust gas control solenoid valve is electrically operatively connected to said rich designation signal producing means,
(5) the exhaust gas control solenoid valve to which said rich fuel injection duration signal and said rich designation signal are at the same time directed receives said rich fuel injection duration signal whereby when one of said fuel injection solenoid valve receives said rich fuel injection duration signal the corresponding one of said exhaust gas control solenoid receives said rich fuel injection duration signal, and
(6) said exhaust gas control solenoid valve keeps to open during the time said exhaust gas control solenoid valve keeps to receive said rich fuel injection duration signal.

131. An internal combustion engine according to claim 130 wherein said rich designation signal producing means produces said rich designation signal for every fuel injection operation of all of said combustion chambers when said engine power demand exceeds a second predetermined engine power demand value whereby all of said combustion chambers receive said richer air-fuel charge when said engine power demand exceeds said second predetermined engine power demand.

132. An internal combustion engine according to claim 131 wherein (1) said rich designation signal producing means produces a recirculation operation signal only when said engine power demand is between said first and second predetermines engine power demand values, and
(2) said recirculation control means does not transmit said rich fuel injection duration signal to said exhaust gas control solenoid valve if said recirculation control means does not receive said recirculation operation signal whereby said recirculating a portion of said exhaust gases is made only when said engine power demand is between said first and second engine power demand values.

133. An internal combustion engine according to claim 96 wherein (1) each of said fuel injection nozzles has a fuel injection orifice of the same size,
(2) said engine has an intake manifold connected to said combustion chambers,
(3) each of said fuel injection nozzles has a fuel injection solenoid valve, said fuel injection nozzles keeping to inject fuel during the time when said fuel injection solenoid valve keeps open; and wherein said controlling means comprises:

means operatively connected to an engine power output shaft of said engine for producing a fuel injection initiation signal for each of said combustion chambers;

means including an air flow sensor connected to said intake manifold for producing an air flow rate signal which represents the air flow rate sucked in by said engine;

means for producing a rich coefficient signal which represents a first coefficient which corresponds to said air-flow rate of said richer air-fuel charge;

means for producing a lean coefficient signal which represent a second coefficient which corresponds to said air-fuel rate of said lean air-fuel charge;

means including an engine power demand sensor and connected to (1) said rich coefficient signal producing means, (2) said lean coefficient signal producing means and (3) said fuel injection initiation signal producing means for selecting said lean coefficient signal when said engine power demand is lower than a predetermined engine power demand value, said selecting means selecting said rich or lean coefficient signals when said selecting means receive the fuel injection initiation signal which corresponds to said first or second sets of said combustion chambers, respectively, when said engine power demand exceeds said predetermined engine power demand value;

computer means connected to said fuel injection initiation signal producing means, said air flow rate signal producing means and said selecting means to receive said fuel injection initiation signal, said air flow rate signal and the selected signal by said selecting means, for producing a rich fuel injection duration signal or a lean fuel injection duration signal for each fuel injection operation for each of said combustion chambers, said rich fuel injection duration signal being a signal whose duration determines a quantity of fuel so injected as to form said richer air-fuel charge and correponds to a product said first coefficient and said air flow rate divided by said engine speed, said lean fuel injection duration signal being a signal whose duration determines a quantity of fuel so injected as to form said lean air-fuel charge and corresponds to a product of said second coefficient and said air flow rate divided by said engine speed, said computer means producing said rich or lean fuel injection duration signal when said computer means receives said rich or lean coefficient signal, respectively; and means connected to said computer means, said fuel injection initiation signal producing means and each of said fuel injection solenoid valve of said fuel injection nozzle for distributing said rich or lean fuel injection duration signal to each of said fuel injection solenoid valve in such a manner that when said distributing means receives one of said fuel injection initiation said distributing means transmits the corresponding fuel injection duration signal to the corresponding fuel injection solenoid valve, said fuel injection solenoid valve keeping to open during the time when said fuel injection solenoid valve keeps to receive said corresponding fuel injection duration signal whereby said combustion chambers receive said lean air-fuel charge when said engine power demand is below said predetermined engine power demand value and whereby said first or second set of said combustion chambers receive said richer or lean air-fuel charge when said engine power demand exceeds said predetermined engine power demand value.

134. An internal combustion engine according to claim 133 wherein (1) said engine power demand is represented by an intake manifold pressure, and (2) said engine power demand sensor is an intake manifold pressure sensor connected to said intake manifold.

135. An internal combustion engine according to claim 133 wherein (1) said engine has a throttle valve connected to said intake manifold, (2) said engine power demand is represented by a throttle valve opening, and (3) said engine power demand sensor is a throttle valve opening sensor operatively connected to said throttle valve.

136. An internal combustion engine according to claim 133, further comprising means connected to said combustion chambers for recirculating a portion of said exhaust gases to the combustion chamber to which said additional fuel is supplied;

said recirculating means comprising:

an exhaust suction passage connected to said converging means to suck in said portion of said exhaust gases therefrom;

an exhaust gas recirculation control valve connected to said exhaust suction passage;

as many delivery passages as said first set of combustion chambers, each of said delivery passages being operatively connected to each corresponding one of said first set of combustion chambers and connected to said exhaust gas recirculation control valve; and recirculation control means connected to said exhaust gas recirculation control valve and to said selecting means, said recirculation control means closing said exhaust gas recirculation control valve when said engine power demand is below said predetermined engine power demand valve, said recirculation control means opening said exhaust gas recirculation control valve when said engine power demand exceeds said predetermined engine power demand valve.

137. An internal combustion engine according to claim 136 wherein each of said combustion chamber has an intake port and an intake valve disposed therein, said intake valve having a valve head having a back face facing upstream of said valve head; and wherein each of said delivery passage has an opening end disposed in the vicinity of said back face of said intake valve to be opened or closed by said back face when said intake valve opens or closes, respectively.

138. An internal combustion engine according to claim 136 wherein (1) said engine power demand is represented by an intake manifold pressure, and (2) said engine power demand sensor is an intake manifold pressure sensor connected to said intake manifold.

139. An internal combustion engine according to claim 136 wherein (1) said engine has a throttle valve connected to said intake manifold, (2) said engine power demand is represented by a throttle valve opening, and (3) said engine power demand sensor is a throttle valve opening sensor operatively connected to said throttle valve.

140. An internal combustion engine according to claim 117 wherein (1) said engine power demand is represented by an intake manifold pressure, (2) said engine power demand sensor is an intake manifold pressure sensor connected to said intake manifold, and (3) said predetermined engine power demand valve is 660 mmHg.

141. An internal combustion engine according to claim 117 wherein (1) said engine power demand is represented by an intake manifold pressure, (2) said engine power demand sensor is an intake manifold pressure sensor connected to said intake manifold, and (3) said predetermined engine power demand valve is 680 mmHg.

142. An internal combustion engine according to claim 126 wherein (1) said engine power demand is represented by an intake manifold pressure, (2) said engine power demand sensor is an intake manifold pressure sensor connected to said intake manifold, and (3) said first and second predetermined engine power demand values are 668 mmHg and 720 mmHg, respectively.

143. An internal combustion engine according to claim 133 wherein the air-fuel ratios of said lean and rich air-fuel charges are respectively between 11 and 14.7, and between 17 and 22.

144. An internal combustion engine according to claim 114 wherein (1) each of said combustion chambers has an intake port, and (2) each of said fuel injection nozzles being disposed in said intake port; and wherein each of said combustion chambers has a trap chamber (1) disposed therein, (2) enclosing a spark plug, (3) having at least one suction aperture and one discharge aperture and (4) further having a partition disposed within said trap chamber between said suction and discharge apertures to form within said trap chamber a uniflow path in communication with said suction and discharge apertures, said spark plug being exposed to said path; and wherein said supplying means comprises: means connected to said combustion chambers for delivering an air-fuel charge to be supplied to each of said combustion chambers in such a manner (1) that said air-fuel charge consists of a richer portion and a leaner portions, (2) that said richer and leaner portions are delivered to each of said combustion chambers in stratified charge form, (3) that said richer portion is directed to said suction aperture to be sucked therein and (4) that said richer and leaner portions form, as a whole, said lean air-fuel charge or said richer air-fuel charge depending on said engine power demand; whereby said richer portion trapped in said trap chamber, when ignited, forms a flame which spurts out of said trap chamber to burn said leaner portion remaining outside said trap chamber.

145. An internal combustion engine according to claim 117 wherein (1) each of said combustion chambers has an intake port, and (2) each of said fuel injection nozzles being disposed in said intake port; and wherein each of said combustion chambers has a trap chamber (1) disposed therein, (2) enclosing a spark plug, (3) having at least one suction aperture and one discharge aperture and (4) further having a partition disposed within said trap chamber between said suction and discharge apertures to form within said trap chamber a uniflow path in communication with said suction and discharge apertures, said spark plug being exposed to said path; and wherein said supplying means comprises: means connected to said combustion chambers for delivering an air-fuel charge to be supplied to each of said combustion chambers in such a manner (1) that said air-fuel charge consists of a richer portion and a leaner portion, (2) that said richer and leaner portions are delivered to each of said combustion chambers in stratified charge form, (3) that said richer portion is directed to said suction aperture to be sucked therein and (4) that said richer and leaner portions form, as a whole, said lean air-fuel charge or said richer air-fuel charge depending on said engine power demand, whereby said richer portion trapped in said trap chamber, when ignited, forms a flame which spurts out of said trap chamber to burn said leaner portion remaining outside said trap chamber.

146. An internal combustion engine according to claim 120 wherein (1) each of said combustion chambers has an intake port, and (2) each of said fuel injection nozzles being disposed in said intake port; and wherein each of said combustion chambers has a trap chamber (1) disposed therein, (2) enclosing a spark plug, (3) having at least one suction aperture and one discharge aperture and (4) further having a partition disposed within said trap chamber between said suction and discharge apertures to form within said trap chamber a uniflow path in communication with said suction and discharge apertures, said spark plug being exposed to said path; and wherein said supplying means comprises: means connected to said combustion chambers for delivering an air-fuel charge to be supplied to each of said combustion chambers in such a manner (1) that said air-fuel charge consists of a richer portion and a leaner portion, (2) that said richer and leaner portions are delivered to each of said combustion chambers in stratified charge form, (3) that said richer portion is directed to said suction aperture to be sucked therein and (4) that said richer and leaner portions form, as a whole, said lean air-fuel charge or said richer air-fuel charge depending on said engine power demand, whereby said richer portion trapped in said trap chamber, when ignited, forms a flame which spurts out of said trap chamber to burn said leaner portion remaining outside said trap chamber.

147. An internal combustion engine according to claim 123 wherein (1) each of said combustion chambers has an intake port, and (2) each of said fuel injection nozzles being disposed in said intake port; and wherein each of said combustion chambers has a trap chamber (1) disposed therein, (2) enclosing a spark plug, (3) having at least one suction aperture and one discharge aperture and (4) further having a partition disposed within said trap chamber between said suction and discharge apertures to form within said trap chamber a uniflow path in communication with said suction and discharge apertures, said spark plug being exposed to said path; and wherein said supplying means comprises: means connected to said combustion chambers for delivering an air-fuel charge to be supplied to each of said combustion chambers in such a manner (1) that said air-fuel charge consists of a richer portion and a leaner portion, (2) that said richer and leaner portions are delivered to each of said combustion chambers in stratified charge form, (3) that said richer portion is directed to said suction aperture to be sucked therein and (4) that said richer and leaner portions form, as a whole, said lean air-fuel charge or said richer air-fuel charge depending on said engine power demand, whereby said richer portion trapped in said trap chamber, when ignited, forms a flame which spurts out of said trap chamber to burn said leaner portion remaining outside said trap chamber.

148. An internal combustion engine according to claim 127 wherein (1) each of said combustion chambers has an intake port, and (2) each of said fuel injection nozzles being disposed in said intake port; and wherein each of said combustion chambers has a trap chamber (1) disposed therein, (2) enclosing a spark plug, (3) having at least one suction aperture and one discharge aperture and (4) further having a partition disposed within said trap chamber between said suction and discharge apertures to form within said trap chamber a uniflow path in communication with said suction and discharge apertures, said spark plug being exposed to said path; and wherein said supplying means comprises: means connected to said combustion chambers for delivering an air-fuel charge to be supplied to each of said combustion chambers in such a manner (1) that said air-fuel charge consists of a richer portion and a leaner portion, (22) that said richer and leaner portions are delivered to each of said combustion chambers in stratified charge form, (3) that said richer portion is directed to said suction aperture to be sucked therein and (4) that said richer and leaner portions form, as a whole, said lean air-fuel charge or said richer air-fuel charge depending on said engine power demand, whereby said richer portion trapped in said trap chamber, when ignited, forms a flame which spurts out of said trap chamber to burn said leaner portion remaining outside said trap chamber.

149. An internal combustion engine according to claim 133 wherein (1) each of said combustion chambers has an intake port, and (2) each of said fuel injection nozles being disposed in said intake port; and wherein each of said combustion chambers has a trap chamber (1) disposed therein, (2) enclosing a spark plug, (3) having at least one suction aperture and one discharge aperture and (4) further having a partition disposed within said trap chamber between said suction and discharge apertures to form within said trap chamber a uniflow path in communication with said suction and discharge apertures, said spark plug being exposed to said path; and wherein said supplying means comprises: means connected to said combustion chambers for delivering an air-fuel charge to be supplied to each of said combustion chambers in such a manner (1) that said air-fuel charge consists of a richer portion and a leaner portion, (2) that said richer and leaner portions are delivered to each of said combustion chambers in stratified charge form, (3) that said richer portion is directed to said suction aperture to be sucked therein and (4) that said richer and leaner portions form, as a whole, said lean air-fuel charge or said richer air-fuel charge depending on said engine power demand, whereby said richer portion trapped in said trap chamber, when ignited, forms a flame which spurts out of said trap chamber to burn said leaner portion remaining outside said trap chamber.

150. An internal combustion engine according to claim 136 wherein (1) each of said combustion chambers has an intake port, and (2) each of said fuel injection nozzles being disposed in said intake port; and wherein each of said combustion chambers has a trap chamber (1) disposed therein, (2) enclosing a spark plug, (3) having at least one suction aperture and one dicharge aperture and (4) further having a partition disposed within said trap chamber between said suction and discharge apertures to form within said trap chamber a uniflow path in communication with said suction and discharge apertures, said spark plug being exposed to said path; and wherein said supplying means comprises: means connected to said combustion chambers for delivering an air-fuel charge to be supplied to each of said combustion chambers in such a manner (1) that said air-fuel charge consists of a richer portion and a leaner portion, (2) that said richer and leaner portions are delivered to each of said combustion chambers in stratified charge form, (3) that said richer portion is directed to said suction aperture to be sucked therein and (4) that said richer and leaner portions form, as a whole, said lean air-fuel charge or said richer air-fuel charge depending on said engine power demand, whereby said richer portion trapped in said trap chamber, when ignited, forms a flame which spurts out of said trap chamber to burn said leaner portion remaining outside said trap chamber.

151. An internal combustion engine according to claim 105 wherein each of said combustion chambers has an intake valve disposed in said intake port; and wherein each of said fuel injection nozzle is so disposed to direct toward said suction aperture of said trap chamber whereby each of said fuel injection nozzles injects fuel toward said suction aperture when said intake valve is open,.

152. An internal combustion engine according to claim 108 wherein each of said combustion chambers has an intake valve disposed in said intake port; and wherein each of said fuel injection nozzles is so disposed to direct toward said suction aperture of said trap chamber whereby each of said fuel injection nozzles injects fuel toward said suction aperture when said intake valve is open.

153. An internal combustion engine according to claim 109 wherein each of said combustion chambers has an intake valve disposed in said intake port; and wherein each of said fuel injection nozzles is so disposed to direct toward said suction aperture of said trap chamber whereby each of said fuel injection nozzles injects fuel toward said suction aperture when said intake valve is open.

154. An internal combustion engine according to claim 105 wherein each of said combustion chambers has an intake valve disposed in said intake port; and wherein each of said fuel injection nozzles, said trap chamber and said intake valve are so disposed that each of said fuel injection nozzles injects fuel tangentially to the flow line of the flow flowing in said intake port and that the injected fuel from said fuel injection nozzles reaches said suction aperture of said trap chamber with said flow when said intake valve is open.

155. An internal combustion engine according to claim 108 wherein each of said combustion chambers has an intake valve disposed in said intake port; and wherein each of said fuel injection nozzles, said trap chamber and said intake valve are so disposed that each of said fuel injection nozzles injects fuel tangentially to the flow line of the flow flowing in said intake port and that the injected fuel form said fuel injection nozzles reaches said suction aperture of said trap chamber with said flow when said intake valve is open.

156. An internal combustion engine according to claim 109 wherein each of said combustion chambers has an intake valve disposed in said intake port; and wherein each of said fuel injection nozzles, said trap chamber and said intake valve are so disposed that each of said fuel injection nozzles injects fuel tangentially to the flow line of the flow flowing in said intake port and that the injected fuel from said fuel injection nozzles reaches said suction aperture of said trap chamber with said flow when said intake valve is open.

157. An internal combustion engine according to claim 101 wherein each of said combustion chambers has an intake port and an intake valve disposed in said intake port; and wherein said supplying means comprises:

first carburation means forming a first air-fuel mixture;

a first intake passage connected to said first carburation means and to each of said intake port of said combustion chambers;

second carburation means forming a second air-fuel mixture;

a second intake passage connected to said second carburation means and to each of said intake port of a first set of combustion chambers;

third carburation means forming a third air-fuel mixture;

a third intake passage connected to said third carburation means and to each of said intake port of a second set of the remaining combustion chambers; and first adding means connected to said third carburation means and adding said additional fuel thereto when said engine power demand exceeds a first predetermined engine power demand condition, the ends of sid second and third intake passage and said trap chamber are so disposed that said second and third air-fuel mixtures direct toward said suction aperture of the corresponding trap chamber with a cooperation of said intake valve when said intake valve is open, respectively; said first air-fuel mixture entering said combustion chambers through said intake port when said intake valve is open; said first and second air-fuel mixtures combinedly forming said lean air-fuel charge; said first and third air-fuel mixtures combinedly forming said lean air-fuel charge when said engine power demand is below said first predetermined engine power demand condition; said first air-fuel mixture and said third air-fuel mixture added with said additional fuel combinedly forming said richer air-fuel charge.

158. An internal combustion engine according to claim 157 wherein said supplying means further comprises second adding means connected to said second carburation means and adding said additional fuel thereto when said engine power demand exceed a second predetermined engine power demand condition higher than said first predetermined engine power demand condition, said first and second air-fuel mixtures combinedly forming said lean air-fuel charge when said engine power demand stays between said first and second predetermined engine power demand conditions, said first air-fuel mixture and said second air-fuel mixture added with said additional fuel combinedly forming said richer air-fuel charge when said engine power demand is above said second predetermined engine power demand condition.

159. An internal combustion engine according to claim 157 wherein said first, second and third carburation means are carburetors, respectively.

160. An internal combustion engine according to claim 158 wherein said first, second and third carburation means are carburetors, respectively.

161. An internal combustion engine according to claim 158 wherein
(1) said first predetermined engine power demand condition is represented by a combination of a predetermined intake manifold pressure value and a first predetermined engine speed value, and
(2) said second predetermined engine power demand condition is represented by another combination of said predetermined intake manifold pressure value and a second predetermined engine speed value.

162. An internal combustion engine according to claim 161 wherein said first, second and third carburation means are carburetors, respectively.

163. An internal combustion engine according to claim 159 wherein said first adding means comprises:
a first valve connected to said third carburation means and opening to allow said third carburation means to suck in said additional fuel when said engine power demand exceeds said first predetermined engine power demand condition.

164. An internal combustion engine according to claim 160 wherein said second adding means comprises:
a second valve connected to said second carburation means and opening to allow said second carburation means to suck in said additional fuel when said engine power demand exceeds said second predetermined engine power demand condition.

165. An internal combustion engine according to claim 101 wherein each of said combustion chambers has an intake port and an intake valve disposed in said intake port; and wherein said supplying means comprises:
first carburation means forming a first air-fuel mixture;
first intake passage connected to said first carburation means and to each of said intake port of said combustion chambers;
second carburation means forming a second air-fuel mixture;
a second intake passage connected to said second carburation means and to each of said intake port of a first set of combustion chambers;
third carburation means forming a third air-fuel mixture;
a third intake passage connected to said third carburation means and to each of said intake port of a second set of the remaining combustion chambers; and first adding means connected to said third carburation means and adding said additional fuel thereto when said engine power demand exceeds a first predetermined engine power demand condition, the ends of said first intake passage and said trap chamber are so disposed that said first air-fuel mixture directs toward said suction aperture of the corresponding trap chamber with a cooperation of said intake valve when said intake valve is open; said second and third air-fuel mixtures entering said combustion chambers through said intake port when said intake valve is open; said first and second air-fuel mixtures combinedly forming said lean air-fuel charge; said first and third air-fuel mixtures combinedly forming said lean air-fuel charge when said engine power demand is below said first predetermined engine power demand condition, said first air-fuel mixture and said third air-fuel mixture added with said additional fuel combinedly forming said richer air-fuel charge, said first air-fuel mixture is richer than said second or third air-fuel mixture or said third air-fuel mixture added with said additional fuel.

166. An internal combustion engine according to claim 165 wherein said supplying means further comprises second adding means connected to said second carburation means and adding said additional fuel thereto when said engine power demand exceed a second predetermined engine power demand condition higher than said first predetermined engine power demand condition, said first and second air-fuel mixtures combinedly forming said lean air-fuel charge when said engine power demand stays between said first and second predetermined engine power demand conditions, said first air-fuel mixture and said second air-fuel mixture added with said additional fuel combinedly forming said richer air-fuel charge when said engine power demand is above said second predetermined engine power demand condition, said first air-fuel mixture is richer than said second air-fuel mixture added with said additional fuel.

167. An internal combustion engine according to claim 165 wherein said first, second and third carburation means are carburetors, respectively.

168. An internal combustion engine according to claim 166 wherein said first, second and third carburation means are carburetors, respectively, 169. An internal combustion engine according to claim 101 wherein each of said combustion chambers has an intake port and an intake valve disposed in said intake port; and
  wherein said supplying means comprises:
    a first carburation means forming a first air-fuel mixture; a first intake passage connected to said first carburation means and to each of said intake port of a first set of combustion chambers;
    a second carburation means forming a second-air-fuel mixture; a second intake passage connected to said second carburation means and to each of said intake port of a second set of the remaining combustion chambers; and a first adding means connected to said second carburation means and adding said additional fuel thereto when said engine power demand exceeds a first predetermined engine power demand condition; each of said intake port having a bend; said trap chamber, said intake valve and said bend of said intake port being so disposed that said richer and leaner portions are formed at said bend because of a centrifugal effect acting on said air-fuel charge flowing in said bend and that said richer portion flows into said trap chamber through said suction aperture when said intake valve is open; said first air-fuel mixture being said lean air-fuel charge said second air-fuel mixture being said lean air-fuel charge when said engine power demand is below said first predetermined engine power demand condition; said second air-fuel mixture added with said additional fuel being said richer air-fuel charge when said engine power demand is above said first predetermined engine power demand condition.

170. An internal combustion engine according to claim 169 wherein said supplying means further comprises a second adding means connected to said first carburation means and adding said additional fuel thereto when said engine power demand exceed a second predetermined engine power demand condition higher than said first predetermined engine power demand condition, said first air-fuel mixture being said lean air-fuel charge when said engine power demand stays between said first and second predetermined engine power demand conditions, said first air-fuel mixture added with said additional fuel being said richer aar-fuel charge when said engine power demand is above said second predetermined engine power demand condition.

171. An internal combustion engine according to claim 169 wherein said first and second carburation means are carburetors, respectively.

172. An internal combustion engine according to claim 170 wherein said first and second carburation means are carburetors, respectively.

173. An internal combustion engine according to claim 171 wherein said first adding means comprises:
  a first valve connected to said third carburation means and opening to allow said third carburation means to suck in said additional fuel when said engine power demand exceeds said first predetermined engine power demand condition.

174. An internal combustion engine according to claim 172 wherein said second adding means comprises:
  a second valve connected to said second carburaton means and opening to allow said second carburation means to suck in said additional fuel when said engine power demand exceeds said second predetermined engine power demand condition.

175. An internal combustion engine according to claim 101 wherein each of said combustion chambers has an intake port and an intake valve disposed in said intake port; and wherein said supplying means comprises:
  first carburation means forming a first air-fuel mixture;
  a first intake passage connected to said first carburation means and to each of said intake port of said combustion chambers;
  second carburation means forming a second air-fuel mixture;
  a second intake passage connected to said second carburation means and to each of said intake port of said combustion chambers;
  first air flow conrol means;
  a first air passage connected to said first air flow control means and to each of said intake port of a first set of combustion chambers;
  second air flow control means; and
  a second air passage connected to said second air flow control means and to each of said intake port of a second set of the remaining combustion chambers;
  the ends of said first intake passage and said trap chamber are so disposed that said first air-fuel mixture directs toward said suction aperture of the corresponding trap chamber with a cooperation of said intake valve when said intake valve is open; said second air fuel mixture entering said combustion chambers through said intake port when said intake valve is open; said first and second air-fuel mixtures combinedly forming said richer air-fuel charge;
  said first and second air flow control means respectively supplying air to said first and second air passages in such a manner (1) that said lean air fuel charge is formed in each of said combustion chambers when said engine power demand is lower than a first predetermined engine power demand condition, (2) that said first air flow control means stops supplying air when said engine power demand exceeds said first predetermined engine power demand condition whereby said richer air-fuel charge is supplied to said first set of combustion charbers and (3) that said second air flow control means keeps supplying air to said second air passage so as to form said lean air-fuel charge in each of said second set of the remaining combustion chambers when said engine power demand exceeds said first predetermined engine power demand condition.

176. An internal combustion engine according to claim 175 wherein said second air flow means stops supplying air to said second air passage when said engine power demand exceeds a second predetermined engine power demand condition higher than said first predetermined engine power demand condition whereby each of said combustion chambers receives said richer air-fuel charge.

177. An internal combustion engine according to claim 175 wherein said first carburation means is a carburetor.

178. An internal combustion engine according to claim 176 wherein said first carburation means is a carburetor.

179. An internal combustion engine according to claim 102 wherein each of said combustion chambers has an intake oort and an intake valve disposed in said intake port; and wherein said supplying means comprises:
- first carburation means forming a first air-fuel mixture;
- a first intake passage connected to said first carburation means and to each of said intake port of said combustion chambers;
- second carburation means forming a second air-fuel mixture;
- a second intake passage connected to said second carbuation means and to each of said intake port of a first set of combustion chambers;
- third carburation means forming a third air-fuel mixture;
- a third intake passage connected to said third carburation means and to each of said intake port of a second set of the remaining combustion chambers; and first adding means connected to said third carburation means and adding said additional fuel thereto when said engine power demand exceeds a first predetermined engine power demand condition, the ends of said second and third intake passage and said trap chamber are so disposed that said second and third air-fuel mixtures direct toward said suction aperture of the corresponding trap chamber with a cooperation of said intake valve when said intake valve is open, respectively, said first air-fuel mixture entering said combustion chambers through said intake port when said intake valve is open; said first and second air-fuel mixtures combinedly forming said lean air-fuel charge; said first and third air-fuel mixtures combinedly forming said lean air-fuel charge when said engine power demand is below said first predetermined engine power demand condition; said first air-fuel mixture and said third air-fuel mixture added with said additional fuel combinedly forming said richer air-fuel charge.

180. An internal combustion engine according to claim 179 wherein said recirculating means comprises:
- an exhaust suction passage connected to said converging means to suck in said portion of said exhaust gases therefrom; and
- an exhaust gas recirculation control valve connected to said exhaust suction passage and to said third intake passage, said exhaust gas recirculation control valve closing when said engine power demand is below said first predetermined engine power demand condition, said exhaust gas recirculation control valve opening when said engine power demand exceeds said first predetermined engine power demand condition whereby said portion of said exhaust gases is supplied to said second set of combustion chambers.

181. An internal combustion engine according to claim 179 wherein said supplying means further comprises second adding means connected to said second carburation means and adding said additional fuel thereto when said engine power demand exceed a second predetermined engine power demand condition higher than said first predetermined engine power demand condition, said first and second air-fuel mixtures combinedly forming said lean air-fuel charge when said engine power demand stays between said first and second predetermined engine power demand conditions, said first air-fuel mixture and said second air-fuel mixture added with said additional fuel combinedly forming said richer air-fuel charge when said engine power demand is above said second predetermined engine power demand condition; and
wherein said recirculating means comprises:
- an exhaust suction passage connected to said converging means to suck in said portion of said exhaust gases therefrom; and
- an exhaust gas recirculation control valve connected to said exhaust suction passage and to said third intake passage, said exhaust gas recirculation control valve closing when said engine power demand is below said first predetermined engine power demand condition or above said second predetermined engine power demand condition, said exhaust gas recirculation control valve opening when said engine power demand is between said first and second predetermined engine power demand condition whereby said portion of said exhaust gases is supplied to said second set of combustion chambers.

182. An internal combustion engine according to claim 181 wherein
(1) said first predetermined engine power demand condition is represented by a combination of a predetermined intake manifold pressure value and a first predetermined engine speed value, and
(2) said second predetermined engine power demand condition is represented by another combination of said predetermined intake manifold pressure value and a second predetermined engine speed value.

183. An internal combustion engine according to claim 182 wherein
said first adding means adds said additional fuel and at the same time said exhaust gas recirculation control valve opens when the following three conditions are at the same time fulfilled:
(1) an engine cooling water temperature is above a predetermined water temperature value,
(2) an engine speed is between said first and second predetermined engine speed value, and
(3) an intake manifold pressure is above said predetermined intake manifold pressure value;
and wherein said first and second adding means add said additional fuel and at the same time said exhaust gas recirculation control valve closes when the following three conditions are at the same time fulfilled:
(1) said engine cooling water temperature is above said predetermined water temperature value,
(2) said engine speed is above said predetermined second engine speed value, and
(3) said intake manifold pressure is above said predetermined intake manifold pressure value.

184. An internal combustion engine according to claim 183 wherein said engine comprises:

means for producing a water temperature signal when said cooling water temperature is above said predetermined water temperature value; engine speed signal producing means for producing (1) a first engine speed signal when said engine speed is above said first predetermined engine speed value, (2) a second engine speed signal when said engine speed is below said second predetermined engine speed signal and (3) a third engine speed signal when said engine speed is above said second predetermined engine speed signal;

means for producing an intake manifold pressure signal when said intake manifold pressure is above said predetermined intake manifold pressure;

means connected to said water temperature signal producing means, said engine speed signal producing means, said intake manifold pressure signal producing means and said first adding means for delivering a first action signal to said first adding means when said first action signal delivering means keeps receivng at the same time said water temperature signal, said first engine speed signal and said intake manifold pressure signal, said first adding means keeping adding said additional fuel during the time when said first adding means keeps receving said first action signal;

means connected to said water temperature signal producing means, said engine speed signal producing means, said intake manifold pressure signal producing means and said exhaust gas recirculation control valve for delivering a recirculation signal to said exhaust gas reculation control valve when said recirculation signal delivering means keeps receiving at the same time said water temperature signal, said first and second engine speed signal and said intake manifold pressure signal, said exhaust gas recirculation control valve keeping open during the time when said exhaust gas recirculation control valve keeps receiving said recirclation signal; and means connected to said water temperature signal producing means, said engine speed signal producing means, said intake manifold pressure signal producing means and said second adding means for delivery and a second action signal when said second action signal producing means keeps receiving at the same time said water temperature signal, said third engine speed signal and said intake manifold pressure signal, said second adding means keeping adding said additional fuel during the time when said second adding means keeps receiving said second action signal.

185. An internal combustion engine according to claim 102 wherein each of said combustion chambers has an intake port and an intake valve disposed in said intake port; and wherein said supplying means comprises:

first carburation means forming a first air-fuel mixture;

a first intake passage connected to said first carburation means and to each of said intake port of a first set of combustion chambers;

second carburation means forming a second air-fuel mixture;

a second intake passage connected to said second carburation means and to each of said intake port of a second set of the remaining combustion chambers; and first adding means connected to said second carburation means and adding additional fuel thereto when said engine power demand exceeds a first predetermined engine power demand condition; each of said intake port having a bend; said trap chamber, said intake valve and said bend of said intake port being so disposed that said richer and leaner portions are formed at said bend because of a centrifugal effect acting on said air-fuel charge flowing in said bend and that said richer portion flows into said trap chamber through said suction aperture when said intake valve is open; said first air fuel mixture being said lean air-fuel charge; said second air-fuel mixture being said lean air-fuel charge when said engine power demand is below said first predetermined engine power demand condition; said second air-fuel mixture added with said additional fuel being said richer air-fuel charge when said engine power demand is above said first predetermined engine power demand condition; and further wherein said recirculating means comprises: an exhaust suction passage connected to said converging means to suck in said portion of said exhaust gases therefrom; and as many delivery passages as said second set of combustion chambers, each of said delivery passages being connected to said intake port of each of said second set of combustion chambers; and an exhaust gas recirculation control valve connected to said delivery passages and said exhaust suction passage, said exhaust gas recirculation control valve closing when said engine power demand is blow said first predetermined engine power demand condition, said exhaust recirculation control valve opening when said engine power demand exceeds said first predetermined engine power demand condition whereby said portion of said exhaust gases is supplied to said second set of combustion chambers.

186. An internal combustion engine according to claim 185 wherein said supplying means further comprises a second adding means connected to said first carburation means and adding said additional fuel thereto when said engine power demand exceed a second predetermined engine power demand condition higher than said first predetermined engine power demand condition, said first air-fuel mixture being said lean air-fuel charge when said engine power demand stays between said first and second predetermined engine power demand conditions, said first air-fuel mixture added with said additional fuel being said richer air-fuel charge when said engine power demand is above said second predetermined engine power demand condition; and wherein (1) said exhaust gas recirculation control valve closes when said engine power demand is below said first predetermined engine power demand condition or above said second predetermined engine power demand condition, and (2) said exhaust gas recirculation control valve opens when said engine power demand is between said first and second predetermined engine power demand condition.

187. An internal combustion engine according to claim 186 therein (1) said first predetermined engine power demand condition is represented by a combination of a predetermined intake manifold pressure value and a first predetermined engine speed value, and (2) said second predetermined engine power demand condition is represented by another combination of said predetermined intake manifold pressure value and a second predetermined engine speed value.

188. An internal combustion engine according to claim 187 wherein said first adding means adds said additional fuel and at the same time said exhaust gas recirculation control valve opens when the following three conditions are at the same time fulfilled:

(1) an engine cooling water temperature is above a predetermined water temperature value, (2) an engine speed is between said first and second predetermined engine speed values, and (3) an intake manifold pressure is above said predetermined intake manifold pressure value;

and wherein said first and second adding means add said additional fuel and at the same time said exhaust gas recirculation control valve closes when the following three conditions are at the same time fulfilled:

(1) said engine cooling water temperature is above said predetermined water temperature value, (2) said engine speed is above said predetermined second engine speed value, and (3) said intake manifold pressure is above said predetermined intake manifold pressure value.

189. An internal combustion engine according to claim 188 wherein said engine comprises:

means for producing a water temperature signal when said cooling water temperature is above said predetermined water temperature value; engine speed signal producing means for producing (1) a first engine speed signal when said engine speed is above said first predetermined engine speed value, (2) a second engine speed signal when said engine speed is below said second predetermined engine speed signal and (3) a third engine speed signal when said engine speed is above said second predetermined engine speed signal;

means for producing an intake manifold pressure signal when said intake manifold pressure is above said predetermined intake manifold pressure;

means connected to said water temperature signal producing means, said engine speed signal producing means, said intake manifold pressure signal producing means and said first adding means for delivering a first action signal to said first adding means when said first action signal delivering means keeps receiving at the same time said water temperature signal, said first engine speed signal and said intake manifold pressure signal, said first adding means keeping adding said additional fuel during the time when said first adding means keeps receiving said first action signal;

means connected to said water temperature signal producing means, said engine speed signal producing means, said intake manifold pressure signal producing means and said exhaust gas recirculation control valve for delivering a recirculation signal to said exhaust gas recirculation control valve when said recirculation signal delivering means keeps receiving at the same time said water temperature signal, said first and second engine speed signal and said intake manifold pressure signal, said exhaust gas recirculation control valve keeping open during the time when said exhaust gas recirculation control valve keeps receiving said recirculation signal; and means connected to said water temperature signal producing means, said engine speed signal producing means, said intake manifold pressure signal producing means and said second adding means for delivery a second action signal when said second action signal producing means keeps receiving at the same time said water temperature signal, said third engine speed signal and said intake manifold pressure signal, said second adding means keeping adding said additional fuel during the time when said second adding means keeps receiving said second action signal.

190. An internal combustion engine according to claim 157 wherein an air-fuel ratio of said first air-fuel mixture is maintained higher than 17, and wherein an air-fuel ratio of said second air-fuel mixture is maintained between 1.5 and 9, and wherein an air-fuel ratio of said third air-fuel mixture with no addition of said additional fuel is maintained between 1.5 and 9, and wherein an air-fuel ratio of said third air-fuel mixture added with said additional fuel is maintained between 1 and 6, and wherein a ratio of a weight flow rate of air contained in said second air-fuel mixture in said second carburation means and a weight flow rate of air contained in said third air-fuel mixture in said third carburation means, with or without an addition of said additional fuel, is proportional to a ratio of the number of combustion chambers of said first set of combustion chambers and the number of combustion chambers of said second set of combustion chambers, and wherein the sum of said a weight flow rate of air contained in said second air-fuel mixture in said second carburation means and said weight flow rate of air contained in said third air-fuel mixture in said third carburation means, with or without said addition of said additional fuel, is maintained between 1 and 10% of the total sum of a weight flow rate of air contained in said first air-fuel mixture in said first carburation means, said weight flow rate of air contained in said second air-fuel mixture in said second carburation means and said weight flow rate of air contained in said third air-fuel mixture in said third carburation means, with or without said addition of said additional fuel.

191. An internal combustion engine according to claim 157 wherein an air-fuel ratio of said first air-fuel mixture is maintained at 20, and wherein an air-fuel ratio of said second air-fuel mixture is maintained at 5.3, and wherein an air-fuel ratio of said third air-fuel mixture with no addition of said additional fuel is maintained between at 5.3, and wherein an air-fuel ratio of said third air-fuel mixture added with said additional fuel is maintained at 1.4, and wherein a ratio of a weight flow rate of air contained in said second air-fuel mixture in said second carburation means and a weight flow rate of air contained in said third air-fuel mixture in said third carburation means, with or without an addition of said additional fuel, is proportional to a ratio of the number of combustion chambers of said first set of combustion chambers and the number of combustion chambers of said second set of combustion chambers, and wherein the sum of said weight flow rate of air contained in said second air-fuel mixture in said second carburation means and said weight flow rate of air contained in said third air-fuel mixture in said third carburation means, with or without said addition of said additional fuel, is maintained at 4% of the total sum of weight air flow rate of air contained in said first air-fuel mixture in said first carburation means, said weight flow rate of air contained in said second air-fuel mixture in said second carburation means and said weight flow rate of air contained in said third air-fuel mixture in said third carburation means, with or without said addition of said additional fuel.

192. An internal combustion engine according to claim 158 wherein an air-fuel ratio of said first air-fuel mixture is maintained higher than 17, and wherein an air-fuel ratio of said second air-fuel mixture with no addition of said additional fuel is maintained between 1.5 and 9, and wherein an air-fuel ratio of said second air-fuel mixture with an addition of said additional fuel is maintained between 1 and 6, and wherein an air-fuel ratio of said third air-fuel mixture with no addition of said additional fuel is maintained between 1.5 and 9, and wherein an air-fuel ratio of said third-fuel mixture with an addition of said additional fuel is maintained between 1 and 6, and wherein a ratio of a weight flow rate of air contained in said second air-fuel mixture in said second carburation means, with or without said addition of said additional fuel, a weight flow rate of air contained in said third air-fuel mixture in said third carburation means, with or without said addition of said additional fuel, is proportional to a ratio of the number of combustion chambers of said first set of combustion chambers and the number of combustion chambers of said second set of combustion chambers, and wherein the sum of weight flow rate of air contained in said second air-fuel mixture in said second carburation means, with or without said addition of said additional fuel and said weight flow rate of air contained in said third air-fuel mixture in said third carburation means, with or without said addition of said additional fuel, is maintained between 1 and 10% of the total sum of a weight air flow rate of air contained in said first air-fuel mixture in said first carburation means, said weight flow rate of air contained in said second air-fuel mixture in said second carburation means, with or without said addition of said additional fuel, and said weight flow rate of air contained in said third air-fuel mixture in said third carburation means, with or without said addition of said additional fuel.

193. An internal combustion engine according to claim 158 wherein an air-fuel ratio of said first air-fuel mixture is maintained higher than 20, and wherein an air-fuel ratio of said second air-fuel mixture with no addition of said additional fuel is maintained at 5.3, and wherein an air-fuel ratio of said second air-fuel mixture with an addition of said additional fuel is maintained at 1.4, and wherein an air-fuel ratio of said third air-fuel mixture with no addition of said additional fuel is maintained at 5.3, and wherein an air-fuel ratio of said third air-fuel mixture with an addition of said additional fuel is maintained at 1.4, and wherein a ratio of a weight flow rate of air contained in said second air-fuel mixture in said second carburation means, with or without said addition of said additional fuel, and weight air flow rate of air contained in said third air-fuel mixture in said third carburation means, with or without said addition of said additional fuel, is proportional to a ratio of the number of combustion chambers of said first set of combustion chambers and the number of combustion chambers of said second set of combustion chambers, and wherein the sum of said weight flow rate of air contained in said second air-fuel mixture in said second carburation means, with or without said addition of said additional fuel and said weight flow of air contained in said third air-fuel mixture in said third carburation means, with or without said addition of said additional fuel, is maintained at 4% of the total sum of a weight air flow rate of air contained in said first air-fuel mixture in said first carburation means, said weight flow rate of air contained in said second air-fuel mixture in said second carburation means, with or without said addition of said additional fuel, and said weight flow rate of air contained said third air-fuel mixture in said third carburation means, with or without said addition of said additional fuel.

194. An internal combustion engine according to claim 179 wherein an air-fuel ratio of said first air-fuel mixture is maintained higher than 17, and wherein an air-fuel ratio of said second air-fuel mixture is maintained between 1.5 and 9, and wherein an air-fuel ratio of said third air-fuel mixture with no addition of said additional fuel is maintained between 1.5 and 9, and wherein an air-fuel ratio of said third air-fuel mixture added with said additional fuel is maintained between 1 and 6, and wherein a ratio of weight flow rate of air contained in said second air-fuel mixture in said second carburation means and a weight flow rate of air contained in said third air-fuel mixture in said third carburation means, with or without an addition of said additional fuel, is proportional to a ratio of the number of combustion chambers of said first set of combustion chambers and the number of combustion chambers of said second set of combustion chambers, and wherein the sum of said weight flow rate of air contained in said second air-fuel mixture in said second carburation means and said weight flow rate of air contained in said third air-fuel mixture in said third carburation means, with or without said addition of said addition fuel, is maintained between 1 and 10% of the total sum of a weight flow rate of air contained in said first air-fuel mixture in said first carburation means, weight flow rate of air contained in said second air-fuel mixture in said second carburation means and said weight flow rate of air contained in said third air-fuel mixture in said third carburation means, with or without said addition of said additional fuel.

195. An internal combustion engine according to claim 179 wherein an air-fuel ratio of said first air-fuel mixture is maintained at 20, and wherein an air-fuel ratio of said second air-fuel mixture is maintained at 5.3, and wherein an air-fuel ratio of said third air-fuel mixture with no addition of said additional fuel is maintained between at 5.3, and wherein an air-fuel ratio of said third air-fuel mixture added with said additional fuel is maintained at 1.4, and wherein a ratio of a weight flow rate of air contained in said second air-fuel mixture in said second carburation means and a weight flow rate of air contained in said third air-fuel mixture in said third carburation means, with or without an additional of said additional fuel, is proportional to a ratio of the number of combustion chambers of said first set of combustion chambers and the number of combustion chambers of said second set of combustion chambers, and wherein the sum of weight flow rate of air contained in said second air-fuel mixture in said second carburation means and said weight flow rate of air contained in said third air-fuel mixture in said third carburation means, with or without said addition of said additional fuel, is maintained at 4% of the total sum of weight air flow rate of air contained in said first air-fuel mixture in said first carburation means, said weight flow rate of air contained in said second air-fuel mixture in said second carburation means and said weight flow rate of air contained in said third air-fuel mixture in said third carburation means, with or without said addition of said additional fuel.

196. An internal combustion engine according to claim 181 wherein an air-fuel ratio of said first air-fuel mixture is maintained higher than 17, and wherein an air-fuel ratio of said first air-fuel mixture is maintained higher than 17, and wherein an air-fuel ratio of said second and said weight flow rate of air contained in said third air-fuel mixture in said third carburation means, with or without said addition of said additional fuel.

197. An internal combustion engine according to claim 181 wherein an air-fuel ratio of said first air-fuel mixture is maintained higher than 20, and wherein an air-fuel ratio of said second air-fuel mixture with no addition of said additional fuel is maintained at 5.3, and wherein an air-fuel ratio of said second air-fuel mixture with an addition of said additional fuel is maintained at 1.4, and wherein an air-fuel ratio of said third air-fuel mixture with no addition of said additional fuel is maintained at 5.3, and wherein an air-fuel ratio of said third air-fuel mixture with an addition of said additional fuel is maintained at 1.4, and wherein a ratio of a weight flow rate of air contained in said second air-fuel mixture in said second carburation means, with or without said addition of said additional fuel, and weight air flow rate of air contained to said third air-fuel mixture in said third carburation means, with or without said addition of said additional fuel, is proportional to a ratio of the number of combustion chambers of said first set of combustion chambers and the number of combustion chambers of said second set of combustion chambers, and wherein the sum of said weight flow rate of air contained in said second air-fuel mixture in said second carburation means, with or without said addition of said additional fuel and said weight flow rate of air contained in said third air-fuel mixture in said third carburation means, with or without said addition of said additional fuel, is maintained at 4% of the total sum of a weight air flow rate of air contained in said first air-fuel mixture in said first carburation means, said weight flow rate of air contained in said second air-fuel mixture in said second carburation means, with or without said addition of said additional fuel, and said weight flow rate of air contained in said third air-fuel mixture in said third carburation means, with or without said addition of said additional fuel.

198. An internal combustion engine according to claim 105 wherein said air-fuel ratio of said lean air-fuel charge is maintained between 17 and 22, and wherein an air-fuel ratio of said richer air-fuel charge is maintained between 11 and 14.7 (stoichiometric).

199. An internal combustion engine according to claim 105 wherein said air-fuel ratio of said lean air-fuel charge is substantially maintained at 18, and wherein an air-fuel ratio of said richer air-fuel charge is substantially maintained at 13.

200. An internal combustion engine according to claim 109 wherein said air-fuel ratio of said lean air-fuel charge is maintained between 17 and 22, and wherein an air-fuel ratio of said richer air-fuel charge is maintained between 11 and 14.7 (stoichiometric).

201. An internal combustion engine according to claim 109 wherein said air-fuel ratio of said lean air-fuel charge is substantially maintained at 18, and wherein an air-fuel ratio of said richer air-fuel charge is substantially maintained at 13.

202. An internal combustion engine according to claim 169 wherein said air-fuel ratio of said lean air-fuel charge is maintained between 17 and 22, and wherein an air-fuel ratio of said richer air-fuel charge is maintained between 11 and 14.7 (stoichiometric).

203. An internal combustion engine according to claim 169 wherein said air-fuel ratio of said lean air-fuel charge is substantially maintained at 18, and wherein an air-fuel ratio of said richer air-fuel charge is substantially maintained at 13.

204. An internal combustion engine according to claim 175 wherein said air-fuel ratio of said lean air-fuel charge is maintained between 17 and 22, and wherein an air-fuel ratio of said richer air-fuel charge is maintained between 11 and 14.7 (stoichiometric).

205. An internal combustion engine according to claim 175 wherein said air-fuel ratio of said lean air-fuel charge is substantially maintained at 18, and wherein an air-fuel ratio of said richer air-fuel charge is substantially maintained at 13.

206. An internal combustion engine according to claim 91 wherein each of said combustion chambers has an ignition plug disposed therein: and wherein said engine further comprises: first ignition pulse generating means generating a series of advanced ignition pulses optimum for the ignition of said lean air-fuel charge; second ignition pulse generating means generating a series of retarded ignition pulses optimum for the ignition of said richer air-fuel charge, one of said advanced ignition pulses and one of said retarded ignition pulses being generated for every one ignition operation of each one of said combustion chambers;

means connected to said first and second ignition pulse generating means for selecting either one of said advanced or retarded ignition pulses for the corresponding one of said combustion chambers in such a manner that one of said advanced ignition pulses is selected when said corresponding one of said combustion chambers is supplied with said lean air-fuel charge and that one of said retarded ignition pulses is selected when said corresponding one of said combustion chambers is supplied with said richer air-fuel charge; a voltage-amplifier connected to said selecting means for amplifying the voltage of the selected ignition pulse selected by said selecting means;

and distributing means connected to said voltage-amplifier and to said ignition plug and distributing said voltage-amplified selected ignition pulse to said corresponding one of said combustion chambers.

207. An internal combustion engine according to claim 206 wherein said selecting means includes means for distinguishing the combustion chamber to which said richer air-fuel charge is supplied, said distinguishing means delivering a rich distinguishing signal when said distinguishing means distinguishes the combustion chamber to which said richer air-fuel charge is supplied, said selecting means selecting the retarded ignition pulse for the corresponding combustion chamber when said distinguishing meand delivers said rich distinguishing signal.

208. An internal combustion engine according to claim 207 wherein
(1) each of said combustion chambers receives at turn thereof said lean air-fuel charge when said engine power demand is below a predetermined engine power demand value, and
(2) each of a first set of combustion chambers receives at turn thereof said richer air-fuel charge and at the same time each of a second set of the remaining combustion chambers receives at turn thereof said lean air-fuel charge, when said engine power demand exceeds said predetermined engine power demand value; and wherein said distinguishing means comprises:
means for picking up said voltage-amplified selected ignition pulse distributed to a predetermined combustion chamber of said first set of combustion chambers, said picking up means delivering a distinguishing pulse when said picking up means picks up said voltage-amplified selected ignition pulse;
means including an engine power demand sensor for producing an engine power demand signal when said engine power demand exceeds said predetermined engine power demand value;
means connected to said picking up means, said engine power demand signal producing means and said first ignition pulse generating means for delivering, with assistance of said advanced ignition pulses, said rich distinguishing signal, when said rich distinguishing signal delivering means receives said engine power demand signal, in such a manner that said rich distinguishing signal delivering means delivers a first signal of said rich distinguishing signal for said predetermined combustion chamber when said rich distinguishing signal delivering means receives said distinguishing pulse and that said rich distinguishing signal delivering means successively delivers said rich distinguishing signal subsequently to said first signal for combustion chambers whose combustion operations follow the combustion operation of said predetermined combustion chamber and which receives said richer air-fuel charge, according to the predetermined combustion sequence of all of said combustion chambers when the turn of the combustion operation of the combustion chambers to which said richer air-fuel charge is supplied comes.

209. An internal combustion engine according to claim 208 wherein said first ignition pulse generating means comprises:
a first cam rotating proportionally to the engine speed and having a first centrifugal advance mechanism for advancing an angular phase of said cam as said engine speed increases; a first movable breaker plate; a first pair of contacts disposed on said first movable breaker plate, the contact of said first pair of contacts being made and broken by said first cam; and a first vacuum advance mechanism connected to said first movable breaker plate for rotating said first movable breaker plate relative to a rotation center of said first cam, as the intake manifold vacuum increases, to advance the angular phase of said first movable breaker plate thereby advancing a break timing of said first pair of contacts; and wherein said secnd ignition pulse generating means comprises: a second cam rotating proportionally to said engine speed and having a second centrifugal advance mechanism for advancing an angular phase of said second cam as said engine speed increases; a second movable breaker plate; a second pair of contacts disposed on said second movable breaker plate, the contact of said second pair of contacts being made and broken by said second cam; and a second vacuum advance mechanism connected to said second movable breaker plate for rotating said second movable breaker plate relative to a rotation center of said second cam, as said intake manifold vacuum increases, to advance the angular phase of said second movable breaker plate thereby advancing the break timing of said second pair of contacts.

210. An internal combustion engine according to claim 206 wherein
(1) each of said combustion chambers receives at turn thereof said lean air-fuel charge when said engine power demand is below a predetermined engine power demand value, and
(2) the suitable number of combustion chambers receive at turn thereof said richer air-fuel charge and the remaining combustion chambers receives at turn thereof said lean air-fuel charge when said engine power demand exceeds said predetermined engine power demand value; and wherein said engine further comprises:
means including an engine power demand sensor for retarding said retarded ignition pulses, said engine power demand rises to said predetermined engine power demand value, to the extent that the resulted torque by the combustion of said richer air-fuel charge ignited by the voltage-amplified selected ignition pulse made from the retarded ignition pulse further retarded by said retarding means becomes the same as the torque produced by the combustion of said lean air-fuel charge ignited by said advanced ignition pulses, said retarding means reducing the extent of said retarding, as time lapses, to reach zero in a predetermined short period of time from the instant when said engine power demand rises to said predetermined engine power demand value.

211. An internal combustion engine according to claim 210 wherein said first ignition pulse generating means comprises:
a first cam rotating proportionally to the engine speed and having a first centrifugal advance mechanism for advancing an angular phase of said cam as said engine speed increases; a first movable breaker plate; a first pair of contacts disposed on said first movable breaker plate, the contact of said first pair of contacts being made and broken by said first cam; and a first vacuum advance mechanism connected to said first movable breaker plate for rotating said first movable breaker plate relative to a rotation center of said first cam, as an intake manifold vacuum increases, to advance an angular phase of said first movable breaker plate thereby advancing a break timing of said first pair of contacts; and wherein said second ignition pulse generating means comprises: a second cam rotating proportionally to said engine speed and having a second centrifugal advance mechanism for advancing an angular phase of said second cam as said engine speed increases;
a second movable breaker plate; a second pair of contacts disposed on said second movable breaker plate, the contact of said secnd pair of contacts being made and broken by said second cam; and a second vacuum advance mechanism connected to said second movable breaker plate for rotating said second movable breaker plate relative to a rotation center of said second cam, as said intake manifold vacuum increases, to advance an angular phase of said second movable breaker plate thereby advancing a break timing of said second pair of contacts; and wherein said retarding means comprises:

a vacuum retard mechanism connected to said movable breaker plate for rotating said secnd movable breaker plate relative to a rotation center of said second cam, means for selectively coupling the manifold pressure to said retard mechanism, and means connected to said engine power demand sensor for controlling said selective coupling means to couple said manifold pressure to said retard mechanism when said manifold pressure reaches a preset level and for a predetermined time after said manifold pressure has dropped below said preset level.

212. An internal combustion engine according to claim 210 wherein said controlling means controls said quantity when said richer and lean air-fuel charges are to be formed in said combustion chambers, in such a manner that a first set of said combustion chambers receive said richer air-fuel charge and that a second set of the remaining combustion chambers receive said lean air-fuel charge.

213. An internal combustion engine according to claim 211 wherein said controlling means controls said quantity when said richer and lean air-fuel charges are to be formed in said combustion chambers, in such a manner that a first set of said combustion chambers receive said richer air-fuel charge and that a second set of the remaining combustion chambers receive said lean air-fuel charge.

214. An internal combustion engine according to claim 91 wherein said internal combustion engine is a rotary engine which comprises: two casings, each of said casings including a rotor housing having a trochoidal inner peripheral wall surface and a pair of side housings airtightly secured to the opposite sides of said rotor housing; two rotors, one each disposed in each of said casings and each having a polygonal peripheral shape with apices sealingly contacting said trochoidal inner peripheral wall surface and each also having side sealings so as to provide three combustion chambers between each of said rotors and each of said castings; and means connected to each of said casings for rotationg said rotors so as to effect volumetric changes of each of said three combustion chambers through suction, compression, combustion and exhaust strokes; and wherein said supplying means comprises: two intake ports each respectively disposed in each of said casings for introducing air to the combustion chamber which is in the suction stroke; two fuel injection nozzles each respectively disposed in each of said casings for injecting fuel to the combustion chamber which is in the suction stroke; and means connected to said fuel injection nozzles for controlling a quantity of fuel to be injected to each of said combustion chambers.

215. An internal combustion engine according to claim 214 further comprising means connected to said combustion chambers for recirculating a portion of said exhaust gases to the combustion chamber to which said additional fuel is supplied.

216. An internal combustion engine according to claim 214 wherein each of said fuel injection nozzles injects said fuel to the combustion chamber which is in the suction stroke, toward the leading portion thereof so that a stratified air-fuel charge consisting of a richer portion and a leaner portion thereof is formed in the combustion chamber which is in the suction stroke, said richer portion existing in said leading portion, said leaner portion existing in the trailing portion of the combustion chamber.

217. An internal combustion engine according to claim 214 wherein (1) each of said fuel injection nozzles has a fuel injection orifice of the same size;

(2) each of said fuel injection nozzles has a fuel injection solenoid valve, said fuel injection nozzles injecting fuel during the time when said fuel injection solenoid valve opens; and (3) said engine having an intake manifold connected to said intake ports; and wherein said controlling means comprises:

means operatively connected to an engine power output shaft of said engine for producing a fuel injection initiation signal for each of said combustion chambers;

means including an air flow sensor connected to said intake manifold for producing an air flow rate signal which represents the air flow rate sucked in by said engine;

means for producing a rich coefficient signal which represents a first coefficient which corresponds to said air-fuel ratio of said richer air-fuel charge;

means for producing a lean coefficient signal which represent a second coefficient which corresponds to said air-fuel ratio of said lean air-fuel charge;

computer means connected to said fuel injection initiation signal producing means, said air flow rate signal producing means, said rich coefficient signal producing means and said lean coefficient signal producing means to receives said injection initiation signal, said air flow rate signal, said rich coefficient signal and said lean coefficient signal, for producing a rich fuel injection duration signal and a lean fuel injection duration signal for each fuel injection operation for each of said combustion chambers, said rich fuel injection duration signal being a signal whose duration determines a quantity of fuel so injected as to form said richer air-fuel charge and corresponds to a product of said first coefficient and said air flow rate divided by said engine speed, said lean fuel injection duration signal being a signal whose duration determines a quantity of fuel so injected as to form said lean air-fuel charge and corresponds to a product of said second coefficient and said flow rate divided by said engine speed; and means (1) including a first engine power demand sensor, (2) connected to said computer means to receive said rich and lean fuel injection duration signals, and (3) connected to each of said fuel injection solenoid valve of said fuel injection nozzles, for selecting said rich or lean fuel injection duration signal for each of said fuel injection nozzles, said selecting means delivering the selected fuel injection duration signal to said fuel injection solenoid valve of the fuel injection nozzle for which said selected fuel injection duration signal is selected, said fuel injection solenoid valve keeping open during the time when said fuel injection solenoid valve keeps receiving said selected fuel injection duration signal.

218. An internal combustion engine according to claim 217 wherein said controlling means further comprises:

means connected to said rich coefficient signal producing means and to said lean coefficient signal producing means and including a water temperature sensor sensing the cooling water temperature of said engine, for producing a water temperature compensation signal which corresponds to a compensation value of said first or second coefficient, said water temperature compensation signal changing depending on said cooling water temperature; and wherein said rich coefficient signal producing means produces a rich base coefficient signal which represents a first base coefficient which relates to said air-fuel ratio of said richer air-fuel charge, said rich coefficient signal producing means adding said rich base coefficient signal and said water temperature compensation signal to form said rich coefficient signal, whereby said rich coefficient signal changes depending on said cooling water temperature to change said air-fuel ratio of said richer air-fuel charge depending on said cooling water temperature; and wherein said lean coefficient signal producing means produces a lean base coefficient signal which represents a second base coefficient which relates to said air-fuel ratio of said lean air-fuel charge, said lean coefficient signal producing means adding said lean base coefficient signal and said water temperature compensation signal to form said lean coefficient signal, whereby said lean coefficient signal changes depending on said cooling water temperature to change said air-fuel ratio of said lean air-fuel charge depending on said cooling water temperature.

219. An internal combustion engine according to claim 217 wherein (1) said selecting means selects said lean fuel injection duration signal for all of said combustion chambers when said first engine power demand sensor senses said engine power demand is lower than a first predetermined engine power demand value, (2) said selecting means selectes, when said first engine power demand sensor senses that said engine power demand exceeds said first predetermined engine power demand value, said rich fuel injection duration signal for all of the combustion chambers within a first casing and said lean fuel injection duration signal for all of the combustion chambers within a second remaining casing.

220. An internal combustion engine according to claim 219 further comprising means connected to said combustion chambers for recirculating a portion of said exhaust gases to the combustion chamber to which said additional fuel is supplied;

said recirculating means comprising: an exhaust suction passage connected to said converging means to suck in said portion of said exhaust gases therefrom;

an exhaust gas recirculation control valve connected to said exhaust suction passage;

a delivery passage connected to ssid exhaust gas recirculation control valve and to the intake port of said first casing recirculation control means connected to said exhaust gas recirculation control valve and to said selecting means, said recirculation control means closing said exhaust gas recirculation control valve when said engine power demand is below said first predetermined engine power demand value, said recirculation control means opening said exhaust gas recirculation control value when said engine power demand exceeds said first predetermined engine power demand value.

221. An internal combustion engine according to claim 219 wherein (1) said selecting means further includes a second engine power demand sensor, (2) said selecting means selects when said second engine power demand sensor senses that said engine power demand exceeds a second predetermined engine power demand value higher than said first predetermined engine power demand value, said rich fuel injection duration signal for all of the combustion chambers within said second remaining casing whereby all of combustion chambers within said first and casing and all of combustion chambers within said second remaining casing receive in the suction stroke thereof said richer air-fuel charge when said engine power demand exceeds said second predetermined engine power demand value.

222. An internal combustion engine according to claim 221 wherein said recirculation control means closes said exhaust gas recirculating control valve when said engine power demand exceeds said second predetermined engine power demand value.

223. An internal combustion engine according to claim 217 wherein (1) said engine power demand is represented by an intake manifold pressure, and (2) said first engine power demand sensor is a first intake manifold pressure sensor connected to said intake manifold.

224. An internal combustion engine according to claim 219 wherein (1) said engine power demand is represented by an intake manifold pressure, and (2) said first engine power demand sensor is a first intake manifold pressure sensor connected to said intake manifold.

225. An internal combustion engine according to claim 221 wherein (1) said engine power demand is represented by an intake manifold pressure, and (2) said first and second engine power demand sensors are first and second intake manifold pressure sensors connected to said intake manifold; and wherein said first and second predetermined engine power demand values are respectively about 680 mmHg and 720 mmHg.

226. An internal combustion engine according to claim 222 wherein (1) said engine power demand is represented by an intake manifold pressure, and (2) said first and second engine power demand sensors are first and second intake manifold pressure sensors connected to said intake manifold; and wherein said first and second predetermined engine power demand values are respectively about 680 mmHg and 720 mmHg.

227. An internal combustion engine according to claim 214 wherein the air-fuel ratios of said lean and rich air-fuel charges are respectively between about 11 and 14.7, and between about 17 and 22.

228. An internal combustion engine according to claim 214 wherein the air-fuel ratios of said lean and richer air-fuel charges are substantially 13 and 18, respectively.

229. An internal combustion engine according to claim 215 wherein the air-fuel ratios of said lean and rich air-fuel charges are respectively between about 11 and 14.7, and between about 17 and 22.

230. An internal combustion engine according to claim 215 wherein the air-fuel ratios of said lean and richer air-fuel charges are substantially 13 and 18, respectively.

231. An internal combustion engine according to claim 91 wherein said internal combustion engine is a rotary engine which comprises: two casings, each of said casings including a rotor housing having a trochoidal inner peripheral wall surface and a pair of side housings airtightly secured to the opposite sides of said rotor housing; two rotors each disposed in each of said casings and each having a polygonal peripheral shape with apices sealingly contacting said trochoidal inner peripheral wall surface and each also having side sealings so as to provide three combustion chambers between each of said rotors and each of said casings; and means connected to each of said casings for rotating said rotors so as to effect volumetric changes of each of said three combustion chambers through suction, compression, combustion and exhaust strokes;
and wherein said supplying means comprises:
two intake ports each respectively disposed in each of said casings;
two suction ports each respectively disposed in each of said casings, each of said suction ports (1) disposed in a leading position, with respect to the rotor rotation direction, relative to the corresponding one of said intake ports and (2) being larger in size of cross-section than the corresponding one of said intake ports, first carburation means forming a first air-fuel mixture; a first intake passage connected to said first carburation means and to each of said suction ports;
second carburation means forming a second air-fuel mixture;
a second intake passage connected to said second carburation means and to the intake port of a first casing;
a third carburation means forming a third air-fuel mixture; a third intake passage connected to said third carburation means and to the intake port of a second remaining casing and first adding means connected to said third carburation means and adding said additional fuel thereto when said engine power demand exceeds a first predetermined engine power demand condition; said first and second air-fuel mixtures combinedly forming said lean air-fuel charge; said first and third air-fuel mixtures combinedly forming said lean air-fuel charge when said engine power demand is below said first predetermined engine power demand condition, said first air-fuel mixture and said third air-fuel mixture added with said additional fuel combinedly forming said richer air-fuel charge, said first air-fuel mixture is richer than said second or third air-fuel mixture or said third air-fuel mixture added with said additional fuel.

232. An internal combustion engine according to claim 231 wherein said richer or lean air-fuel charge is respectively formed within the combustion chamber which is in the suction stroke so that said richer or lean air-fuel charge respectively consists of a leaner portion and a richer portion, said leaner portion existing in the trailing portion of the combustion chamber, and said richer portion existing in the leading portion of the combustion chamber.

233. An internal combustion engine according to claim 231 further comprising means connected to said combustion chambers for recirculating a portion of said exhaust gases to the combustion chamber to which said additional fuel is supplied.

234. An internal combustion engine according to claim 231 wherein said supplying means further comprises second adding means connected to said second carburation means and adding said additional fuel thereto when said engine power demand exceeds a second predetermined engine power demand condition higher than said first predetermined engine power demand condition, said first and second air-fuel mixtures combinedly forming said lean air-fuel charge when said engine power demand stays between said first and second predetermined engine power demand conditions, said first air-fuel mixture and said second air-fuel mixture added with said additional fuel combinedly forming said richer air-fuel charge when said engine power demand is above said second predetermined engine power demand condition, said first air-fuel mixture being richer than said second air-fuel mixture added with said additional fuel.

235. An internal combustion engine according to claim 231 wherein said first, second and third carburation means are carburetors, respectively.

236. An internal combustion engine according to claim 233 wherein said first, second and third carburation means are carburetors, respectively.

237. An internal combustion engine according to claim 234 wherein
(1) said first predetermined engine power demand condition is represented by a combination of a predetermined intake manifold pressure value and a first predetermined engine speed value, and
(2) said second predetermined engine power demand condition is represented by another combination of said predetermined intake manifold pressure value and a second predetermined engine speed value.

238. An internal combustion engine according to claim 231 wherein said first adding means comprises:
a first valve connected to said third carburation means and opening to allow said third carburation means to suck in said additional fuel when said engine power demand exceeds said first predetermined engine power demand condition.

239. An internal combustion engine according to claim 234 wherein said second adding means comprises:
a second valve connected to said second carburation means and opening to allow said second carburation means to suck in said additional fuel when said engine power demand exceeds said second predetermined engine power demand condition.

240. An internal combustion engine according to claim 233 wherein said recirculating means comprises:
an exhaust suction passage connected to said converging means to suck in said portion of said exhaust gases therefrom; and
an exhaust gas recirculation control valve connected to said exhaust suction passage and to said third intake passage, said exhaust gas recirculation control valve closing when said engine power demand is below said first predetermined engine power demand condition, said exhaust gas recirculation control valve opening when said engine power demand exceeds said first predetermined engine power demand condition whereby said portion of said exhaust gases is supplied to said second remaining casing.

241. An internal combustion engine according to claim 240 wherein said supplying means further comprises second adding means connected to said second carburation means and adding said additional fuel thereto when said engine power demand exceed a second predetermined engine power demand condition higher than said first predetermined engine power demand condition, said first and second air-fuel mixtures combinedly forming said lean air-fuel charge when said engine power demand stays between said first and second predetermined engine power demand conditions, said first air-fuel mixture and said second air-fuel mixture added with said additional fuel combinedly forming said richer air-fuel charge when said engine power demand is above said second predetermined engine power demand conditions, said first air-fuel mixture being richer than said second air-fuel mixture added with said additional fuel; and
- wherein (1) said exhaust gas recirculation control valve closes when said engine power demand is above said second predetermined engine power demand condition, and (2) said exhaust gas recirculation control valve opens when said engine power demand is between said first and second predetermined engine power demand conditions whereby said portion of said exhaust demand condition whereby said portion of said exhaust gases is supplied to said second remaining casing.

242. An internal combustion engine according to claim 241 wherein
- (1) said first predetermined engine power demand condition is represented by a combination of a predetermined intake manifold pressure value and a first predetermined engine speed value, and
- (2) said second predetermined engine power demand condition is represented by another combination of said predetermined intake manifold pressure value and a second predetermined engine speed value.

243. An internal combustion engine according to claim 242 wherein
said first adding means adds said additional fuel and at the same time said exhaust gas recirculation control valve opens when the following three conditions are at the same time fulfilled:
- (1) an engine cooling water temperature is above a predetermined water temperature value,
- (2) an engine speed is between said first and second predetermined engine speed values, and
- (3) an intake manifold pressure is above said predetermined intake manifold pressure value;
and wherein said first and second adding means add said additional fuel and at the same time said exhaust gas recirculation control valve closes when the ing three conditions are at the same time fulfilled:
- (1) said engine cooling water temperature is above said predetermined water temperature value,
- (2) said engine speed is above said predetermined second engine speed value, and
- (3) said intake manifold pressure is above said predetermined intake manifold pressure value.

244. An internal combustion engine according to claim 243 wherein said engine comprises:
means for producing a water temperature signal when said cooling water temperature is above said predetermined water temperature value; engine speed signal producing means for producing
- (1) a first engine speed signal when said engine speed is above said first predetermined engine speed value,
- (2) a second engine speed signal when said engine speed is below said second predetermined engine speed signal and
- (3) a third engine speed signal when said engine speed is above said second predetermined engine speed signal;
means for producing an intake manifold pressure signal when said intake manifold pressure is above said pretermined intake manifold pressure;
means connected to said water temperature signal producing means, said engine speed signal producing means, said intake manifold pressure signal producing means and said first adding means for delivering a first action signal to said first adding means when said first action signal delivering means keeps receiving at the same time said eater temperature signal, said first engine speed signal and said intake manifold pressure signal, said first adding means keeping adding said additional fuel during the time when said first adding means keeps receiving said first action signal;
means connected to said water temperature signal producing means, said engine speed signal producing means, said intake manifold pressure signal producing means and said exhaust gas recirculation control valve for delivering a recirculation signal to said exhaust gas recirculation control valve when said recirculation signal delivering means keeps receiving at the same time said water temperature signal, said first and second engine speed signal and said intake manifold pressure signal, said exhaust gas recirculation control valve keeping open during the time when said exhaust gas recirculation control valve keeps receiving said recirculation signal; and means connected to said water temperature signal producing means, said engine speed producing means, said intake manifold pressure signal producing means and said second adding means for delivery a second action signal when said second action signal producing means keeps receiving at the same time said water temperature signal, said third engine speed signal and said intake manifold pressure signal, said second adding means keeping adding said additional fuel during the time when said second adding means keeps receiving said second action signal.

245. An internal combustion engine according to claim 231 wherein said air-fuel ratio of said lean air-fuel charge is maintained between about 17 and 22, and wherein an air-fuel ratio of said richer air-fuel charge is maintained between about 11 and 14.7 (stoichiometric).

246. An internal combustion engine according to claim 233 wherein said air-fuel ratio of said lean air-fuel charge is maintained between about 17 and 22, and wherein an air-fuel ratio of said richer air-fuel charge is maintained between about 11 and 14.7 (stoichiometric).

247. An internal combustion engine, comprising:
a plurality of sequentially operative combution chambers;
means connected to said combustion chambers for supplying a lean air-fuel charge to all of said combustion chambers when the engine power demand of said engine is lower than a first predetermined engine power demand level;

said supplying means supplying a rich air-fuel charge to some of said combustion chambers and said lean air-fuel charge to the remaining combustion chambers, when said engine power demand exceeds said first predetermined engine power demand level; and means connected to said combustion chambers for converging the exhaust gases of said combustion chambers.

248. An internal combustion engine according to claim 247 wherein said supplying means supplies said rich air-fuel charge to some of said combustion chambers, when said engine power demand exceed said first predetermined engine power demand level, in such a manner that in a given number of sequentially operative combustion operations of said combustion chambers the number of the combustion operation at which the combustion of said rich air-fuel charge is made is suitably selected to meet said engine power demand.

249. An internal combustion engine according to claim 247 further comprising means connected to said combustion chambers for recirculating a portion of said exhaust gases to the combustion chamber to which said additional fuel is supplied.

250. An internal combustion engine according to claim 248 wherein said supplying means supplies said rich air-fuel charge to all of said combustion chambers when said engine power demand exceeds a second predetermined engine power demand level.

251. An internal combustion engine according to claim 250 further comprising means connected to said combustion chambers for recirculating a portion of said exhaust gases to the combustion chamber to which said rich air-fuel charge is supplied, when said engine power demand is between said first and second predetermined engine power demand levels.

252. An internal combustion engine according to claim 248 wherein said supplying means supplies said rich air-fuel charge to some of said combustion chambers, when said engine power demand exceeds said first predetermined engine power demand level, in such a manner that the ratio of the number of the combustion operation at which the combustion of said rich air-fuel charge is made of a given number of sequentially operative combustion operations of said combustion chambers increases as said engine power demand increases.

253. An internal combustion engine according to claim 252 wherein the lowest value of said ratio is smaller than one divided by the number of all of said combustion chambers.

254. An internal combustion engine according to claim 248 wherein said supplying means supplies said rich air-fuel charge to some of said combustion chambers, when said engine power demand exceeds said first predetermined engine power demand level, in such a manner that the ratio of the number of the combustion operation at which the combustion of said rich air-fuel charge is made to a given number of sequentially operative combustion operations of said combustion chambers is constant and predetermined.

* * * * *